(12) United States Patent
Iijima et al.

(10) Patent No.: US 8,953,984 B2
(45) Date of Patent: Feb. 10, 2015

(54) ROTATING PART FOR IMAGE FORMING APPARATUS, CARTRIDGE FOR FORMING IMAGE, AND IMAGE FORMING APPARATUS

(71) Applicant: Mitsubishi Chemical Corporation, Tokyo (JP)

(72) Inventors: Shinichi Iijima, Jurong (SG); Shuichi Ikeda, Kanagawa (JP); Makoto Furuune, Kanagawa (JP); Teruyuki Mitsumori, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 44 days.

(21) Appl. No.: 13/836,684

(22) Filed: Mar. 15, 2013

(65) Prior Publication Data

US 2013/0251405 A1     Sep. 26, 2013

Related U.S. Application Data

(60) Provisional application No. 61/614,346, filed on Mar. 22, 2012, provisional application No. 61/637,078, filed on Apr. 23, 2012, provisional application No. 61/645,393, filed on May 10, 2012, provisional (Continued)

(51) Int. Cl.
    *G03G 15/00*       (2006.01)
    *G03G 21/16*       (2006.01)
    *F16D 1/10*        (2006.01)

(52) U.S. Cl.
    CPC .......... *G03G 21/1671* (2013.01); *G03G 15/757* (2013.01); *F16D 1/101* (2013.01); *F16D 2001/102* (2013.01)
    USPC ....................................................... 399/167

(58) Field of Classification Search
    USPC ........................................................ 399/167
    See application file for complete search history.

(56) References Cited

U.S. PATENT DOCUMENTS

| 1,912,412 A | 6/1933 | Stubbs |
| 3,734,548 A | 5/1973 | Kieves |

(Continued)

FOREIGN PATENT DOCUMENTS

| EP | 0 735 432 A1 | 10/1996 |
| FR | 2 356 046 | 6/1976 |

(Continued)

OTHER PUBLICATIONS

Signer, "Polygon Fixed and Sliding Drive Connections . . . New Developments in Their Application and Manufacture," Technical Paper, Society of Manufacturing Engineers, 1974.

(Continued)

*Primary Examiner* — David Bolduc
(74) *Attorney, Agent, or Firm* — Oblon, Spivak, McClelland, Maier & Neustadt, L.L.P.

(57) ABSTRACT

A rotating part for an image forming apparatus includes a drive member for transmitting power; and a driven member that is rotated by the drive member. The drive member has a male part formed in a direction of a rotation axis, and the driven member has a female part that is formed in the direction of the rotation axis and into which the male part is inserted. The male part is a hexagonal male part whose cross section perpendicular to the rotation axis assumes a hexagonal shape. The female part is a twisted triangular female part that assumes a triangular cross sectional profile in a direction perpendicular to the rotation axis, and a triangle which forms a cross section of a base and a cross section of a top is twisted at a predetermined angle with respect to the rotation axis.

39 Claims, 69 Drawing Sheets

Related U.S. Application Data application No. 61/652,737, filed on May 29, 2012, provisional application No. 61/673,056, filed on Jul. 18, 2012, provisional application No. 61/682,593, filed on Aug. 13, 2012.

(56) References Cited

U.S. PATENT DOCUMENTS

| | | | |
|---|---|---|---|
| 4,829,335 A | 5/1989 | Kanemitsu et al. | |
| 5,023,660 A | 6/1991 | Ebata et al. | |
| 5,128,715 A | 7/1992 | Furuyama et al. | |
| 5,132,728 A | 7/1992 | Suzaki et al. | |
| 5,221,943 A | 6/1993 | Hasegawa | |
| 5,233,772 A * | 8/1993 | Bergeron et al. | 40/503 |
| 5,245,376 A | 9/1993 | Takahashi | |
| 5,277,531 A | 1/1994 | Krivec | |
| 5,669,046 A | 9/1997 | Yoshida et al. | |
| 5,697,115 A * | 12/1997 | Sciarra et al. | 15/21.1 |
| 5,901,629 A * | 5/1999 | Stroud | 83/665 |
| 5,903,803 A | 5/1999 | Kawai et al. | |
| 5,926,673 A | 7/1999 | Foster et al. | |
| 5,987,287 A | 11/1999 | Huang | |
| 6,006,058 A | 12/1999 | Watanabe et al. | |
| 6,029,032 A * | 2/2000 | Watanabe et al. | 399/111 |
| 6,035,159 A | 3/2000 | Azuma et al. | |
| 6,128,454 A | 10/2000 | Kawai et al. | |
| 6,163,665 A | 12/2000 | Watanabe et al. | |
| 6,173,146 B1 | 1/2001 | Wang et al. | |
| 6,175,706 B1 | 1/2001 | Watanabe et al. | |
| 6,185,390 B1 | 2/2001 | Higeta et al. | |
| 6,226,478 B1 | 5/2001 | Watanabe et al. | |
| 6,240,266 B1 | 5/2001 | Watanabe et al. | |
| 6,324,363 B1 | 11/2001 | Watanabe et al. | |
| 6,330,409 B1 * | 12/2001 | Watanabe et al. | 399/111 |
| 6,336,018 B1 | 1/2002 | Kawai et al. | |
| 6,349,188 B1 | 2/2002 | Kawai et al. | |
| 6,385,420 B1 | 5/2002 | Morioka | |
| 6,400,914 B1 | 6/2002 | Noda et al. | |
| 6,438,341 B1 | 8/2002 | Matsuoka | |
| 6,501,926 B1 | 12/2002 | Watanabe et al. | |
| 6,501,927 B1 | 12/2002 | Watanabe et al. | |
| 6,533,235 B1 * | 3/2003 | Dymerski et al. | 248/429 |
| 6,885,838 B2 | 4/2005 | Kawai et al. | |
| 6,898,399 B2 | 5/2005 | Morioka et al. | |
| 6,999,696 B2 | 2/2006 | Noda et al. | |
| 7,236,722 B2 | 6/2007 | Portig | |
| 7,433,631 B2 | 10/2008 | Karz et al. | |
| 7,537,410 B2 | 5/2009 | Parisi et al. | |
| 7,813,676 B2 | 10/2010 | Huck et al. | |
| 2001/0021320 A1 | 9/2001 | Murayama et al. | |
| 2002/0044794 A1 | 4/2002 | Nishiuwatoko et al. | |
| 2002/0110388 A1 | 8/2002 | Yokomori et al. | |
| 2003/0053823 A1 | 3/2003 | Cho et al. | |
| 2003/0059233 A1 | 3/2003 | Jang et al. | |
| 2004/0086300 A1 | 5/2004 | Kawai et al. | |
| 2005/0163526 A1 | 7/2005 | Kawai et al. | |
| 2005/0192092 A1 | 9/2005 | Breckner et al. | |
| 2005/0254858 A1 | 11/2005 | Numagami et al. | |
| 2006/0008287 A1 | 1/2006 | Noda et al. | |
| 2006/0198654 A1 | 9/2006 | Noda et al. | |
| 2007/0104510 A1 | 5/2007 | Kawai et al. | |
| 2007/0104511 A1 | 5/2007 | Kawai et al. | |
| 2007/0140735 A1 | 6/2007 | Karz et al. | |
| 2007/0242977 A1 * | 10/2007 | Suzuki | 399/113 |
| 2008/0056754 A1 | 3/2008 | Noda et al. | |
| 2008/0056764 A1 | 3/2008 | Chung | |
| 2009/0010681 A1 | 1/2009 | Huck et al. | |
| 2009/0074452 A1 * | 3/2009 | Noda et al. | 399/111 |
| 2009/0257779 A1 | 10/2009 | Shimura et al. | |
| 2009/0279382 A1 * | 11/2009 | Harre et al. | 366/133 |
| 2009/0279917 A1 | 11/2009 | Tsui et al. | |
| 2009/0290908 A1 | 11/2009 | Noda et al. | |
| 2012/0045247 A1 | 2/2012 | Lewis | |
| 2013/0183063 A1 | 7/2013 | Huck et al. | |
| 2013/0216265 A1 * | 8/2013 | Peng et al. | 399/167 |
| 2014/0010576 A1 * | 1/2014 | Wu et al. | 399/167 |

FOREIGN PATENT DOCUMENTS

| | | |
|---|---|---|
| GB | GB 446033 | 4/1936 |
| JP | 49-91645 | 8/1974 |
| JP | 64-21466 | 1/1989 |
| JP | 4-5949 | 1/1992 |
| JP | 6-185531 | 7/1994 |
| JP | 6-258877 | 9/1994 |
| JP | 6-258993 | 9/1994 |
| JP | 6-332346 | 12/1994 |
| JP | 2000-112200 | 4/2000 |
| JP | 2002-525657 | 8/2002 |
| JP | 3352609 | 9/2002 |

OTHER PUBLICATIONS

U.S. Appl. No. 13/827,515, filed Mar. 14, 2013, Iijima.

* cited by examiner

15

ROTATING PART FOR IMAGE FORMING APPARATUS, CARTRIDGE FOR FORMING IMAGE, AND IMAGE FORMING APPARATUS

TECHNICAL FIELD

The invention relates to a rotating part provided in an image forming apparatus, a cartridge for forming an image having the rotating part, and an image forming apparatus equipped with the rotating part and the cartridge.

BACKGROUND ART

A hitherto-known image forming apparatus has an organic photo conductor (OPC) drum and a columnar rotating body. Such an image forming apparatus is used as a laser printer, an LED printer, a printer analogous to these printers, a facsimile machine, or a multifunctional document processor including a printer function.

As shown in FIG. 68, in such an image forming apparatus, a process cartridge 2 is removably attached to a main body, wherein the cartridge 2 has electrifying means, developing means or cleaning means, and an OPC-type photosensitive drum (hereinbelow referred to as an "OPC drum"). The image forming apparatus is further equipped with a rotating part that functions as a power transmission mechanism for rotating the OPC drum in the process cartridge 2 by means of power output from a drive source of the main body when the process cartridge 2 is loaded into the main body.

The rotating part is made up of a drive shaft that rotates integrally along with the drive source of the main body and a drum shaft for rotating the OPC drum. Indentations (female parts) and protrusions or projections (male parts) are formed in each of the drive shaft and the drum shaft. The indentations and the projections are engaged with each other, whereby drive force (rotating force) is transmitted from the drive shaft to the drum shaft.

The indentations and the projections are formed so as to assume a polygonal shape, like a triangular shape and a hexagonal shape, in order to hinder loading of an incompatible process cartridge.

CITATION LIST

Patent Document

[Patent Document 1] Specifications of U.S. Pat. No. 5,903,803

SUMMARY OF INVENTION

Technical Problem

In the related-art rotating part that is described in connection with Patent Document 1 and that has a twisted hole and a twisted columnar protrusion corresponding to the twisted hole, rotation must be given in agreement with a twist of the columnar protrusion when the twisted columnar protrusion is formed by injection molding, and a molding die tends to become structurally complicated and large. Also, it is difficult to fabricate a molding die that can simultaneously mold a plurality of end members having the twisted columnar protrusions.

Further, according to the technique described in connection with Patent Document 1, on the occasion of unloading the process cartridge from an apparatus main body, rotation must be given in a direction opposite to a driving direction when the twisted columnar protrusion serving as a shaft bearing part is disengaged from the twisted hole of the drive shaft. This sometimes hinders performance of smooth disengagement.

In addition, it cannot be said that the shaft bearing part with the columnar protrusion, such as that described in connection with Patent Document 1, sufficiently smoothly enables removal engagement of the apparatus main body from the drive shaft while maintaining sufficient transmission accuracy of rotation. For instance, without a superior configuration relationship between the hole of the drive shaft and the shaft bearing part, drive force is not appropriately transmitted, or an area of a contact region between the hole and the shaft bearing part becomes smaller, which often causes a problem of flaws or dents being caused by concentration of forces.

Accordingly, in light of the problems, the invention aims at providing a rotating part that enables smooth removal loading of a photosensitive drum to an apparatus main body while sufficiently transmitting rotational drive force and that also exhibits superior productivity.

Solution to Problem

It is therefore an aspect of the invention to provide a rotating part used in an image forming apparatus comprising:
a drive member for transmitting power; and
a driven member that is rotated by the drive member, wherein
one of the drive member and the driven member has a male part formed in a direction of a rotation axis;
a remaining one of the drive member and the driven member has a female part that is formed in the direction of the rotation axis and into which the male part is inserted;
the female part is a twisted triangular female part that assumes a triangular cross sectional profile in a direction perpendicular to the rotation axis, and a triangle which forms a cross section of a base and a cross section of a top is twisted at a predetermined angle with respect to the rotation axis;
the male part is a hexagonal male part whose cross section perpendicular to the rotation axis assumes a hexagonal shape; and
respective sides of the hexagonal cross section are equal to each other or a combination of relatively short sides with relatively long sides arranged in an alternating sequence.

The end portion of the hexagonal male part in a direction of the rotation axis may have a taper.

The hexagonal male part may include protrusions arranged to contact a contacting surface of the female part, the protrusions extending outward from an edge of a cross-section of the hexagonal male part.

The driven member may be a photosensitive drum.

A cartridge for forming an image may include the rotating part defined in the above.

It is another aspect of the invention to provide an image forming apparatus comprising the cartridge for forming an image defined in the above, wherein
the twisted triangular female part is formed in the drive member that rotates the driven member.

It is still another aspect of the invention to provide a rotating part comprising:
a removable driven member; and
a drive member that transmits rotating force to the driven member, wherein
the rotating part is a twisted triangular female part that assumes a triangular cross sectional profile in a direction perpendicular to a rotation axis, and the triangle is twisted with respect to the rotation axis at a base and a top; and the drive member has a hexagonal male part whose cross sectional profile perpendicular to the rotation axis is hexagonal, and the hexagonal male part rotates while inserted in the twisted triangular female part, thereby rotating the driven member.

The twisted triangular female part may twist by an angle θ from a first triangular shape at the top to a second triangular shape at the base from the perspective of an insertion direction of the twisted triangular female part, edges of the first and second triangular shapes may intersect at a series of inner and outer radial intersection points, with respect to an axial direction of the rotating part, a contact edge of the hexagonal male part which resides between the inner and outer radial intersection points when inserted into the twisted triangular female part may extend in the direction of an edge of a third triangular shape, which twists by an angle of η in addition to the angle θ, the first and third triangular shapes may intersect at a medial intersection point with the contact edge of the hexagonal male part, wherein an angle between a radial line, which extends from a rotation axis of the hexagonal male part to the medial intersection point, and the contact edge of the hexagonal male part may be:

$$\frac{\pi}{6} + \frac{\theta + \eta}{2}.$$

The first, second, and third triangular shapes may be equilateral triangular shapes.

A maximum length of the contact edge may be $$\frac{R}{2} \cdot \left(\tan\left(\frac{\eta}{2}\right) + \tan\left(\frac{\pi}{3} - \frac{\theta + \eta}{2}\right)\right)$$

where R is an outside radius of the triangular shapes measured from rotation axis of the hexagonal male part.

The hexagonal male part may have a hexagonal cross-sectional shape having edges of equal length.

The hexagonal male part may have a hexagonal cross-sectional shape having edges which alternate between relatively short and long lengths.

An end portion of the hexagonal male part may have a taper.

The male part may include primary and secondary side surfaces which extend in an axial direction away from the base of the male part towards an insertion end thereof, the primary and secondary side surfaces extending, respectively, from the long and short sides of the perimeter of the base.

The primary side surfaces may have a larger dimensional surface area than the secondary side surfaces.

The primary side surfaces may extend from the base of the male part to the insertion end of the male part, the secondary side surface each may extend from the base of the male part to respective tapered surfaces, and the tapered surfaces may extend from the secondary side surfaces, at an angle with respect to a parallel with the axial direction, to the insertion end of the male part.

The insertion end of the male part may be a flat hexagonal surface including a hole with extends axially through the male part.

The flat hexagonal surface may have a perimeter which includes alternating short and long sides.

The short sides of the perimeter of the flat hexagonal surface may be parallel with the long sides of the base.

The hexagonal male part has a base with a perimeter including alternating long and short sides.

The male part may include primary and secondary side surfaces which extend in an axial direction away from the base of the male part towards an insertion end thereof, the primary and secondary side surfaces extending, respectively, from the long and short sides of the perimeter of the base.

The primary side surfaces may have a larger dimensional surface area than the secondary side surfaces.

The primary side surfaces may extend from the base of the male part to the insertion end of the male part, the secondary side surfaces each may extend from the base of the male part to respective tapered surfaces, and the tapered surfaces may extend from the secondary side surfaces, at an angle with respect to a parallel with the axial direction, to the insertion end of the male part.

The insertion end of the male part may be a flat hexagonal surface including a hole with extends axially through the male part.

The flat hexagonal surface may have a perimeter which includes alternating short and long sides.

The long sides of the perimeter of the flat hexagonal surface may be parallel with the short sides of the base.

A short side of the short sides may extend from a first point to a second point in a clockwise direction with respect to a rotational axis of the rotating part such that the first point is further away from the rotational axis than the second point.

The image forming apparatus may further comprise:

a rotating part removable from the image forming apparatus, the rotating part including a twisted triangular female part; and a drive transmission member including a hexagonal male part configured to be inserted into the female part to drive and rotate the rotating part, the male part including a taper.

The long and short sides may intersect each other at a common angle of approximately 120°.

The male part may include primary and secondary side surfaces which extend in an axial direction away from the base of the male part towards an insertion end thereof, the primary and secondary side surfaces extending, respectively, from the long and short sides of the perimeter of the base.

The primary side surfaces may have a larger dimensional surface area than the secondary side surfaces.

The insertion end of the male part may be a flat hexagonal surface including a hole with extends axially through at least a portion of the male part.

The flat hexagonal surface may have a perimeter which includes alternation short and long sides.

The long sides of the perimeter of the flat hexagonal surface may be parallel with the long sides of the base.

The short sides of the perimeter of the flat hexagonal surface may be parallel with the short sides of the base.

The long and short sides, respectively, that form the base each may have a mid-point that marks a perpendicular intersection between the respective long or short side and a radial line extending from a rotational axis of the rotating part.

An image forming apparatus may comprise the imaging cartridge and the twisted triangular female part as a drive member for driving and rotating the rotating part.

By means of such a configuration, in the image forming apparatus, the male part of the rotating part is made up of a hexagonal male part and engaged with a female part made up of a twisted triangular female part. Hence, it is possible to prevent deformation of a specific area of an engagement part, which would otherwise be caused by exertion of excessive force, or use of an incompatible process cartridge.

Advantage of the Invention

The rotating part of the invention can be embodied as the one that sufficiently transmits rotational drive force from the apparatus main body to the photosensitive drum, enables smooth removal loading of the photosensitive drum unit into the apparatus main body, and has the shaft bearing part which also exhibits superior productivity. Moreover, it becomes possible to inhibit the drive shaft and the shaft bearing part from undergoing deformation, such as flaws and dents, on occasion of transmission of the rotational drive force.

DETAILED DESCRIPTION OF EMBODIMENTS

Rotating parts of embodiments of the invention are hereunder described by reference to the drawings.

First Embodiment

Figure 67:
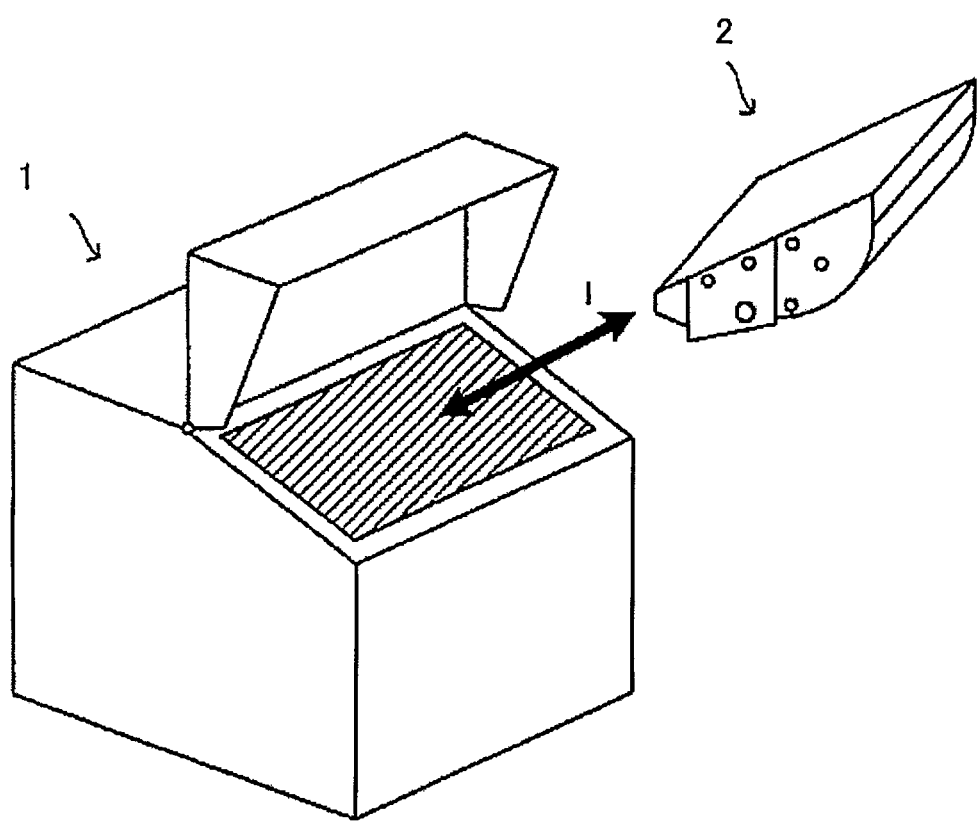
FIG. 67 is a schematic drawing for explaining an image forming apparatus.
Figure 68:
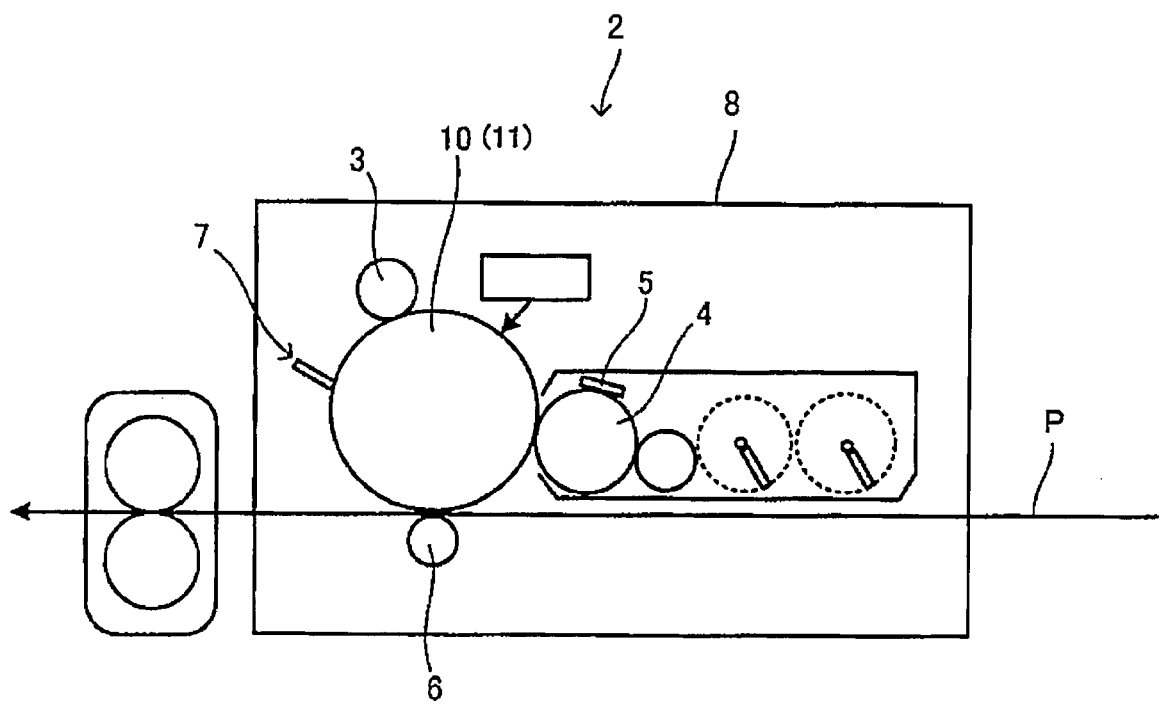
FIG. 68 is a schematic drawing showing a configuration of a process cartridge.

A drive shaft 20 of an embodiment makes up a portion of a rotating part and is used in; for instance, a process cartridge 2 having a photosensitive drum unit 10 shown in FIG. 68. The process cartridge 2 is removably fitted into an image forming apparatus main body 1 shown in FIG. 67. When the process cartridge 2 is loaded into an image forming apparatus, the image forming apparatus functions as; for instance, a laser printer, a copier, a facsimile machine, and the like.

The process cartridge 2 has a housing 8 that makes up a contour of the process cartridge, and various parts are encapsulated in the housing 8. Specifically, in the embodiment, the housing 8 has the photosensitive drum unit 10, an electrifying roller 3, a developing roller 4, a regulatory part 5, transfer means 6, and a cleaning blade 7. As a result of a medium, like paper, travels through an inside of the process cartridge 2 along a line designated by P shown in FIG. 68, whereby an image is formed on the medium.

Moreover, removal fitting of the process cartridge 2 into the apparatus main body 1 is carried out in substantially the following manner. The photosensitive drum unit 10 provided in the process cartridge 2 rotates upon receipt of rotational drive force from the apparatus main body 1. Consequently, at least at the time of operation, the drive shaft 20 of the apparatus main body 1 and a hexagonal male part 22 of the photosensitive drum unit 10 that makes up a shaft bearing part must remain in engagement with each other. In the meantime, at the time of removal fitting of the process cartridge 2 into the apparatus main body 1, the drive shaft 20 of the apparatus main body 1 must be out of engagement with the hexagonal male part 22 of the photosensitive drum unit 10.

Accordingly, the drive shaft 20 of the apparatus main body 1 is configured so as to be able to move along its axial direction. At the time of removal fitting of the process cartridge 2, the drive shaft 20 stands disengaged from the hexagonal male part 22 of the photosensitive drum unit 10. In the meantime, after the process cartridge 2 is loaded into the apparatus main body 1, the drive shaft 20 is moved into engagement with the hexagonal male part 22 of the photosensitive drum unit 10.

As above, it is preferable that the drive shaft 20 of the apparatus main body 1 and the hexagonal male part 22 of the photosensitive drum unit 10 should transmit adequate rotational drive force and smoothly enter into engagement with or come out of engagement from each other.

The configuration of respective parts of the image forming apparatus is hereinbelow described.

As mentioned above, the process cartridge 2 is equipped with the electrifying roller 3, the developing roller 4, the regulatory part 5, the cleaning blade 7, and the photosensitive drum unit 10. Each of them is configured as follows.

The electrifying roller 3 electrifies an OPC drum 11 of the photosensitive drum unit 10 by application of a voltage from the image forming apparatus main body 1. This is carried out when the electrifying roller 3 rotates while following the OPC drum 11 and comes into contact with an outer peripheral surface of the OPC drum 11.

The developing roller 4 is a roller that feeds developing powder to the OPC drum 11. The developing roller 4 develops an electrostatic latent image created on the OPC drum 11. A stationary magnet is housed in the developing roller 4.

The regulatory part 5 is one that adjusts an amount of developing powder to adhere to the outer peripheral surface of the developing roller 4 and that imparts frictional electrifying charges to the developing powder. The cleaning blade 7 is a blade that contacts the outer peripheral surface of the OPC drum 11 and eliminates the developing powder still remaining on the outer peripheral surface with a leading end of the blade after transfer.

Figure 69:
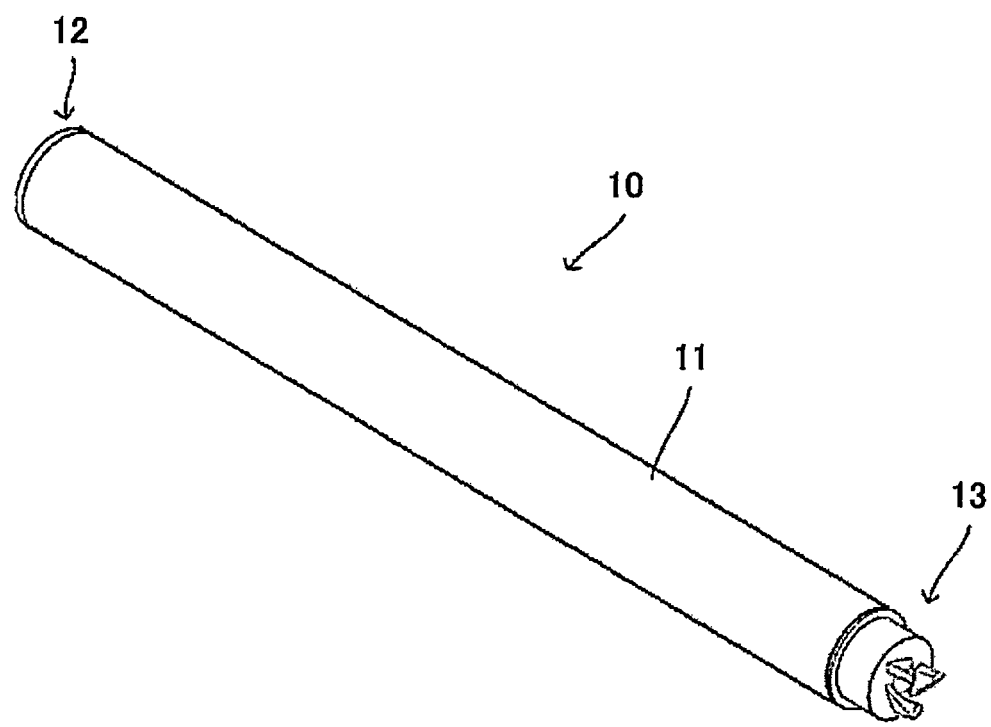
FIG. 69 is an external perspective view of a photosensitive drum unit.

The photosensitive drum unit 10 has the OPC drum 11, and characters, pictures, and the like, to be transferred to a recording medium are created on the OPC drum 11. FIG. 69 shows an external perspective view of the photosensitive drum unit 10. As can be seen from FIG. 69, the photosensitive drum unit 10 has the OPC drum 11, a cap member 12, and an end part 13.

The OPC drum 11 is a part made by covering an outer peripheral surface of a cylindrical base substance with a photosensitive layer. Characters, pictures, and others, to be transferred onto a recording medium, like paper, are created on the photosensitive layer.

The base substance is cylindrically formed from a conductive material, like aluminum or an aluminum alloy. Specific limitations are not imposed on the type of aluminum alloy used for the base substance. However, it is preferable that the aluminum alloy should be any of 6000-series, 5000-series, or 3000-series aluminum alloys which are set by the JIS standards and often used as a base substance of a photosensitive drum.

Moreover, the photosensitive layer formed over the outer peripheral surface of the base substance is not particularly limited. A known photosensitive layer can be applied for any purpose.

The base substance can be manufactured by formation of a cylindrical shape through the use of cutting, extrusion, drawing, or the like. The OPC drum 11 can be manufactured by applying in layers a photosensitive layer over the outer peripheral surface of the base substance.

The end part 13 is attached to one end of the OPC drum 11, and the cap member 12 is placed on the other end of the same.

The cap member 12 is one made of a resin and includes a coaxial combination of a fitting part to be fitted to a cylindrical inside of the OPC drum 11 and a shaft bearing part placed so as to cover one end face of the OPC drum 11. The shaft bearing part has an area that assumes a disk shape covering the end face of the OPC drum 11 and that receives a shaft. The cap member 12 is provided with an earth plate made of a conductive material and thereby electrically connects the OPC drum 11 to the apparatus main body 1.

Although the embodiment describes an example of the cap member, the cap member is not restricted to the example. A cap member having another form that is commonly assumed is also applicable. For instance, the cap member can also have cogs for transmitting rotational force. In addition, the conductive material can also be provided on a side of the end part 13.

Another configuration is also available, wherein a conducting plate (an earth plate) is provided on the side of the end part 13 having the hexagonal male part 22 and wherein the conducting plate is brought into contact with an electrode provided on a side of the apparatus main body 1 close to the drive shaft 20, thereby bringing the OPC drum 11 into electrical conduction. On that occasion, there can be mentioned a technique for forming the hexagonal male part 22 itself from a conductive material, a technique for making the conducting plate exposed to an inner periphery of the hexagonal male part 22, and the like.

Manipulation and operation of the above-described image forming apparatus are now described.

In relation to fitting of the process cartridge 2 into the apparatus main body 1, the process cartridge 2 is loaded into the apparatus main body 1 along a predetermined guide as shown in FIG. 67. The drive shaft 20 of the apparatus main body 1, at this time, stands receded from a trajectory of movement of the process cartridge 2.

After the process cartridge 2 is housed in a predetermined location of the apparatus main body 1, the drive shaft 20 moves toward the process cartridge 2 in synchronism with operation for closing the cap of the main body 1 or by means of another operation, whereupon the hexagonal male part 22 is fitted into a twisted triangular female part 24, which makes up a recess formed in the drive shaft 20, so that both the male part 22 and the female part 24 are coaxially engaged. Rotational drive force is thereby transmitted from the apparatus main body 1 to the hexagonal male part 22, the end part 13, and the OPC drum 11 so that the OPC drum 11 can rotate around an axis synchronously. Further, the rotational drive force originating from the apparatus main body 1 is also transmitted to another constituent part (e.g., electrifying means 4) provided in the process cartridge 2 directly or by way of another part, so that the other constituent part also becomes rotatable.

The image forming apparatus is activated while the process cartridge 2 is loaded and while the OPC drum 11, and the like, stands rotatable. When desired characters and drawings are represented on the recording medium, rotational drive force is imparted from the apparatus main body 1, whereupon the photosensitive drum unit 10 rotates and the OPC drum 11 is electrified by the electrifying roller 3.

The OPC drum 11 is exposed to a laser beam corresponding to image information by use of unillustrated various optical members while the photosensitive drum unit 10 is in the course of rotation, thereby creating an electrostatic latent image based on the image information. The latent image is developed by the developing roller 4.

In the meantime, the recording medium, like paper, is set to another area of the apparatus main body 1, conveyed to a transfer position by means of feed rollers, conveyor rollers, and other rollers provided in the apparatus main body 1, and moved along an arrow shown in FIG. 68. The transfer means 6 is placed at the transfer position. A voltage is applied to the transfer means 6 along with passage of the recording medium, whereby the image is transferred from the OPC drum 11 to the recording medium. Subsequently, the recording medium is subjected to heat and pressure, whereby the image is fixed on the recording medium. The recording medium on which the image is created is output from the apparatus main body 1 by means of output rollers, or the like.

As to the OPC drum 11, the cleaning blade 7 contacts the outer peripheral surface of the OPC drum 11 to eliminate, with its leading end, the developing powder, which is still left on the surface after transfer, in preparation for the next image. The developing powder scraped by the cleaning blade 7 is output as publicly known.

In view of manipulation and operation of the image forming apparatus, there are many opportunities to removably attach the process cartridge. At the occasion of operation of the image forming apparatus 1, the OPC drum 11 is understood to undergo heavy load resultant of repeated rotation and suspension and also experiences harsh conditions, electrification, and heating. In addition to exhibiting the fundamental function, like appropriate transmission of rotational drive force, by means of the aforementioned form of the hexagonal male part 22, the invention enables assurance of sufficient accuracy in rotation by means of the contour of the hexagonal male part 22. Moreover, the hexagonal male part 22 does not have any twisted shape or an undercut and, hence, removable attachment of the twisted triangular female part 24 to the hexagonal male part 22 is also easy.

In light of production of the hexagonal male part 22, since the male part 22 has neither the twisted shape nor the undercut, filling a die assembly with a material and easy removal of molded products from the die assembly can be enhanced, so that productivity can be improved. Further, mechanisms for rotating slide cores and dies become obviated, so that a configuration of the molding die can be simplified.

The embodiment shows a first example in which the hexagonal male part 22 is formed in the OPC drum 11 and the twisted triangular female part 24 is formed in the drive part. The hexagonal male part 22 comes into engagement with the twisted triangular female part 24, thereby transmitting rotational drive force from the drive part to the OPC drum 11.

Incidentally, the twisted triangular female part can be formed in the OPC drum 11, and the hexagonal male part can also be formed in the drive part.

Figure 1:
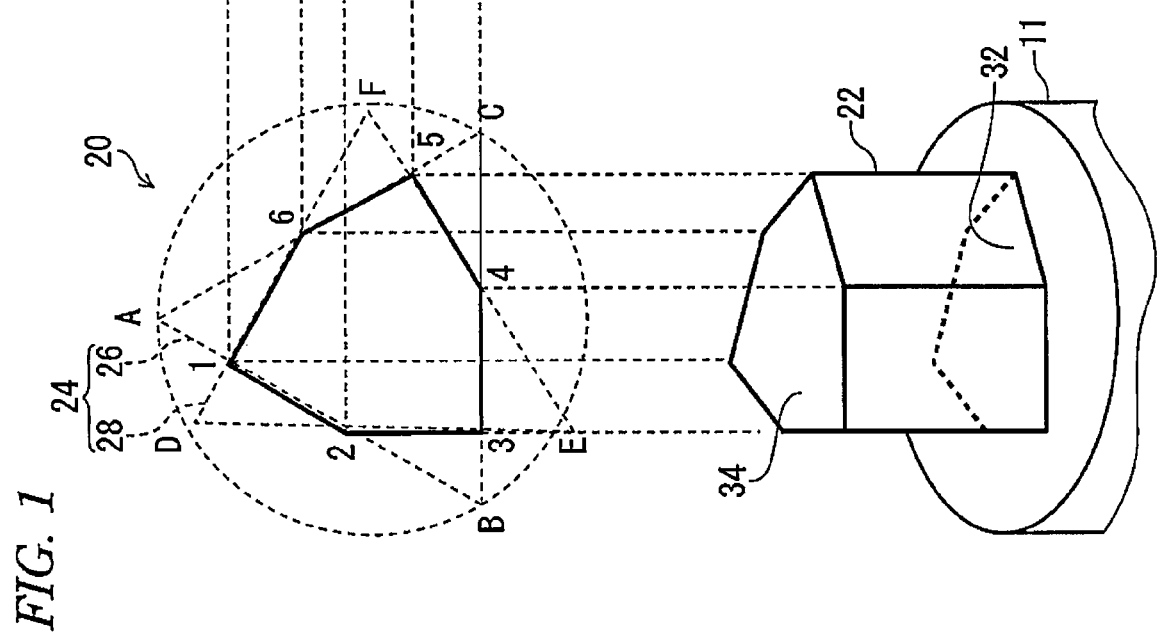
FIG. 1 is a schematic drawing showing correspondence between a hexagonal male part and a twisted triangular female part of a first embodiment.
Figure 2A:
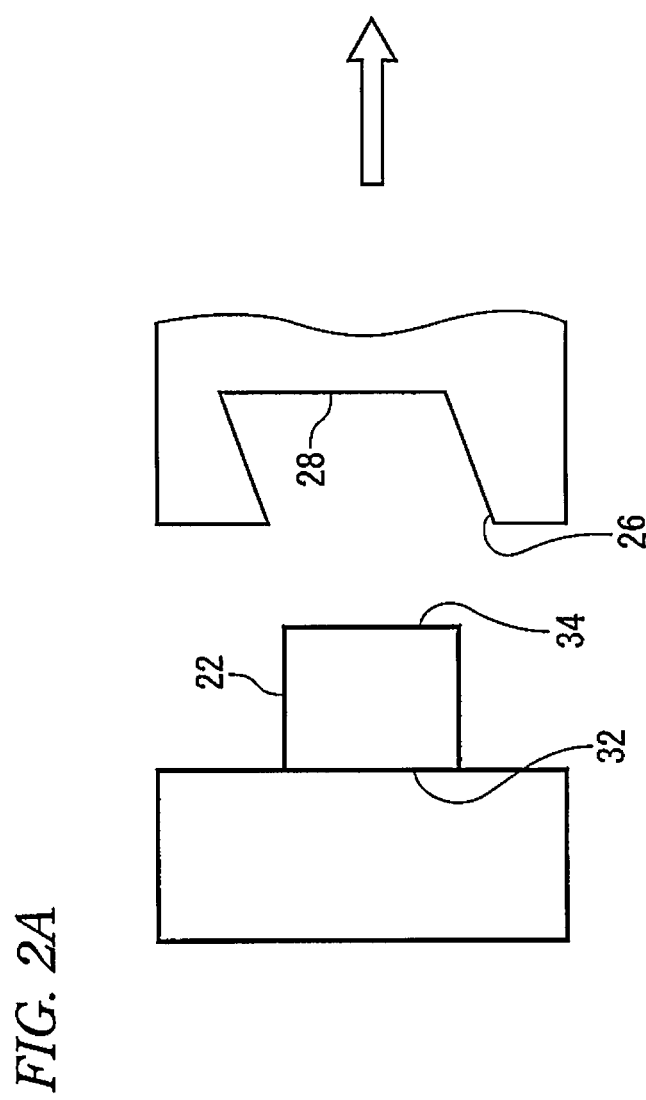
FIG. 2A is a drawing schematically showing a state of non-engagement of, and a state of engagement of, the hexagonal male part with the twisted triangular female part of the first embodiment.
Figure 2B:
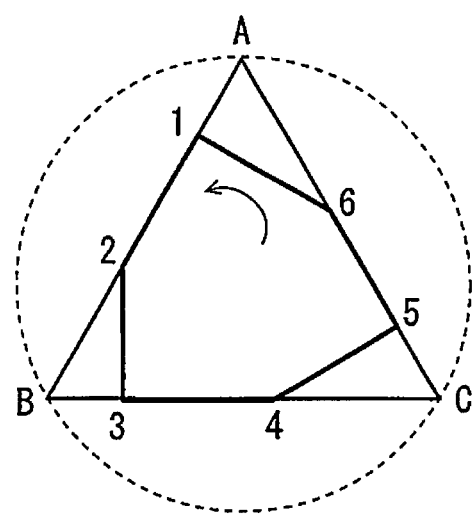
FIG. 2B is a drawing schematically showing a state of engagement of the hexagonal male part with the twisted triangular female part at a top of the twisted triangular female part.
Figure 3A:
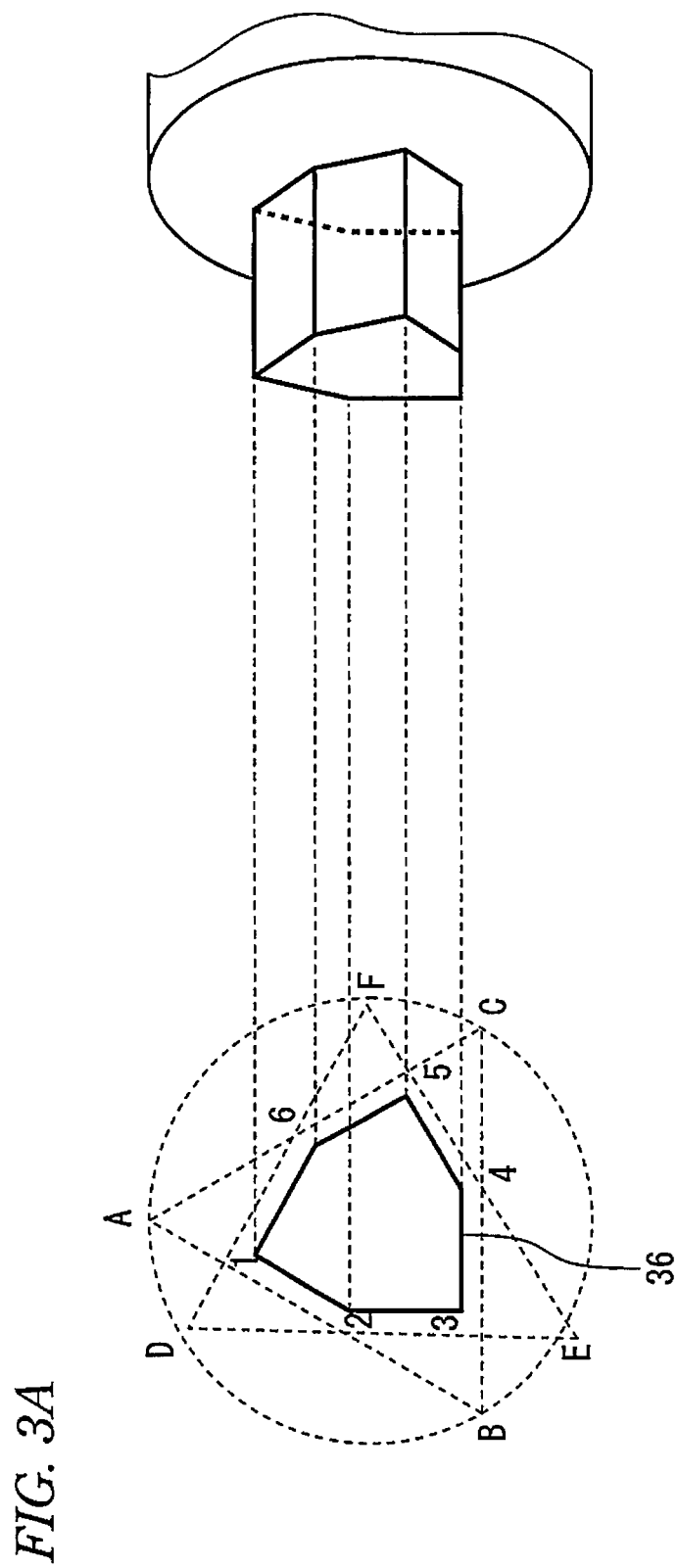
FIG. 3A is a schematic drawing showing correspondence between a hexagonal male part and the twisted triangular female part of a second example.
Figure 3B:
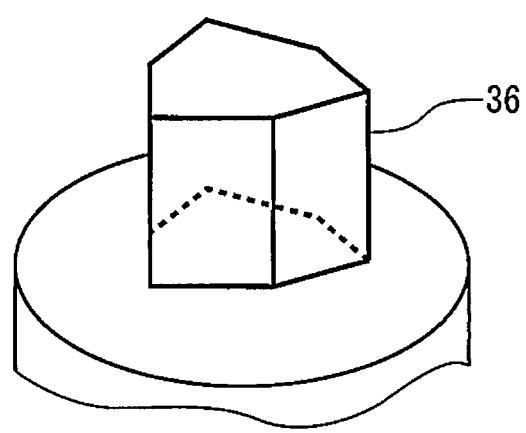
FIG. 3B is a perspective view of the hexagonal male part.

As illustrated as a first example in FIGS. 1, 2A, and 2B, the twisted triangular female part 24 is formed such that a cross section perpendicular to a rotation axis of the female part becomes twisted from a triangle ABC to another triangle DEF with respect to a direction of insertion. In the twisted triangular female part 24, a location where the triangle ABC is made is referred to as a top 26 of the twisted triangular female part 24, and a location where the triangle DEF is made is referred to as a base 28 of the twisted triangular female part 24. Further, in the hexagonal male part 22, a main body side of the OPC drum 11 is referred to as a base 32 of the hexagonal male part 22, and the side of the OPC drum 11 opposite to its base with respect to the direction of insertion is referred to as an end 34. The hexagonal male part 22 contacts the twisted triangular female part 24 by way of contact points 1 to 6, whereby drive force is transmitted to the OPC drum 11.

As shown in FIG. 2A, the end 34 of the hexagonal male part 22 is inserted to a position where the end contacts the base 28 of the twisted triangular female part 24, whereby the hexagonal male part 22 and the twisted triangular female part 24 rotate in an integrated fashion as shown in FIG. 2B.

Alternatively, a height of the hexagonal male part 22 can also be made shorter than a depth of the twisted triangular female part 24. Further, the hexagonal male part 22 and the twisted triangular female part 24 can also rotate in an integrated fashion while the end 34 of the hexagonal male part 22 remains out of contact with the base 28 of the twisted triangular female part 24.

Moreover, in the embodiment, each of the hexagonal male part 22 and the twisted triangular female part 24 have edges that are formed linearly so as to form the contact points 1 through 6. However, the edges can also be curved.

Figure 4A:
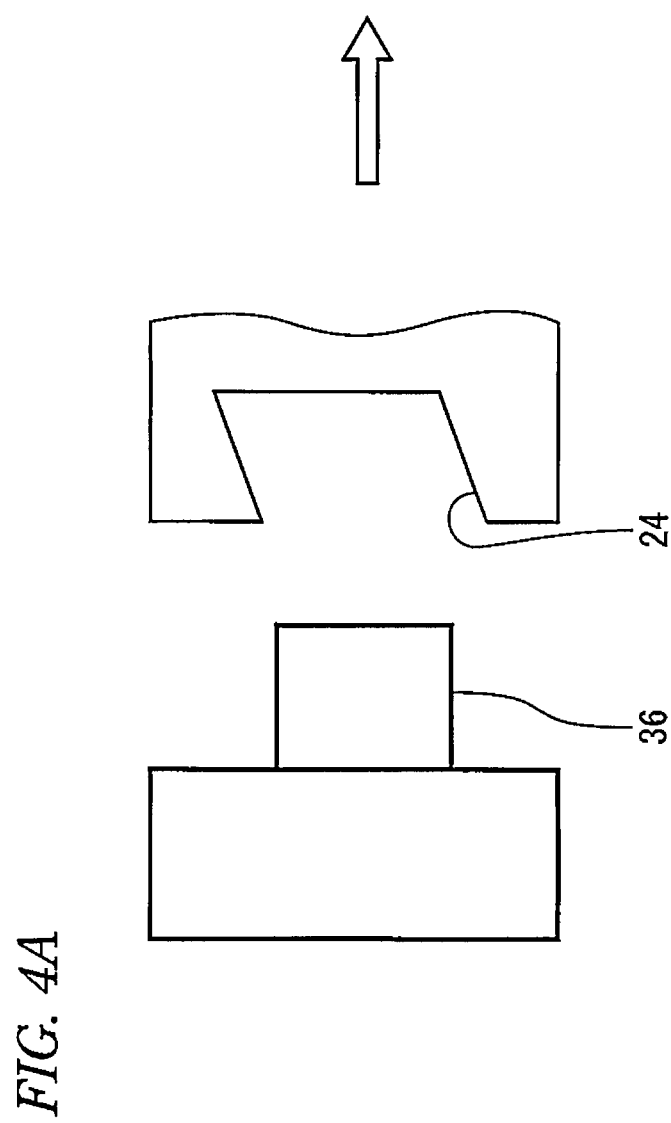
FIG. 4A is a drawing schematically showing a state of non-engagement of, and a state of engagement of, the hexagonal male part with the twisted triangular female part of the second example.
Figure 4B:
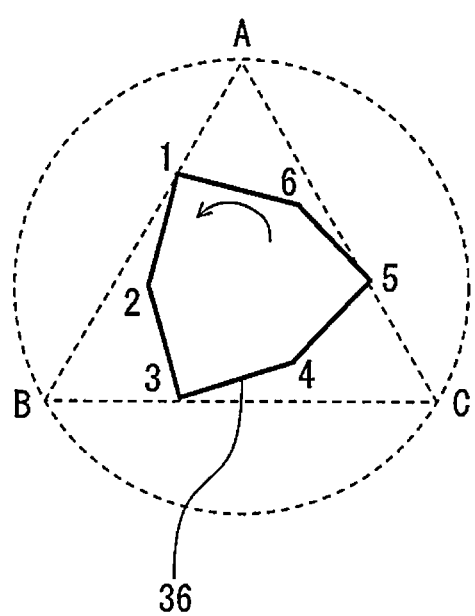
FIG. 4B is a drawing schematically showing a state of engagement of the hexagonal male part with the twisted triangular female part at a top of the twisted triangular female part.

As illustrated as a second example in FIGS. 3A, 3B, 4A, and 4B, a cross sectional area of a hexagonal male part 36 can also be made smaller than a cross sectional area of the hexagonal male part 22 of the first example. In this case, as shown in FIG. 4B, the tops 1, 3, and 5 of the tops 1 through 6 of the hexagonal male part 36 contact tops of the twisted triangular female part 24, whereby drive force is transmitted to the OPC drum 11.

Figure 5:
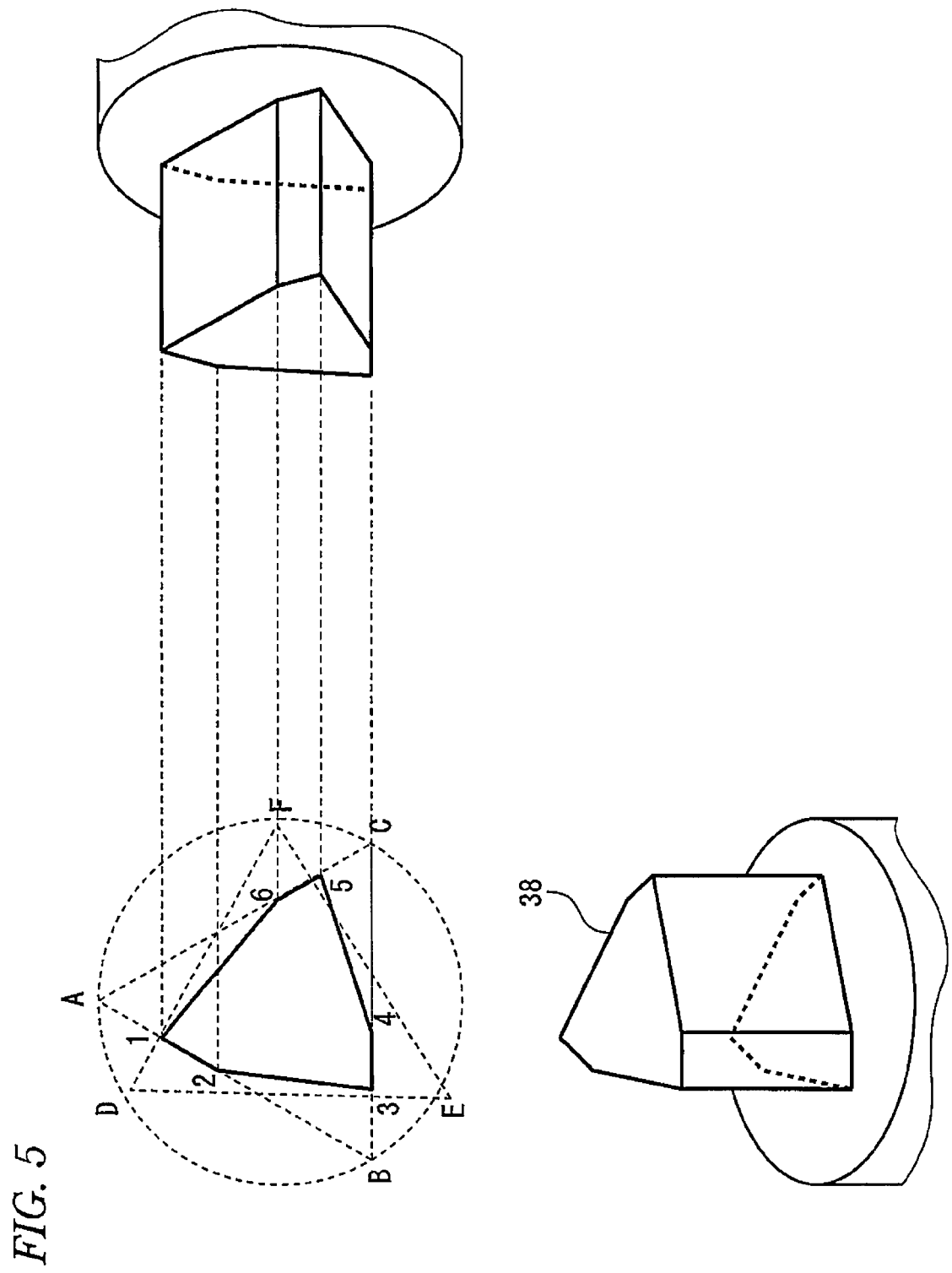
FIG. 5 is a schematic drawing showing correspondence between a hexagonal male part and the twisted triangular female part of a third example.
Figure 6A:
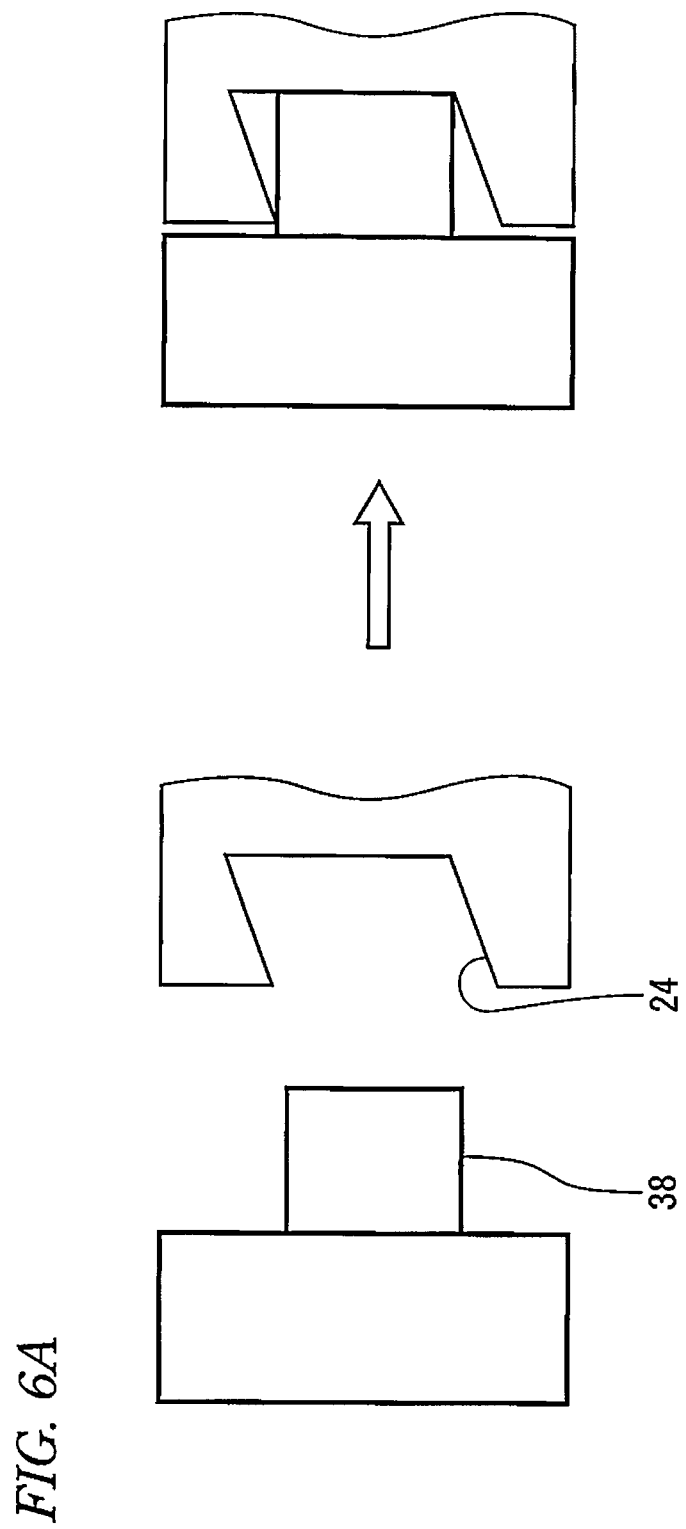
FIG. 6A is a drawing schematically showing a state of non-engagement of, and a state of engagement of, the hexagonal male part with the twisted triangular female part of the third example.
Figure 6B:
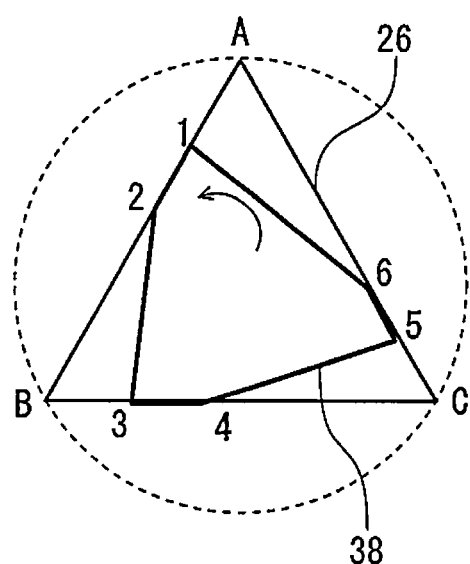
FIG. 6B is a drawing schematically showing a state of engagement of the hexagonal male part with the twisted triangular female part at a top of the twisted triangular female part.

As illustrated as a third example in FIGS. 5, 6A, and 6B, a hexagonal male part 38 can also be formed such that respective sides of the male part in its cross section; namely, edges, differ from each other in terms of a length. The example shows a case where a long edge and a short edge are formed in an alternating sequence. An edge 1-2 formed between tops 1 and 2, an edge 3-4 formed between tops 3 and 4, and an edge 5-6 formed between tops 5 and 6 are shorter than the other edges.

As shown in FIG. 6B, in this case, the edge 1-2, the edge 3-4, and the edge 5-6 contact the top 26 of the twisted triangular female part 24, whereby drive force is transmitted to the OPC drum 11.

Figure 7:
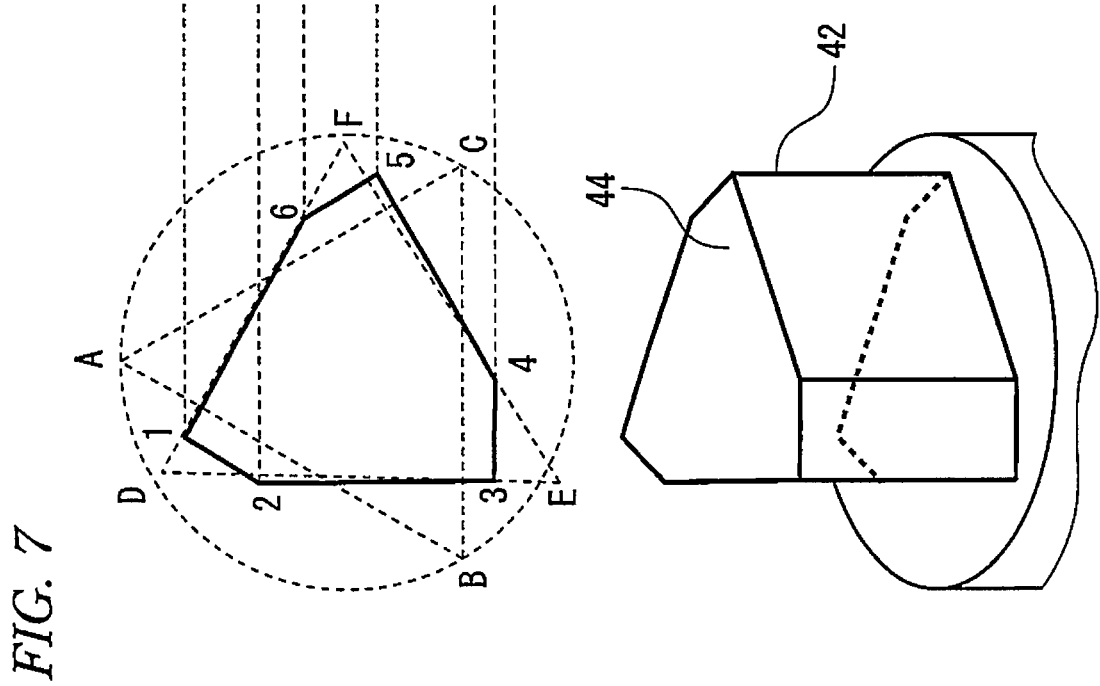
FIG. 7 is a schematic drawing showing correspondence between a hexagonal male part and the twisted triangular female part of a fourth example.
Figure 8A:
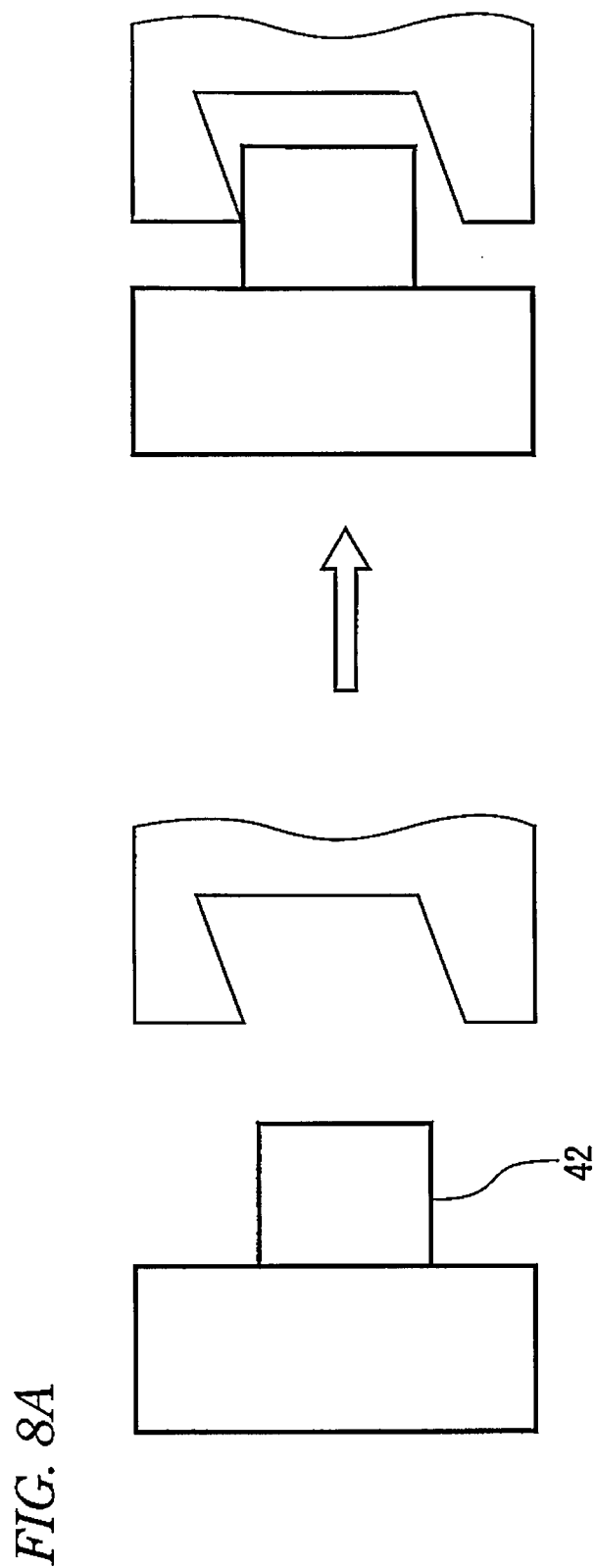
FIG. 8A is a drawing schematically showing a state of non-engagement of, and a state of engagement of, the hexagonal male part with the twisted triangular female part of the fourth example.
Figure 8B:
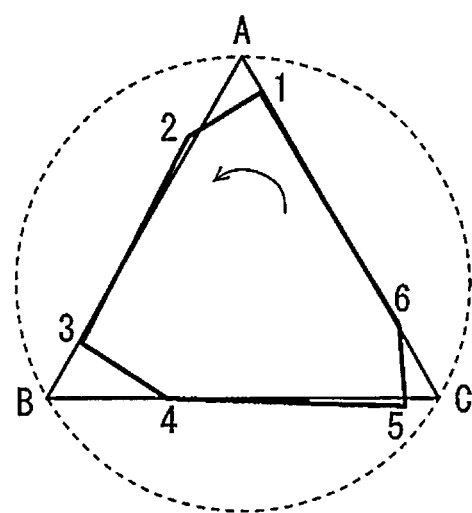
FIG. 8B is a drawing schematically showing a state of engagement of the hexagonal male part with the twisted triangular female part at a top of the twisted triangular female part.

FIGS. 7, 8A, and 8B show, as a fourth example, a hexagonal male part 42 resultant of deformation of the hexagonal male part 38 of the third example. In the fourth example, an edge 2-3 formed between the tops 2 and 3, an edge 4-5 formed between the tops 4 and 5, and an edge 6-1 formed between the tops 6 and 1 are longer than the edges 2-3, 4-5, and 6-1 of the third example.

As shown in FIG. 8A, in this case, a leading end of the hexagonal male part 42 interferes with an interior surface (a slope) existing between the top and the base of the twisted triangular female part 24. Therefore, a position on the hexagonal male part 42 that contacts the twisted triangular female part 24 shifts toward an end 44 of the hexagonal male part 42 when compared with the third example. Further, as shown in FIG. 8B, drive force is transmitted to the OPC drum 11 by way of the edge 2-3, the edge 4-5, and the edge 6-1.

Figure 9:
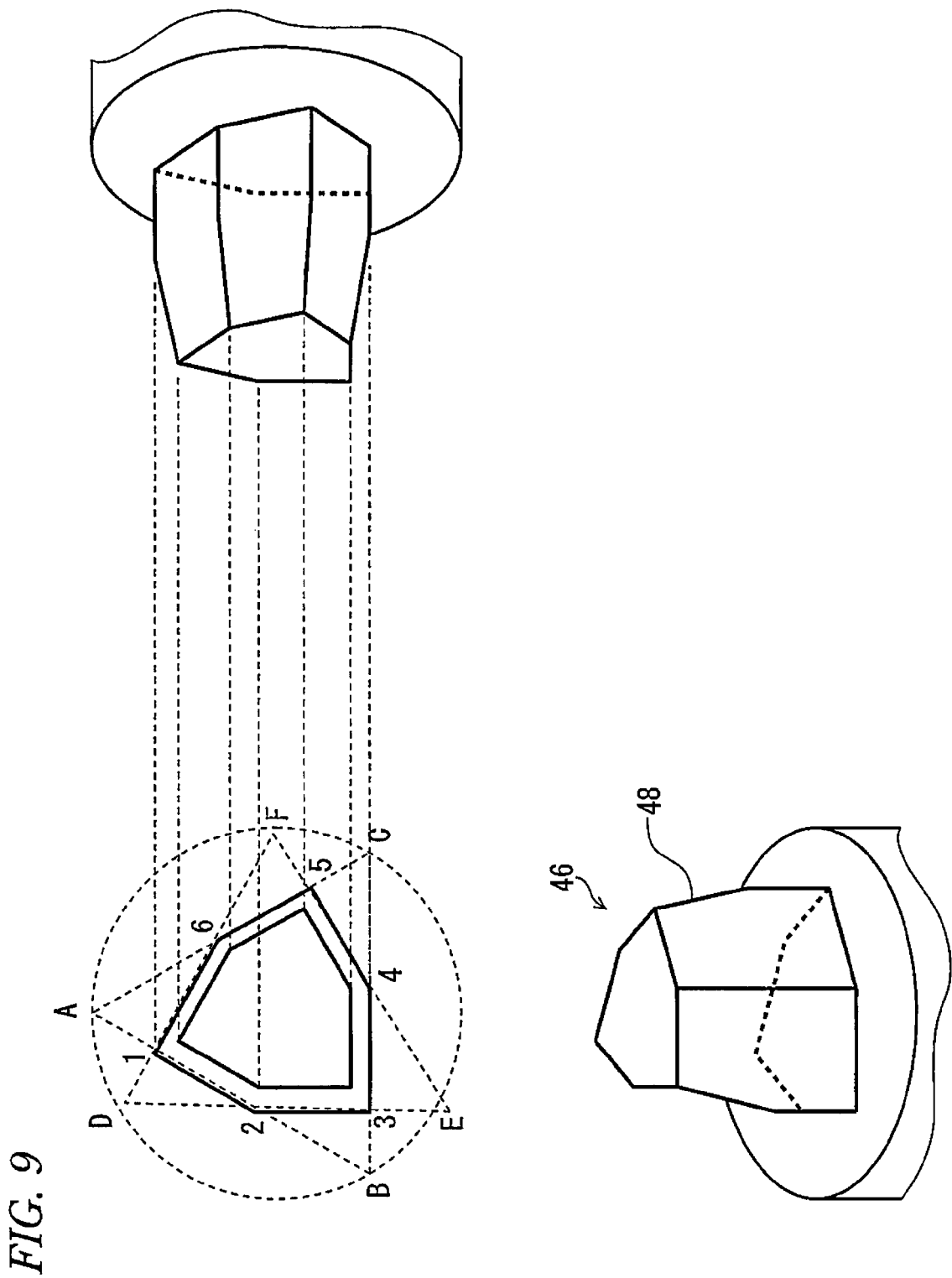
FIG. 9 is a schematic drawing showing correspondence between a hexagonal male part and the twisted triangular female part of a fifth example.
Figure 10A:
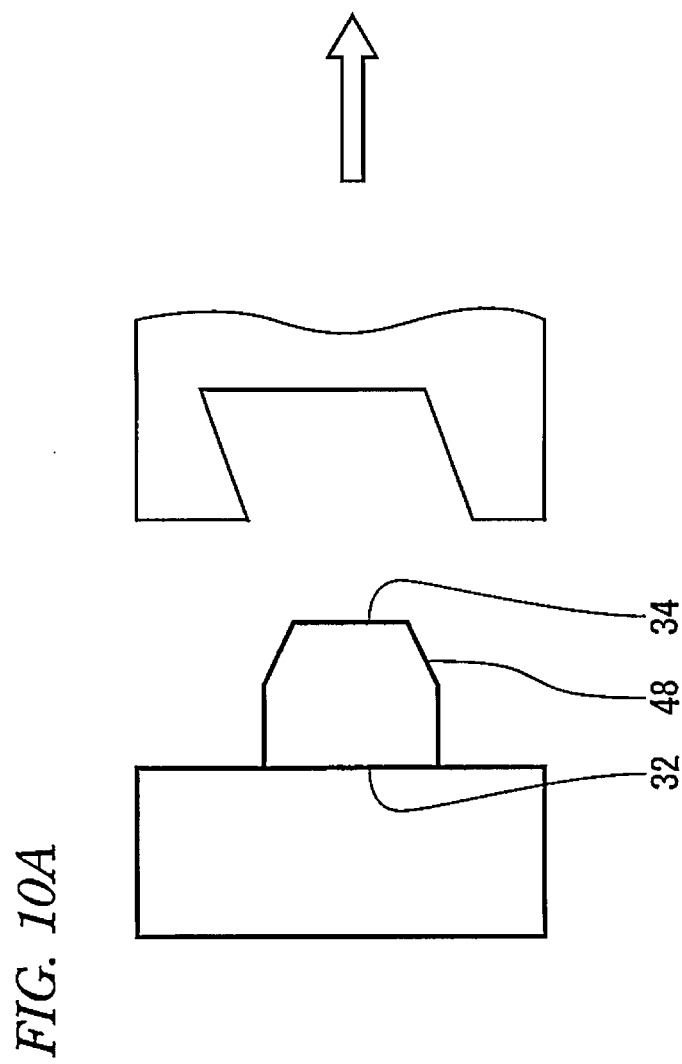
FIG. 10A is a drawing schematically showing a state of non-engagement of, and a state of engagement of, the hexagonal male part with the twisted triangular female part of the fifth example.
Figure 10B:
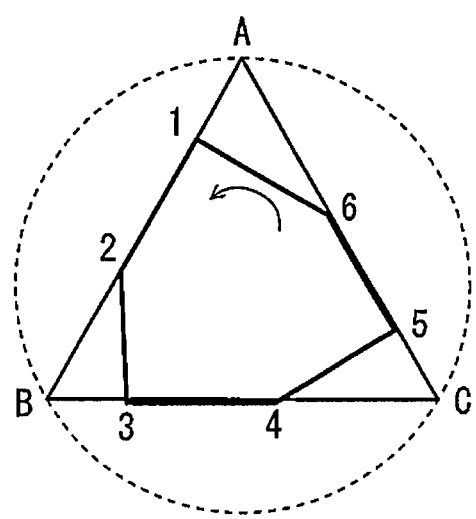
FIG. 10B is a drawing schematically showing a state of engagement of the hexagonal male part with the twisted triangular female part at a top of the twisted triangular female part.

Illustrated as a fifth example in FIGS. 9, 10A and 10B is a hexagonal male part 46 that has tapers 48 whose cross sectional area becomes narrower with an increase approach to the end 34. In the example, as is obvious from FIG. 10A, the individual taper 48 is formed from a substantial midway between the base 32 and the end 34 toward the end 34. A length of the individual taper 48, however, is arbitrary, and the tapers 48 can also be formed in an entire range from the base 32 to the end 34. Positions of the contact points between the hexagonal male part 46 and the twisted triangular female part 24 can be changed by adjusting a cross sectional area of the base 32 and the length of the tapers 48 of the hexagonal male part 42.

Adjusting the angle of the tapers 48 makes it possible to maximize the contact points between the hexagonal male part 46 and the twisted triangular female part 24 and reduce a risk of release of the hexagonal male part 46 from the twisted triangular female part 24 in the course of rotation.

The length ratios among the respective constituent elements mentioned in connection with the drawings are examples. When the elements are fabricated according to the drawings, the advantage of the invention can be yielded. However, adopting the length ratios provided in the drawings is not always inevitable.

Figure 11:
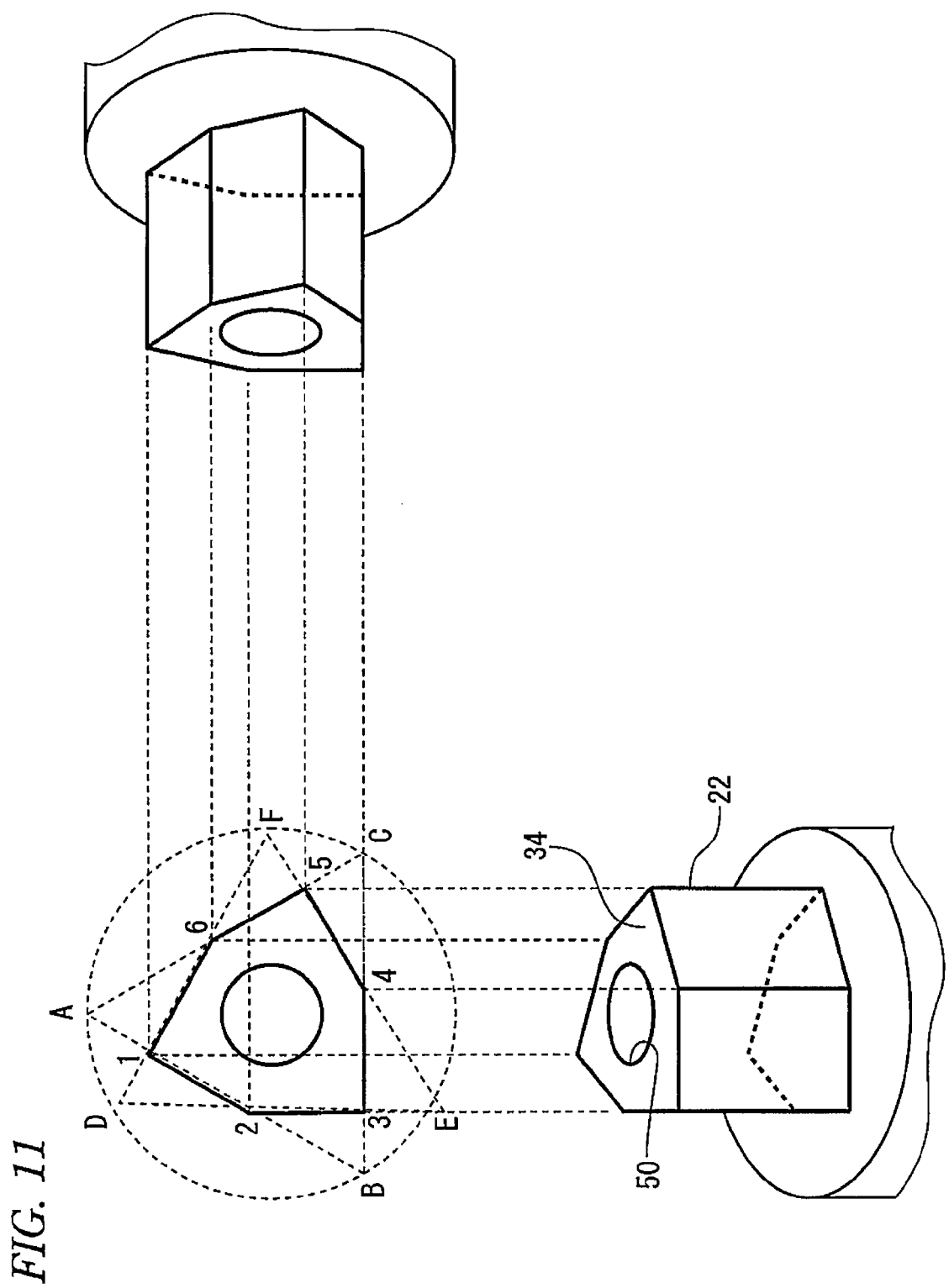
FIG. 11 is a schematic drawing showing correspondence between a hexagonal male part with a shaft hole and the twisted triangular female part.

Moreover, as shown in FIG. 11, a shaft hole 50 can also be formed in the hexagonal male part 22. The shaft hole 50 is formed; for instance, coaxially to a rotation axis, so as to have a predetermined depth from the end 34 of the hexagonal male part 22.

Figure 12:
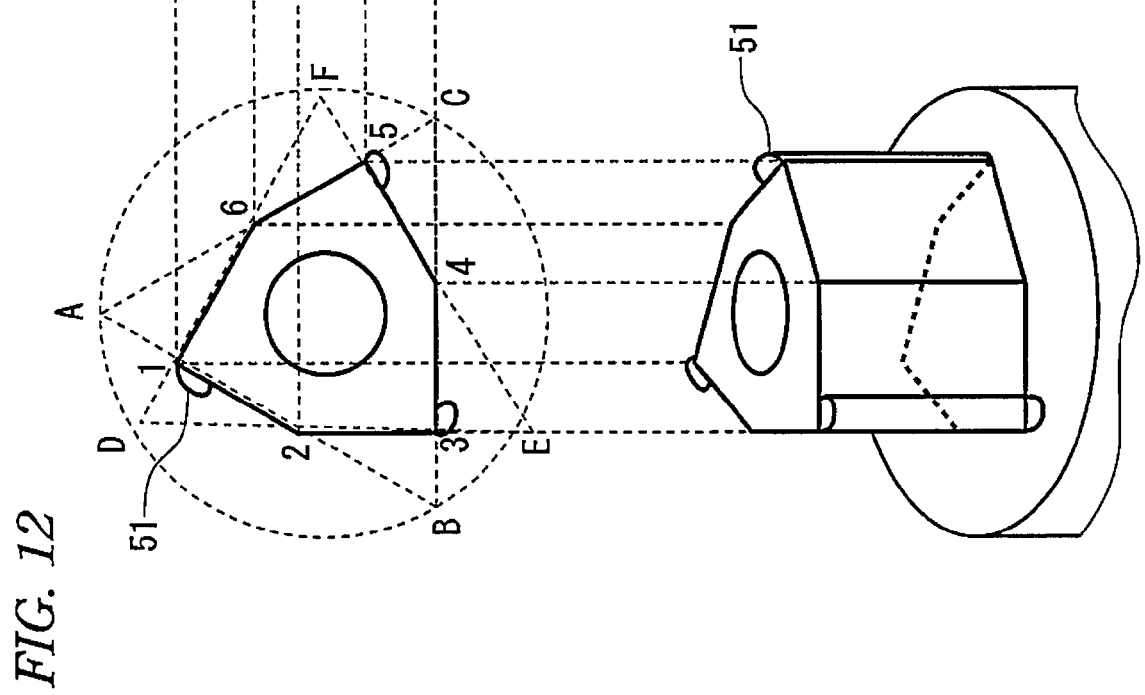
FIG. 12 is a schematic drawing showing correspondence between a hexagonal male part whose edges have protrusions and the twisted triangular female part.

Further, as shown in FIG. 12, protrusions 51 can also be formed along respective edges of the hexagonal male part 22. The protrusions 51 are formed along the respective edges of the hexagonal male part 22 in parallel with the direction of insertion. The protrusions 51 are made of flexible polymer. When the hexagonal male part 22 is inserted into the twisted triangular female part 24 and starts rotating, the protrusions 51 become distorted and deformed in agreement with the shape of the twisted triangular female part 24, so that a contact between the hexagonal male part 22 and the twisted triangular female part 24 becomes reliable.

Consequently, the protrusions 51 are formed into a rod shape from a material differing from a material of the hexagonal male part 22 and provided on the hexagonal male part 22 by means of a known technique, such as an adhesive and heating.

The protrusions 51 can also be made of the same material as that of the hexagonal male part 22. In this case, the hexagonal male part 22 and the protrusions are concurrently molded by means of; for instance, a plastic molding technique. As a result, the protrusions 51 can be formed so as to assume a narrow width. When the hexagonal male part 22 contacts the twisted triangular female part 24, the protrusions 51 become more easily dented, thereby rendering the contact between the hexagonal male part 22 and the twisted triangular female part 24 more reliable.

Figure 13:
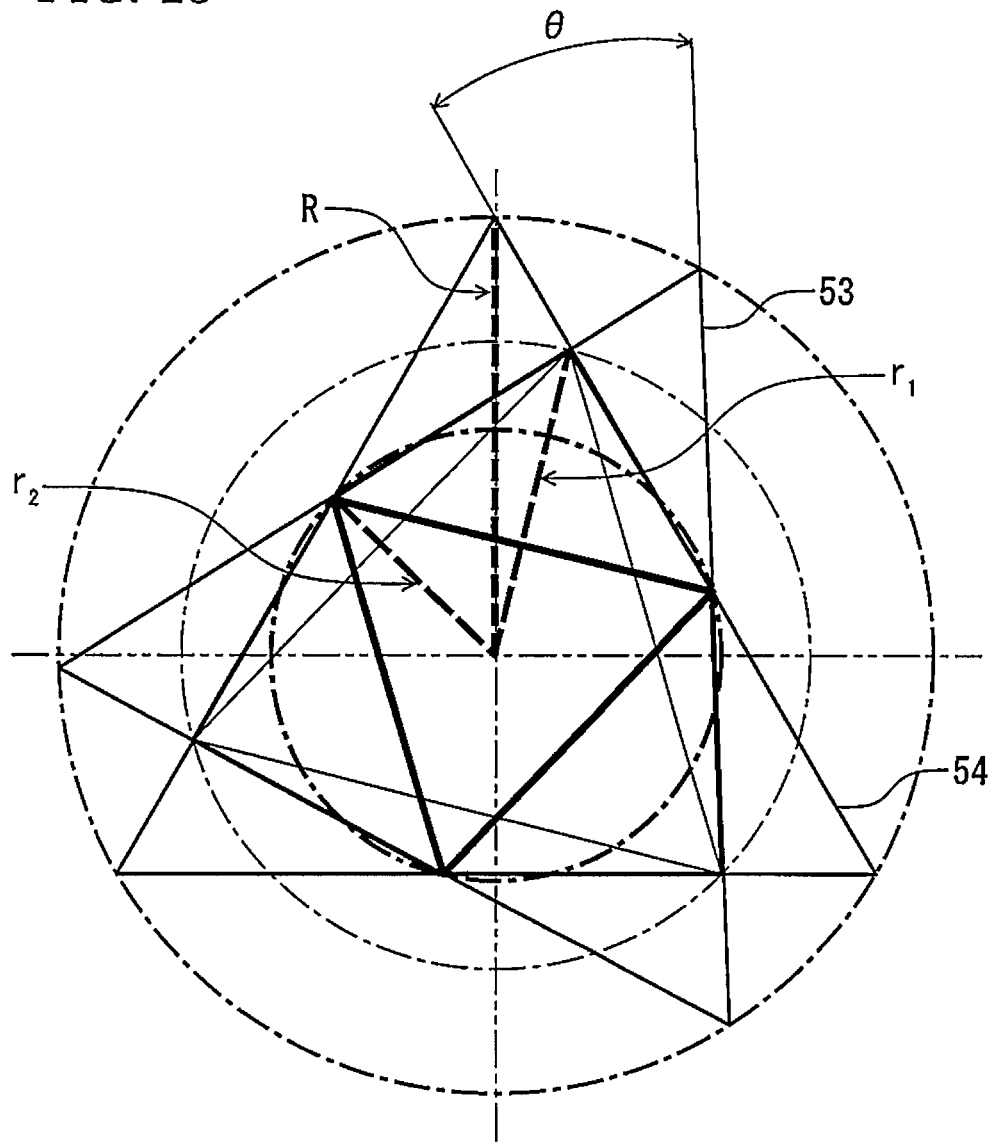
FIG. 13 is a schematic drawing for describing a dimension of the hexagonal male part engaged with the twisted triangular female part.

A cross sectional profile of the hexagonal male part 22 of the first example is hereunder described. FIG. 13 is a drawing for explaining a state of engagement of the hexagonal male part 22 with the twisted triangular female part 24 occurred when the cross sectional area of the hexagonal male part 22 is maximized. As indicated by a solid line in FIG. 13, a maximum cross section 56 of the hexagonal male part 22 can be expressed by means of two triangles 53 and 54 that form the top 26 and the base 28 of the twisted triangular female part 24.

Here, the cross section of the hexagonal male part 22 must be within the maximum cross section 56.

The radius of the circumscribed circles of those two triangles 53 and 54 is defined as follows:

$$r_1 = \frac{R}{\cos\left(\frac{\theta}{2}\right) + \sqrt{3} \cdot \cos\left(\frac{\theta}{2}\right)} \quad (1)$$

$$r_2 = \frac{R}{\cos(\varepsilon) + \sqrt{3} \cdot \cos(\varepsilon)} \quad (2)$$

$$\varepsilon = \frac{2\pi - 3\theta}{6} \quad (3)$$

Here, $R > r_1 > r_2$, where R is the outside radius of the two triangles 53 and 54, $r_1$ is a radius of a circumscribing circle which is circumscribed to three outer intersection points of the two triangles 53 and 54, and r2 is a radius of a circumscribing circle which is circumscribed to three inner intersection points of the two triangles 53 and 54. The two triangles 53 and 54 are offset by an angle $\theta$.

Figure 14:
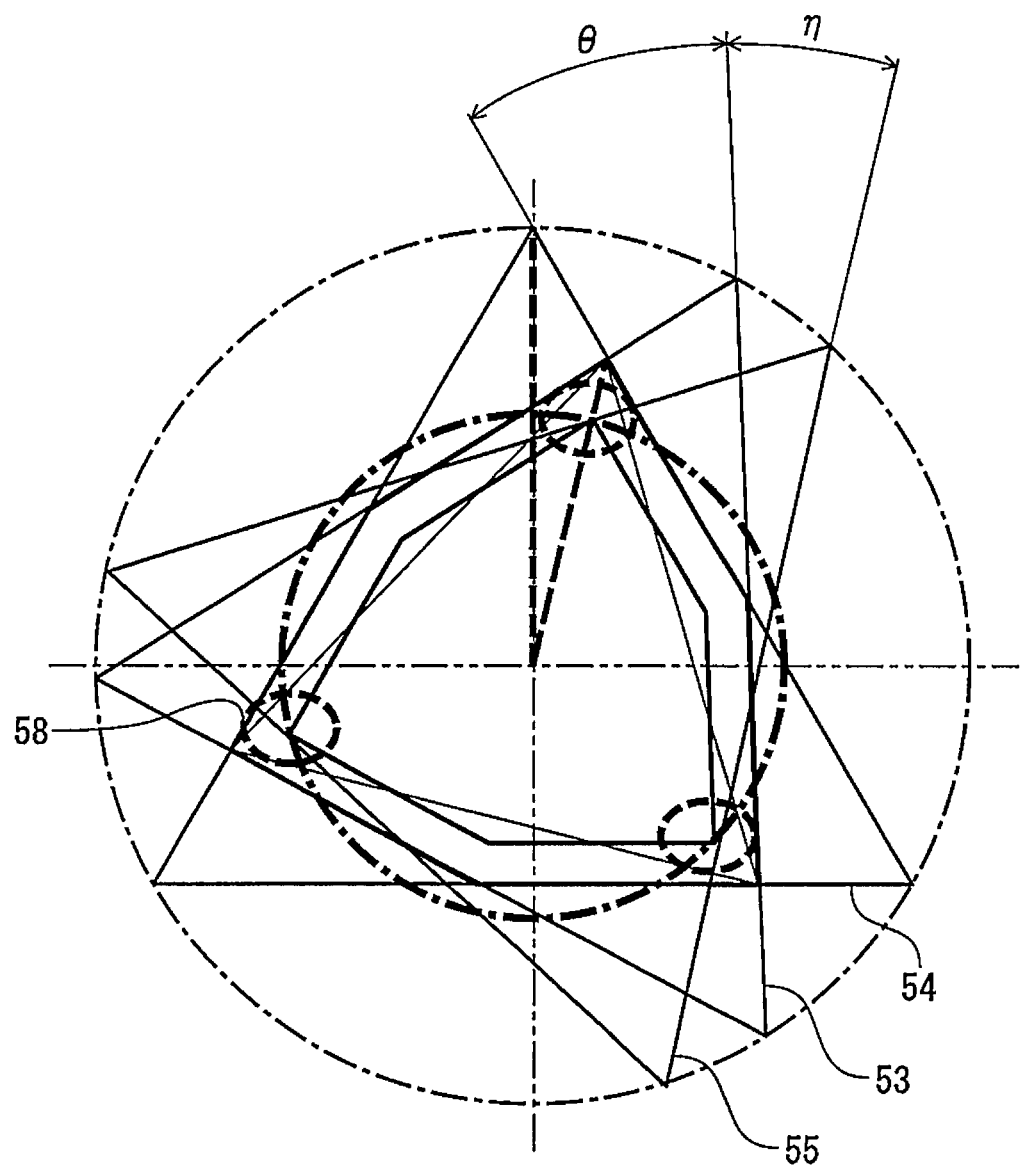
FIG. 14 is a schematic drawing for describing a dimension of the hexagonal male part engaged with the twisted triangular female part.

FIG. 14 shows a triangle 55 that is additionally offset by an angle $\eta$ as compared to a state shown in FIG. 13 in which the two triangles 53 and 54 are offset by an angle $\theta$. The hexagonal male part 22 is tapered from a predetermined location with respect to the base 32 in the direction of insertion up to the end 34. Specifically, the hexagonal male part 22 has tapers that extend from the predetermined location which is a starting point up to the end which is an end point.

At a position of a demarcation between a taper-free area and the starting point of the taper, the hexagonal male part 22 contacts a cross section of the triangle 54, which is offset by the angle $\theta$, of the twisted triangular female part 24. Moreover, the hexagonal male part 22 contacts a cross section of the triangle 55, which is offset by an angle $\theta+\eta$, of the twisted triangular female part 24 at the position of the end point of the taper.

Such a configuration enables the hexagonal male part 22 to be easily detached from the twisted triangular female part 24. Incidentally, as indicated by three circles 58 shown in FIG. 14, there arise regions in which only corners of edges of the hexagonal male part 22 contact the twisted triangular female part.

If the hexagonal male part 22 is formed, rather than being tapered, such that a cross sectional area of an area ranging from the base 32 to the end 34 becomes equal to a cross sectional area of the position of the end points of the tapers, the hexagonal male part 22 and the twisted triangular female part 24 may contact each other only at a position indicated by the three circles 58 shown in FIG. 14, to thus deform the twisted triangular female part 24.

Figure 15:
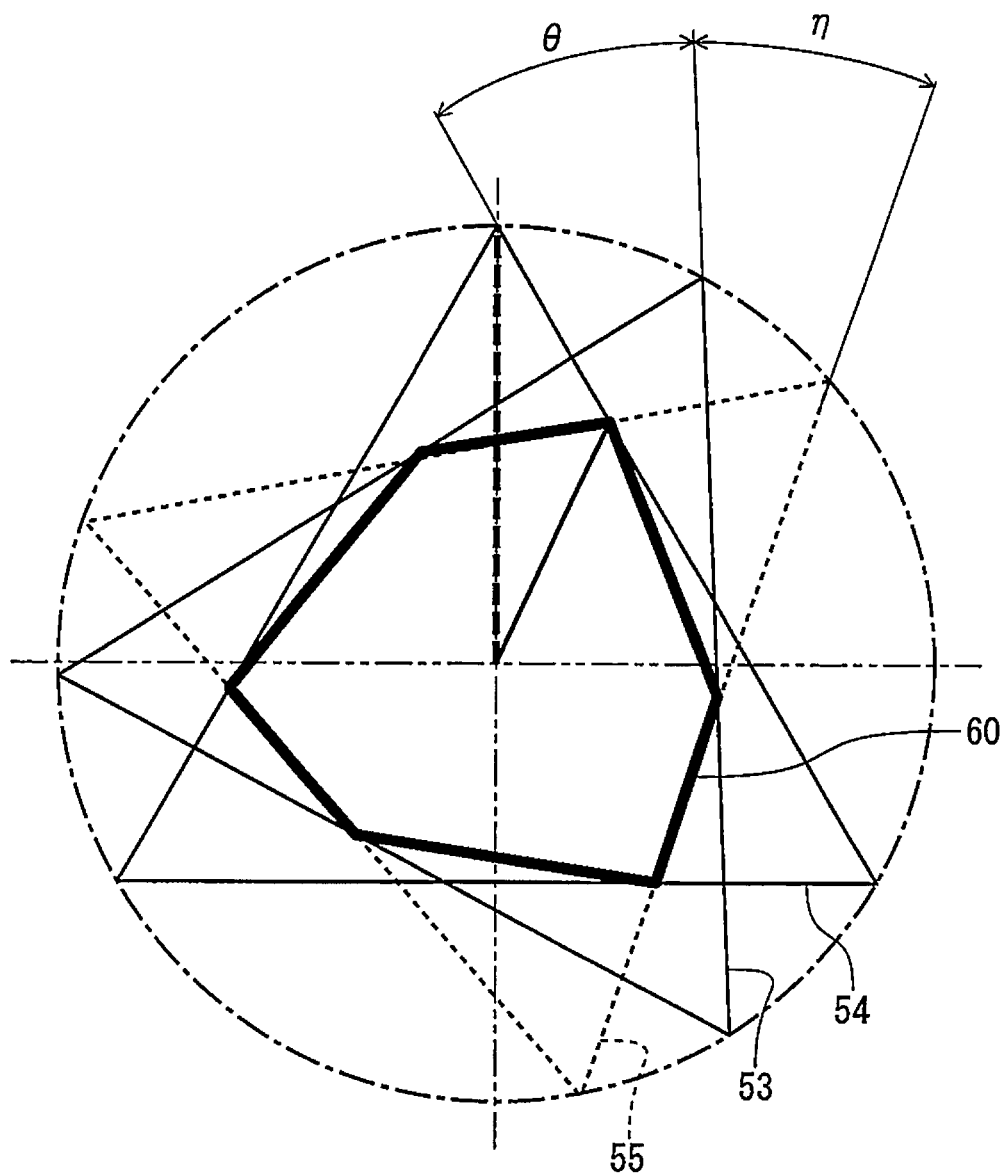
FIG. 15 is a schematic drawing for describing a dimension of the hexagonal male part engaged with the twisted triangular female part.

In the example shown in FIG. 15, an angle which a heavy line 60 (a line extending from the center axis of the hexagonal male part 22 to a point of intersection between the two triangles 54 and 55) forms with the triangle 55 is represented by Expression (4).

$$\frac{\pi}{6} + \frac{\theta + \eta}{2} \quad (4)$$

In FIG. 15, a torsion angle of the twisted triangular female part 24 is $\theta$, and a location where the hexagonal male part 22 contacts the twisted triangular female part 24 is offset by only the angle $\eta$. A gap exists between the cross section of the hexagonal male part 22 shown in FIG. 15 and a cross section of the hexagonal male part 22 at which the maximum cross sectional area is achieved. Therefore, when the torsion angle is $\theta$ and when the twisted triangular female part 24 and the hexagonal male part 22 are offset by only the angle $\eta$ when contacting each other at the time of rotation, the cross section of the hexagonal male part 22 assumes a contour in which an entire surface of the individual edge of the hexagonal male part 22 contacts an individual edge of the twisted triangular female part 24.

In this case, an angle which a line of the edge of the twisted triangular female part 24 forms with a line that extends from the rotation axis of the hexagonal male part 22 to the edge of the hexagonal male part 22 which contacts the twisted triangular female part 24 is set so as to assume an angle designated by Expression (4) or less.

Figure 16:
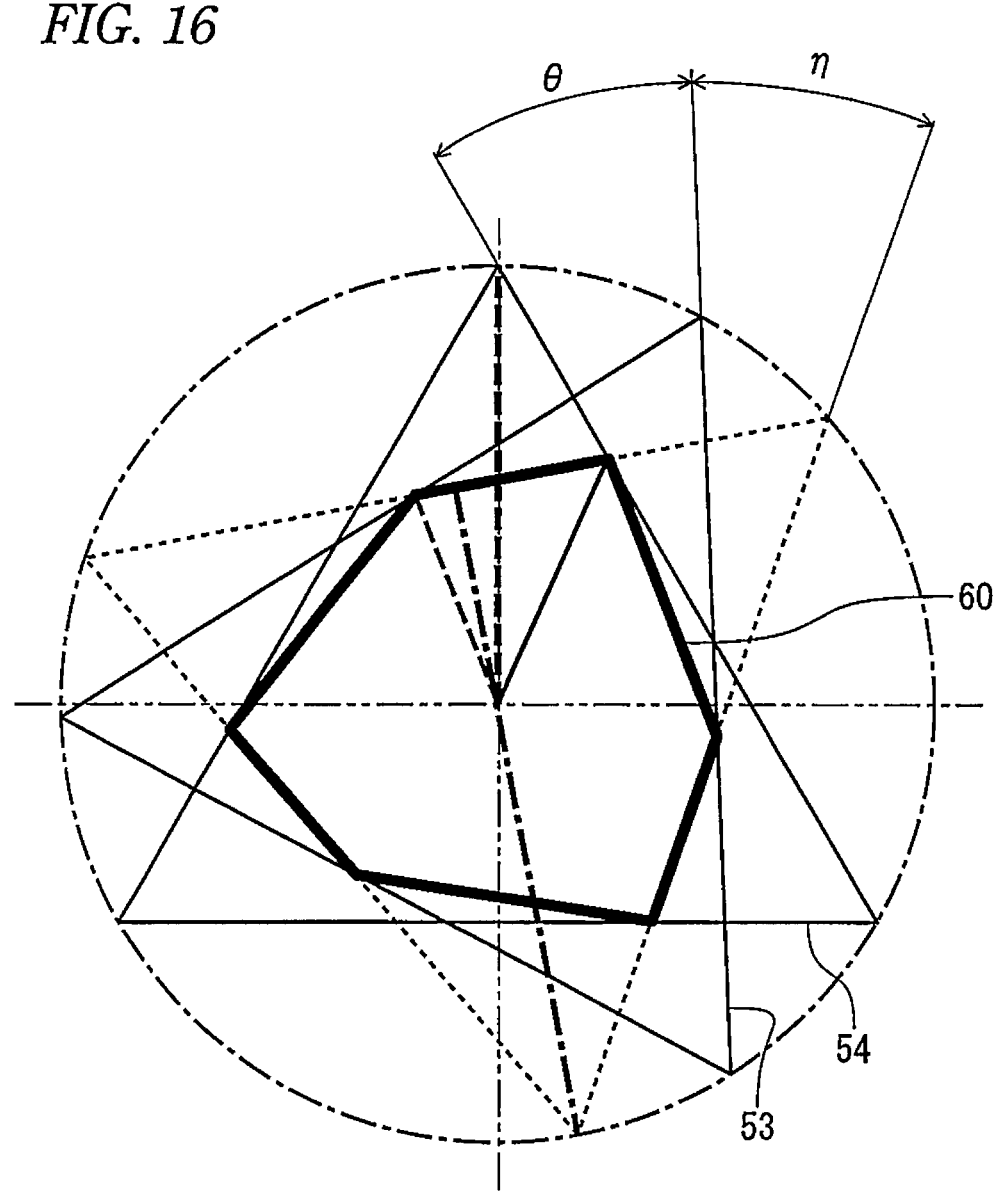
FIG. 16 is a schematic drawing for describing a dimension of the hexagonal male part engaged with the twisted triangular female part.

FIG. 16 shows an advancement of the shape and the structure shown in FIG. 15. In the configuration shown in FIG. 16, the cross section of the hexagonal male part 22 assumes a contour that contacts the edges of the twisted triangular female part 24 in the entire area.

In this case, a length of the edge of the hexagonal male part 22 that contacts the twisted triangular female part 24 is set so as to assume a value, or less, expressed by Expression (5).

$$\frac{R}{2} \cdot \left( \tan\left(\frac{\eta}{2}\right) + \tan\left(\frac{\pi}{3} - \frac{\theta + \eta}{2}\right) \right) \quad (5)$$

The above explanations are given by reference to the case where the hexagonal male part 22 engages the twisted triangular female part 24. However, the hexagonal male part 22 can also be brought into engagement with a tapered recess, a prism-like recess, a polygonal recess, or the like, in lieu of the twisted triangular female part 24.

It is preferable that a material of the hexagonal male part 22 be made of a known material used in forming a protrusion (a male part) or another similar material. Further, a portion or an entirety of the hexagonal male part 22 is made of a slidable material (e.g., Teflon-contained polyacetal or the like), whereby the male part and the female part can also be smoothly brought into engagement.

A gear mechanism having the partially-tapered hexagonal male part is hereunder described by reference to the drawings. The hexagonal male part is placed at an end of the OPC drum or an end of another rotary mechanism in the image forming apparatus.

As shown in FIGS. 17 to 20, the hexagonal male part 22 assumes a shape similar to that of the hexagonal male part which has a hexagonal outer periphery made by an alternate combination of three long sides and three short sides.

Figure 17:
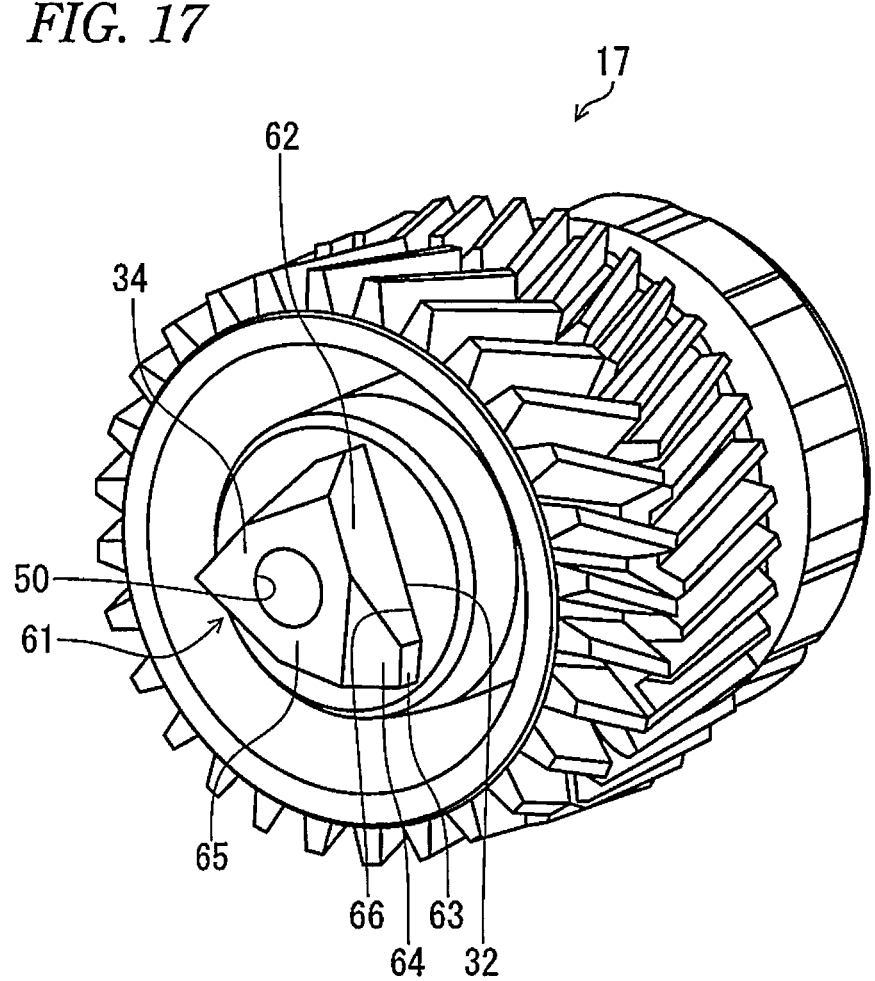
FIG. 17 is a perspective view of a gear mechanism having a partially-tapered hexagonal male part.

As shown in FIG. 17, a hexagonal male part 61 has three primary side surfaces 62 that extend from the base 32 to the end 34 along the direction of the rotation axis. It is preferable that the primary side surfaces 62 be formed in a planar shape. Moreover, the hexagonal male part 61 has the shaft hole 50.

In addition, three secondary side surfaces 63 that are smaller in surface area than the primary side surfaces 62 are formed on the hexagonal male part 61.

Edges formed from the primary side surfaces 62 and the secondary side surfaces 63 at positions where the side surfaces intersect the base 32 are arranged such that the secondary side surface 63 separates the two primary side surfaces 62, which are on both sides of the secondary side surface 63, from each other. Therefore, an outer periphery of the hexagonal male part 61 has, at a base thereof, a configuration in which the long side and the short side are placed in an alternating sequence as mentioned previously.

It is preferable that the three primary side surfaces 62 should assume the same shape and that the three secondary side surfaces 63 should assume the same shape.

The hexagonal male part 61 also has a plurality of tapered surfaces 64 that extend from the respective secondary side surfaces 63 in a direction opposite to the base 32 with respect to the rotation axis. The individual tapered surface 64 extends from its corresponding secondary side surface 63. As shown in FIG. 17, the individual tapered surface 64 adjoins one side of the secondary side surface 63, one side of each of the two primary side surfaces 62, and one side of a top surface 65 making up the end of the hexagonal male part 61.

As a result of such tapered surfaces 64 being formed, the top surface 65 that partially includes the tapered surfaces 64 is formed on the hexagonal male part 61. Specifically, the tapered surfaces 64 are formed not over the entirety of the top surface 65 but in agreement with the configuration in which the long sides and the short sides are arranged in the alternating sequence.

Figure 18:
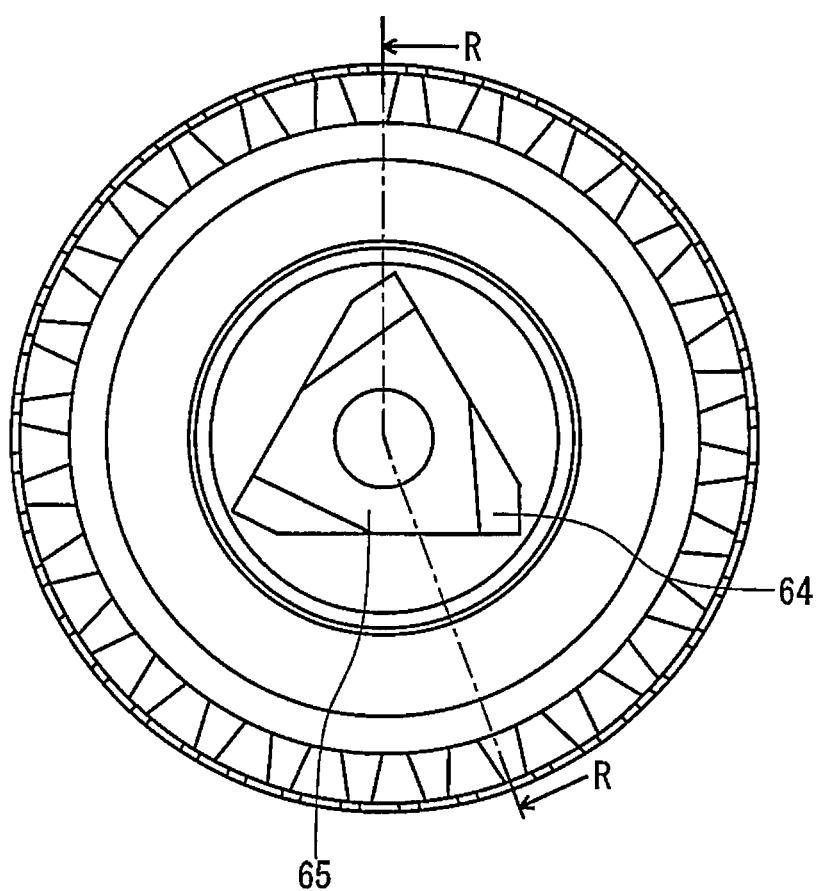
FIG. 18 is a plan view of the hexagonal male part shown in FIG. 17.

As shown in FIG. 18, the short sides of the base are parallel to a demarcation between the tapered surfaces 64 and the top surface 65. The top surface 65 is formed into a hexagonal shape, and the hexagonal shape of the top surface 65 is made by a combination of long sides with short sides respectively corresponding to the long sides and the short sides that make up the outer periphery of the base 32. Namely, the long sides that make up the hexagonal shape of the top surface are parallel to the respective short sides that make up the outer periphery of the base 32.

Figure 19:
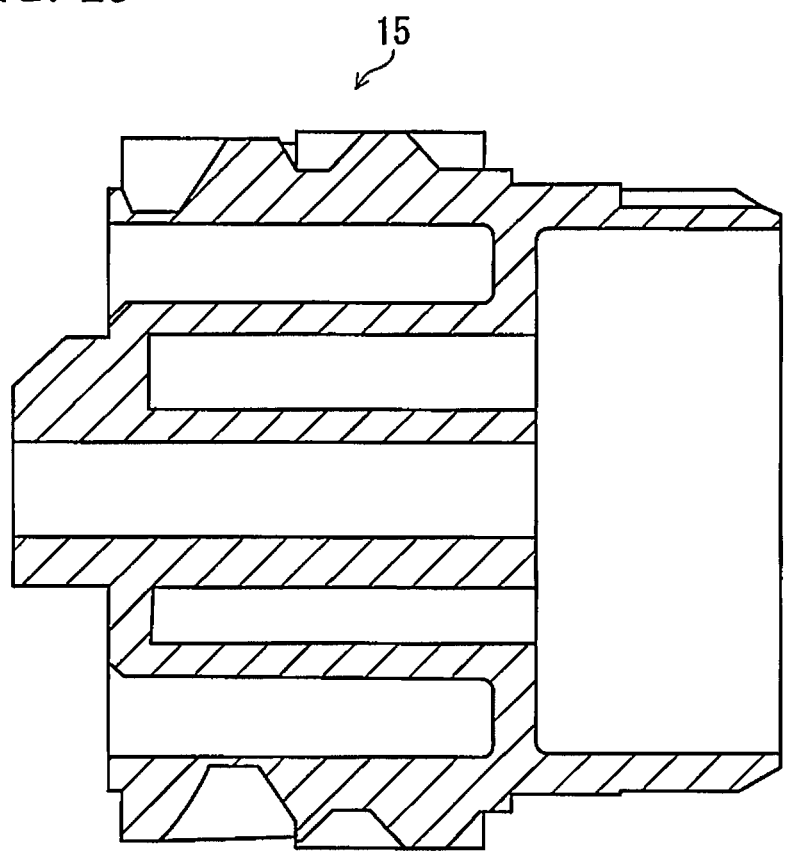
FIG. 19 is a cross sectional view taken along line R-R shown in FIG. 18.
Figure 20:
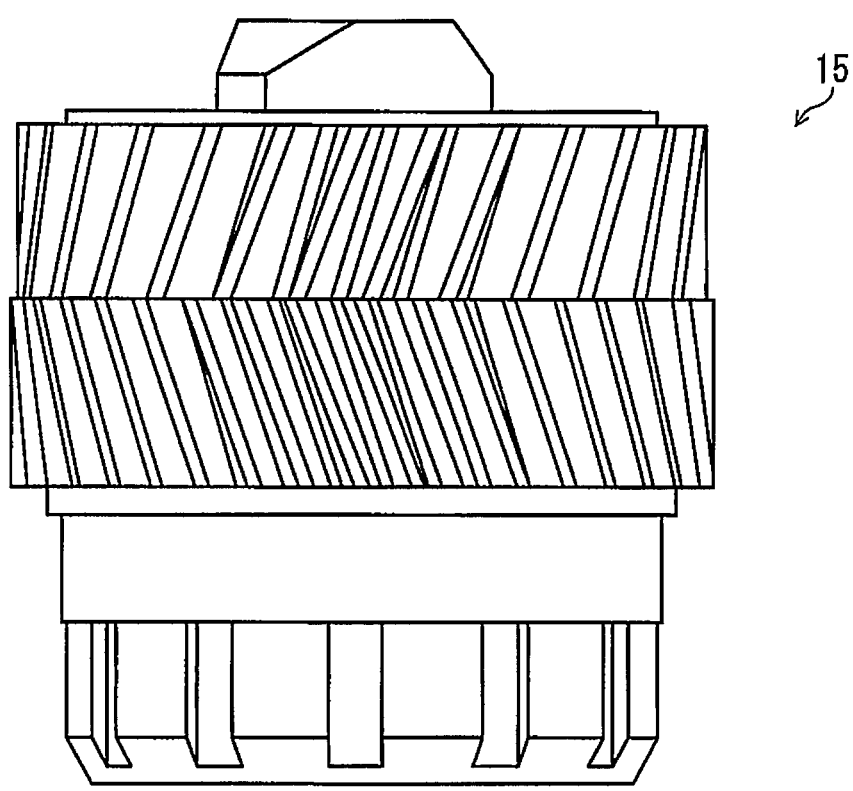
FIG. 20 is a side elevation of the gear mechanism shown in FIG. 17.

FIGS. 17 and 20 show a contact region of one of the plurality of tapered surfaces 64 that contacts a corresponding triangular recess when the hexagonal male part 61 is inserted into the twisted triangular female part 24. The hexagonal male part 61 and each of the triangular recesses come into contact with each other by means of one point or the edge. Further, a cross section taken along line R-R shown in FIG. 18 is as illustrated in FIG. 19.

Figure 21A:
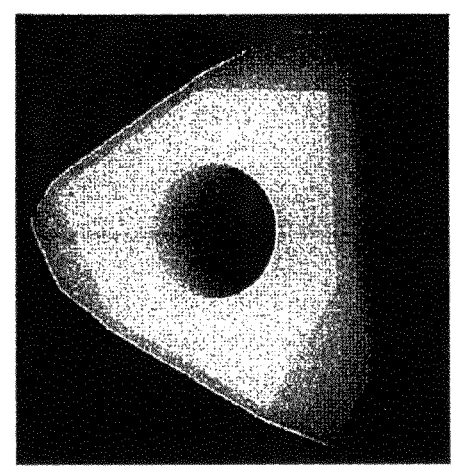
FIG. 21A is a top view of the hexagonal male part formed from a first material.
Figure 21B:
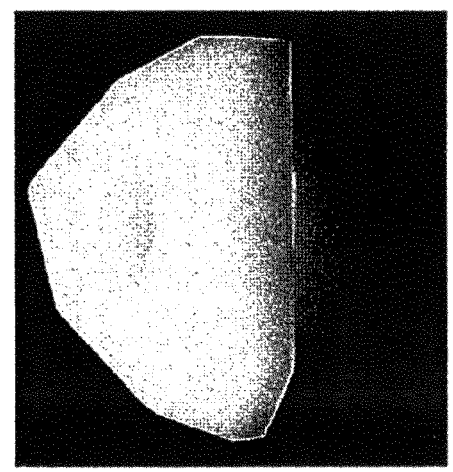
FIG. 21B is a front view of the hexagonal male part.
Figure 21C:
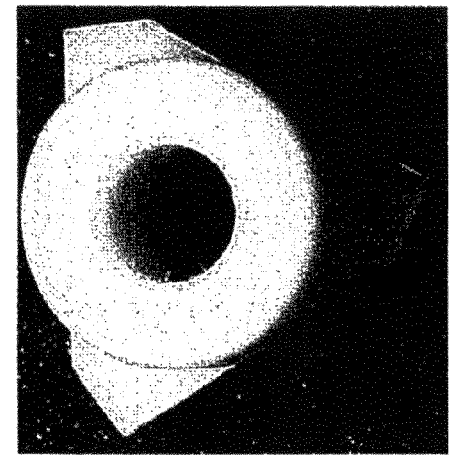
FIG. 21C is a bottom view of the same.

A first example of such a hexagonal male part 61 partially including the tapered surfaces 64 is described hereunder. FIGS. 21A to 21C show the hexagonal male part 61 made of, as a first material, POM (polyoxymethylene) that is a kind of polyacetal. FIG. 21A shows a top view of the hexagonal male part 61, FIG. 21B is a front view of the same, and FIG. 21C shows a bottom view of the same.

Figure 22C:
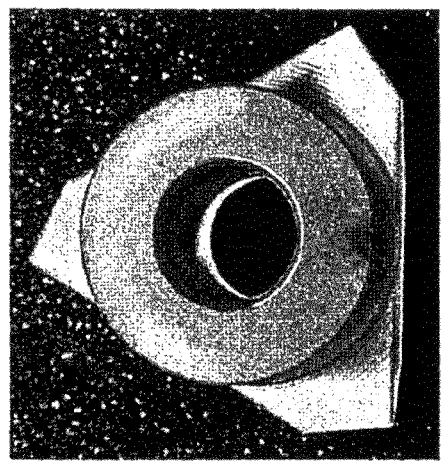
FIG. 22C is a bottom view of the same.
Figure 22B:
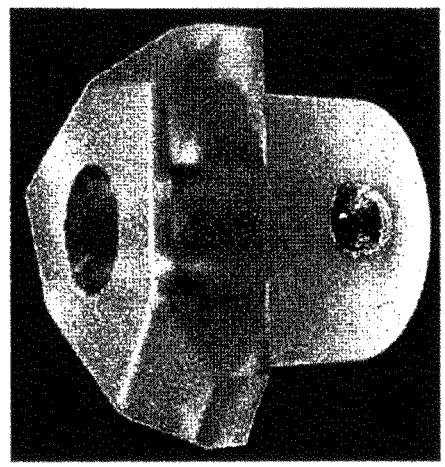
FIG. 22B is a front view of the hexagonal male part.
Figure 22A:
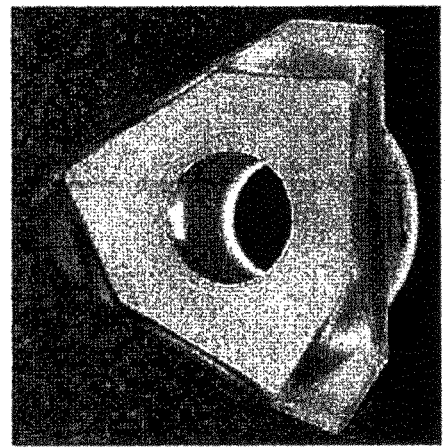
FIG. 22A is a top view of the hexagonal male part formed from a second material.

A second example of the hexagonal male part 61 is also described below. FIGS. 22A to 22C show the hexagonal male part 61 made of, as a second material, polycarbonate. FIG. 22A is a top view of the hexagonal male part 61, FIG. 22B is a front view of the same, and FIG. 22C is a bottom view of the same.

These materials are examples, and the hexagonal male part 61 can also be made of a material used in the related art or an analogous material. Further, the material can also be a synthetic material which is a combination of a resin or a composite resin with a fibrous material. As shown in FIGS. 21A to 21C and FIGS. 22A to 22C, a reinforcing material, like a metallic pin, can also be used in the hexagonal male part 61. Moreover, as mentioned above, a protrusion made of flexible polymer can also be formed along the individual edge of the hexagonal male part 61.

Second Embodiment

A rotating part of a second embodiment is hereunder described by reference to the drawings. Throughout the drawings, like numerals or characters employed in the first and second embodiments, if applicable, designate like or corresponding parts. Moreover, in the embodiment, illustrated portions are described precisely in accordance with a scale size so that optimum ratios and measured values of the portions can be derived directly from the drawings. In another mode of the disclosures, however, the illustrated portions are not required to be rendered precisely in accordance with the scale size. Furthermore, unless advised otherwise, measured values provided in the drawings correspond to angles pertinent to a 360-degree coordinate system. Tolerance of radial directions and angle dimensions can be set so as to fall within a range of ±4 to 6 degrees while still remaining in a preferred shape and layout of characteristics provided in the drawings. However, greater tolerance can be implemented if it does not stray outside the range of the disclosures. Likewise, tolerance of one millimeter is optimum; however, the tolerance can be changed.

In some modes, the hexagonal male part 61 discussed herein is a modification of the mode described in connection with U.S. patent application U.S. 61/645,393 (i.e., the mode described in connection with the first embodiment). In one respect, the hexagonal male part 61 discussed herein is a modification of a case 5 (i.e., the fifth example) described in connection with U.S. 61/614,346. The fifth example is discussed as a common modification and includes tapers in ends of the hexagonal male part 61. In some modes, the hexagonal male part 61 discussed herein conforms to the dimensional characteristics described in connection with U.S. 61/637,078.

As mentioned above, FIG. 17 shows a rightward lateral perspective view of the partially-tapered hexagonal male part 61 built into a gear mechanism 15. The hexagonal male part 61 (hereinbelow also called a "male part") can be put in the OPC drum or an end of another rotating part of the image forming apparatus in the same way as in the first embodiment.

As shown in FIGS. 17 to 20, the male part 61 has a hexagonal base, which includes three long sides and three short sides that are alternately arranged. That is, the perimeter at the base 66 of the male part 61 is arranged as long-short-long-short-long-short sides. The male part 61 includes three primary side surfaces 62 which project in an axial (rotating) direction from the base 66 to a top surface 65, which is preferably flat and includes an axial hole 50 therein, as shown in FIG. 17.

The male part 61 also includes three secondary side surfaces 63, which have smaller surface areas than the three primary side surfaces 62. With respect to base-side edges of the primary side surfaces 62 and the secondary side surfaces 63, a secondary side surfaces 63 is provided between each of the primary side surfaces 62 so as to separate them, thereby providing for the above-discussed long-short side arrangement. Preferably, all of the primary side surfaces 62 have the same dimensions, and all of the secondary side surfaces 63 have the same dimensions.

Extending from each of the secondary side surfaces 63 in an axial direction away from the base 66 are tapered surfaces 64. Each of the tapered surfaces 64 extends from one of the secondary side surfaces 63. As shown in FIGS. 17 to 20, each of the tapered surfaces 64 contacts an edge of the secondary side surfaces 63, an edge of two primary side surfaces 62, and an edge of the top surface 65. Such an arrangement provides a partially tapered male part 61, that does not have a tapered edge along all sides of the top surface 65. Rather, tapered edges are alternately provided in a manner corresponding to the short-long side arrangement discussed above.

As shown in FIG. 18, the short sides are parallel to edges exiting between the tapered surfaces 64 and the top surface 65, and the top surface 65 itself is hexagonal. The hexagonal top surface 65 includes long sides and short sides that are placed in one-to-one correspondence to the short sides and the long sides of a base surface 66. Specifically, the long sides of the hexagonal top surface 65 are parallel to the short sides of the hexagonal base 66 of the mal part 61.

FIGS. 17 and 20 show an exemplary contact point on one of the tapered surfaces 64. The contact points are points of contact or edges between the male part 61 and the twisted triangular female part 24 formed so as to permit insertion of the male part 61.

Figure 23:
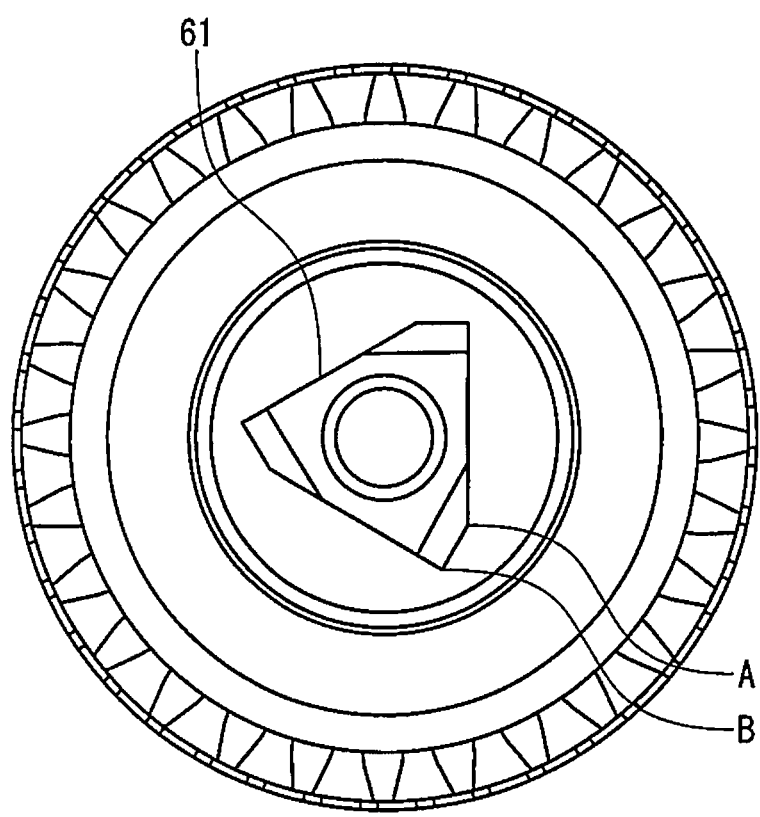
FIG. 23 is a plan view of the hexagonal male part of the first embodiment when applied to a gear mechanism.
Figure 24:
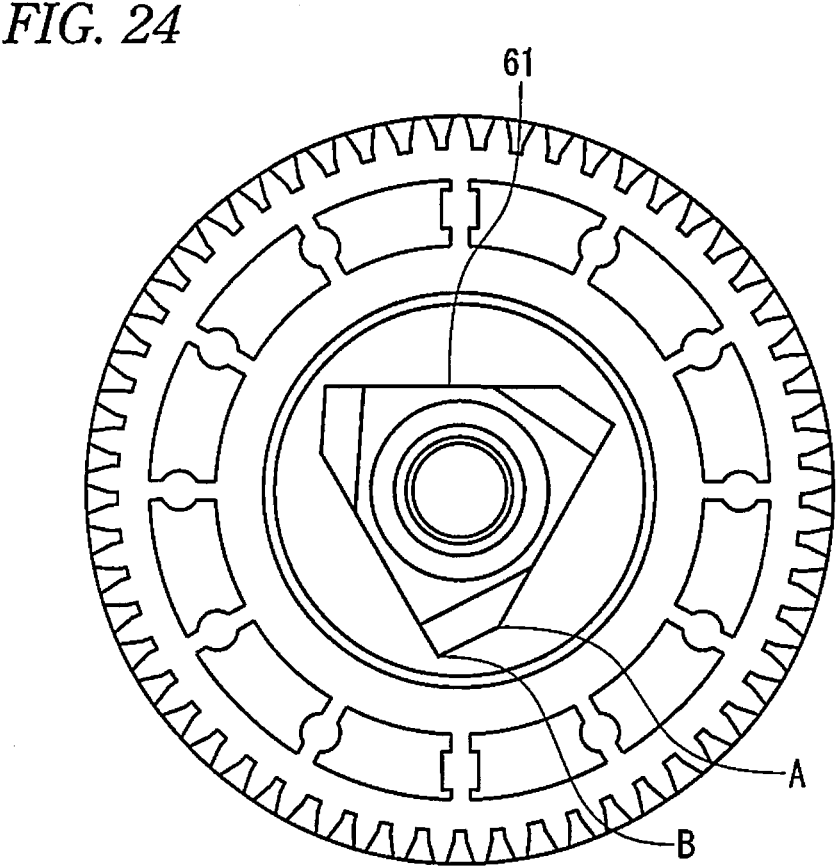
FIG. 24 is a plan view of the hexagonal male part of the first embodiment when applied to a gear mechanism.

As shown in FIGS. 23 and 24, in the hexagonal male part (male part) 61 described in connection with the first embodiment, each of the short sides extends from a first point A to a second point B in a clockwise direction with respect to the axial direction. In FIGS. 23 and 24, each of the short sides extend from the first point A to the second point B like the second point B is distant from the rotation axis than is the first point A.

Figure 25:
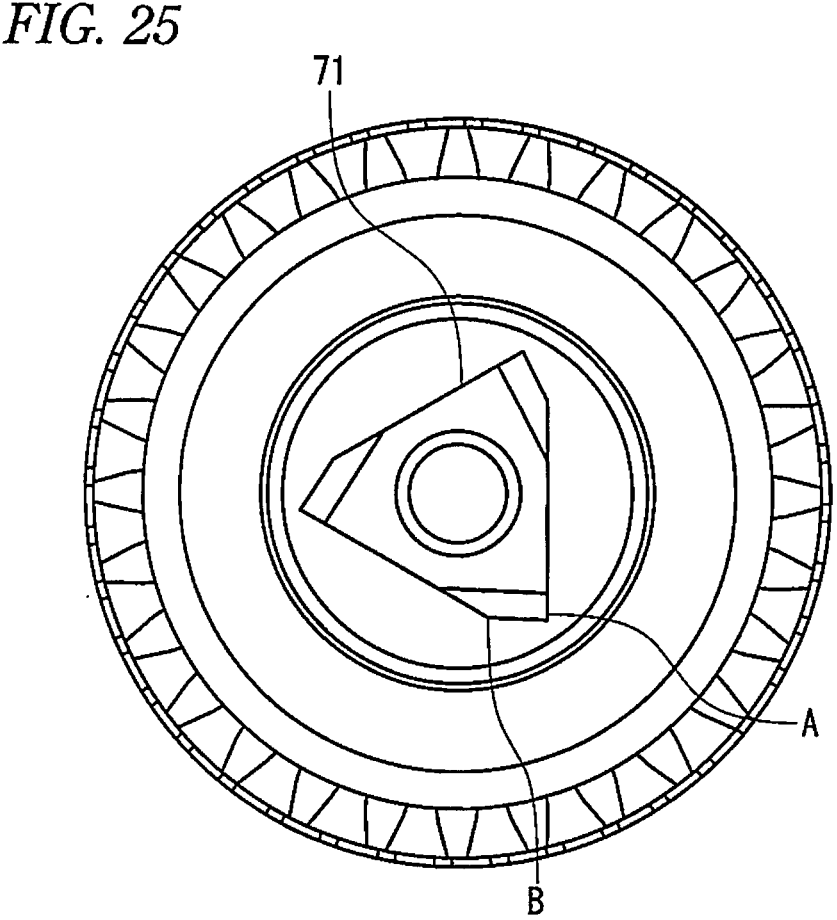
FIG. 25 is a plan view of a hexagonal male part of a second embodiment when applied to a gear mechanism.
Figure 26:
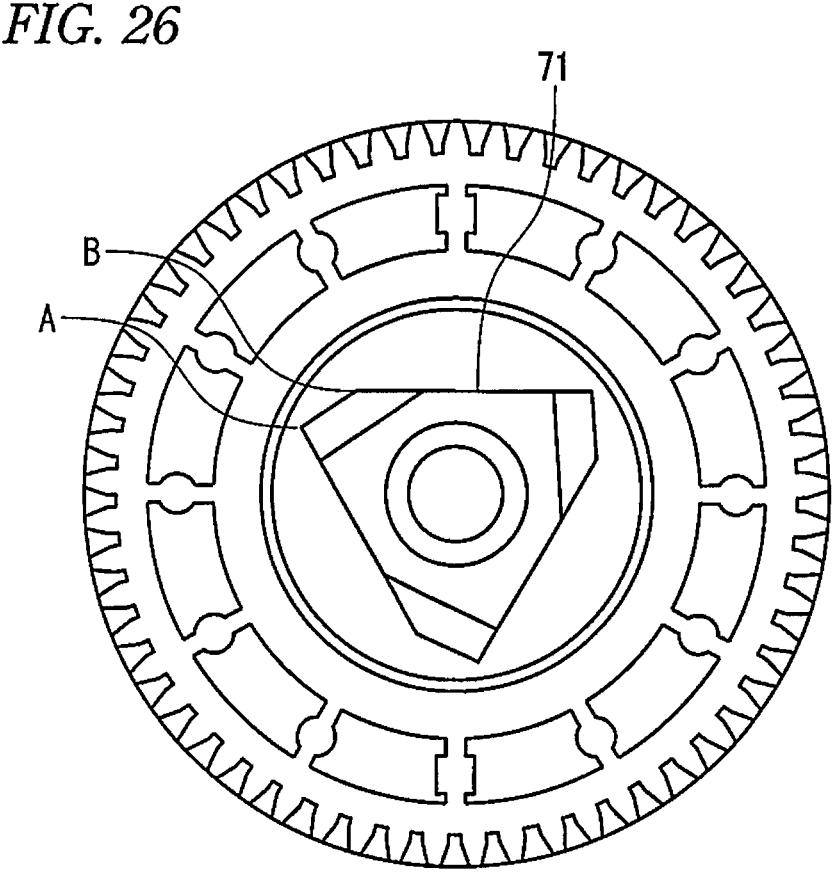
FIG. 26 is a plan view of the hexagonal male part of the second embodiment when applied to the gear mechanism.
Figure 27A:
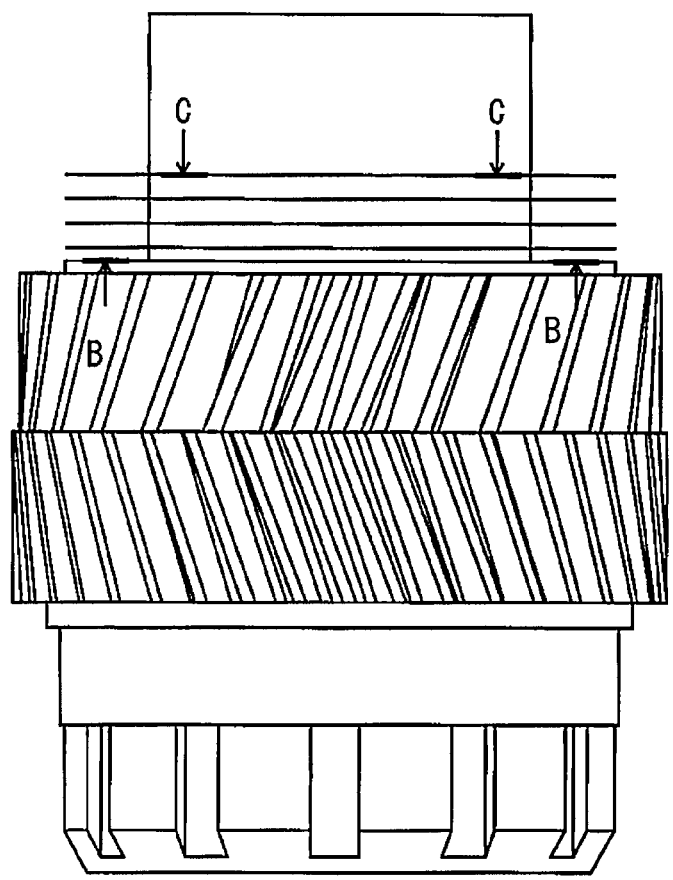
FIG. 27A is a side view of the gear mechanism shown in FIG. 24.
Figure 27B:
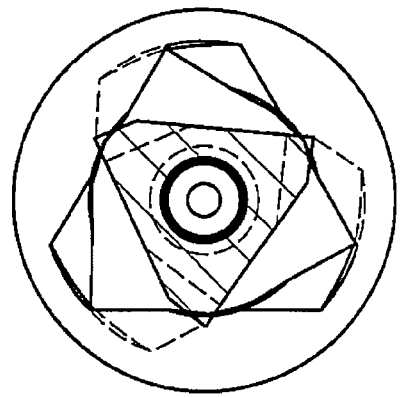
FIG. 27B is a cross sectional view taken along line B-B shown in FIG. 27A.
Figure 27C:
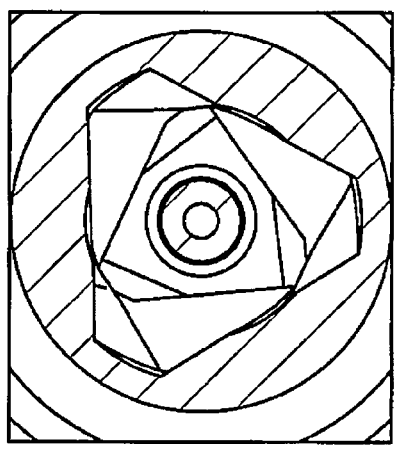
FIG. 27C is a cross sectional view taken along line C-C shown in FIG. 27A.
Figure 27D:
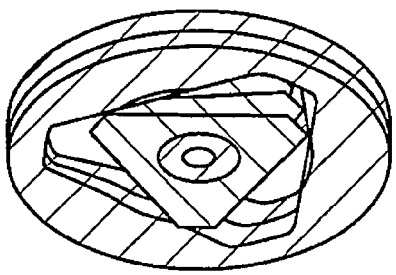
FIG. 27D is a schematic diagram showing the hexagonal male part shown in FIG. 27A engaged with the twisted triangular female part.
Figure 28A:
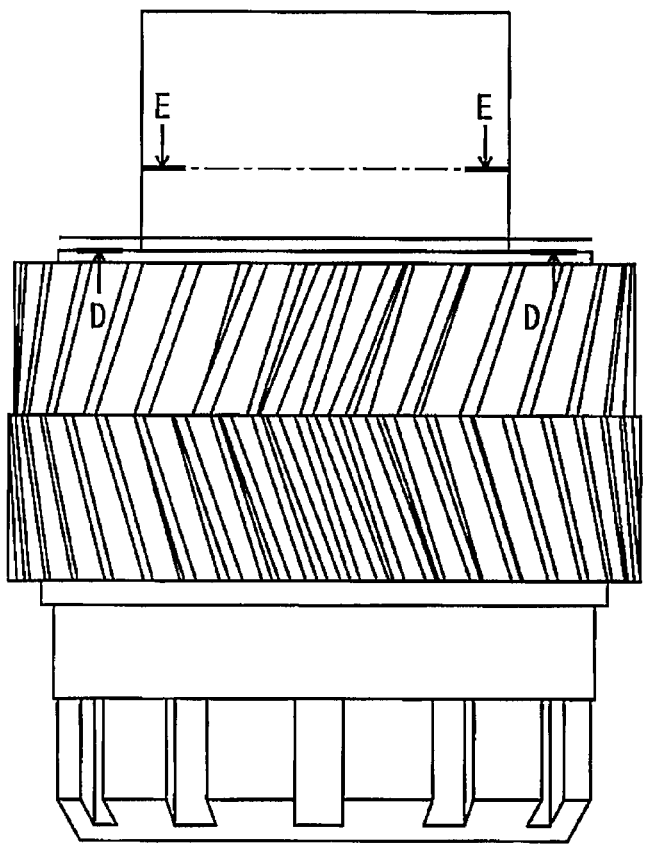
FIG. 28A is a side view of the gear mechanism shown in FIG. 25.
Figure 28B:
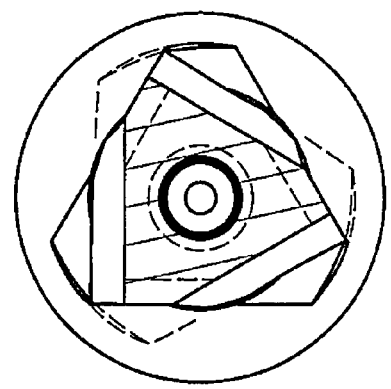
FIG. 28B is a cross sectional view taken along line B-B shown in FIG. 28A.
Figure 28C:
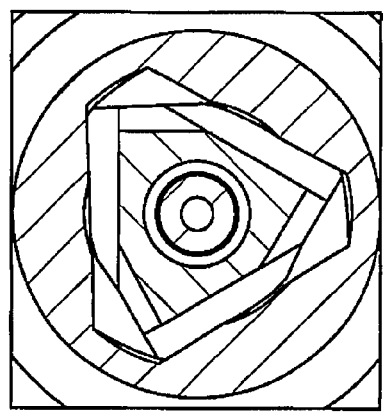
FIG. 28C is a cross sectional view taken along line C-C shown in FIG. 28A.
Figure 28D:
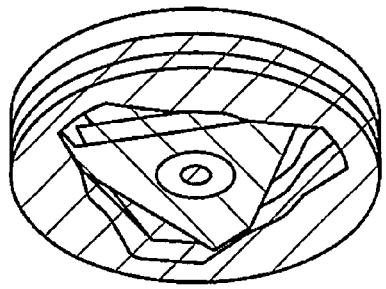
FIG. 28D is a schematic diagram showing the hexagonal male part shown in FIG. 28A engaged with the twisted triangular female part.

A male part 71 described in connection with an embodiment shown in FIGS. 25 and 26 is corrected when compared with the male part 61 in terms of the configuration of the short sides and the long sides. In FIGS. 25 and 26, the short sides extend from the first point A to the second point B like the first point A is distant from the rotation axis than is the second point B. Like the male part 61 shown in FIGS. 23 and 24, the first point A and the second point B of the male part 71 shown in FIGS. 25 and 26 are defined with respect to the clockwise direction.

FIGS. 27A to 27D exemplify an engagement connection between the hexagonal male part 61 shown in FIGS. 23 and 24 and the twisted triangular female part 24 conforming to the structure of the hexagonal male part 61. FIGS. 28A to 28D exemplify an engagement connection between the hexagonal male part 71 shown in FIGS. 25 and 26 and the twisted triangular female part 24 conforming to the structure of the hexagonal male part 71.

Figure 29:
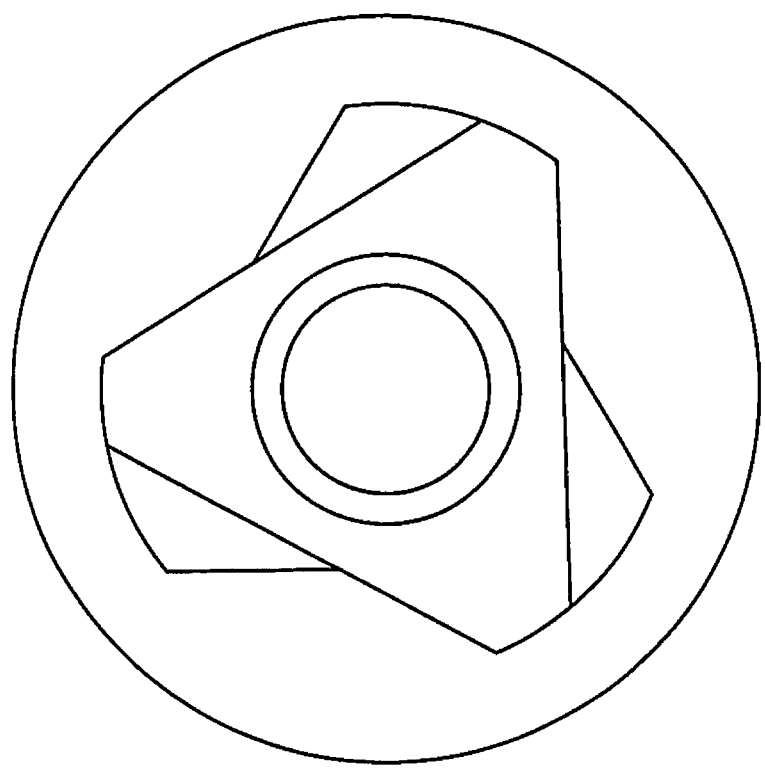
FIG. 29 is a schematic diagram showing a hexagonal male part shown in FIGS. 30 to 33 engaged with the twisted triangular male part.
Figure 30:
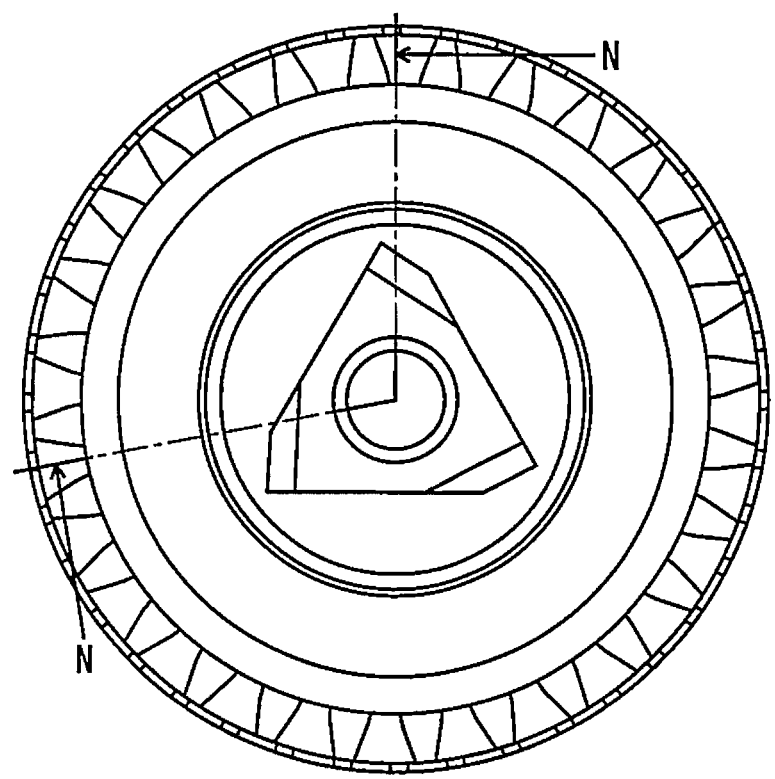
FIG. 30 is a plan view of the gear mechanism shown in FIG. 25.
Figure 31:
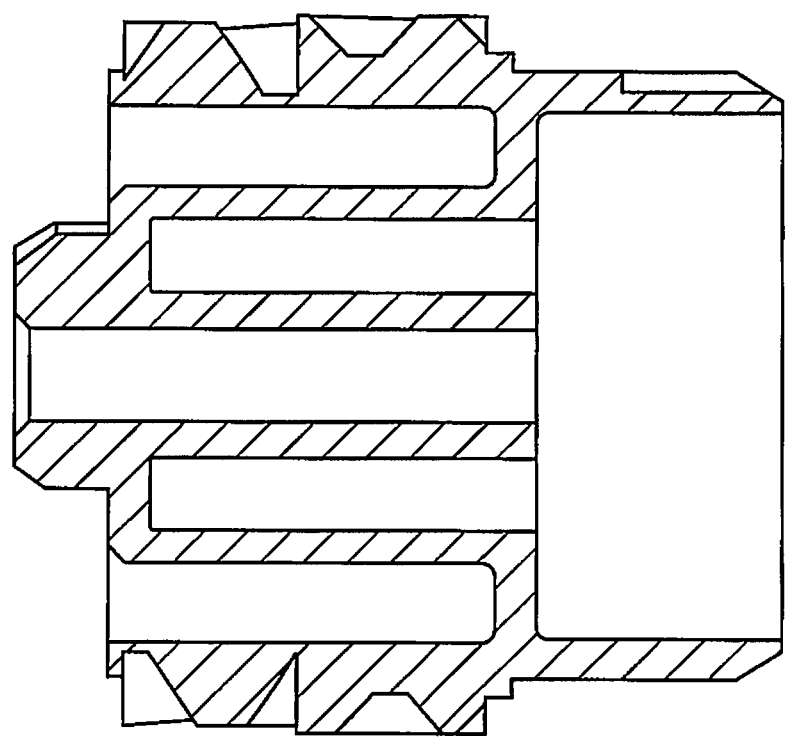
FIG. 31 is a cross sectional view taken along line N-N shown in FIG. 30.
Figure 32:
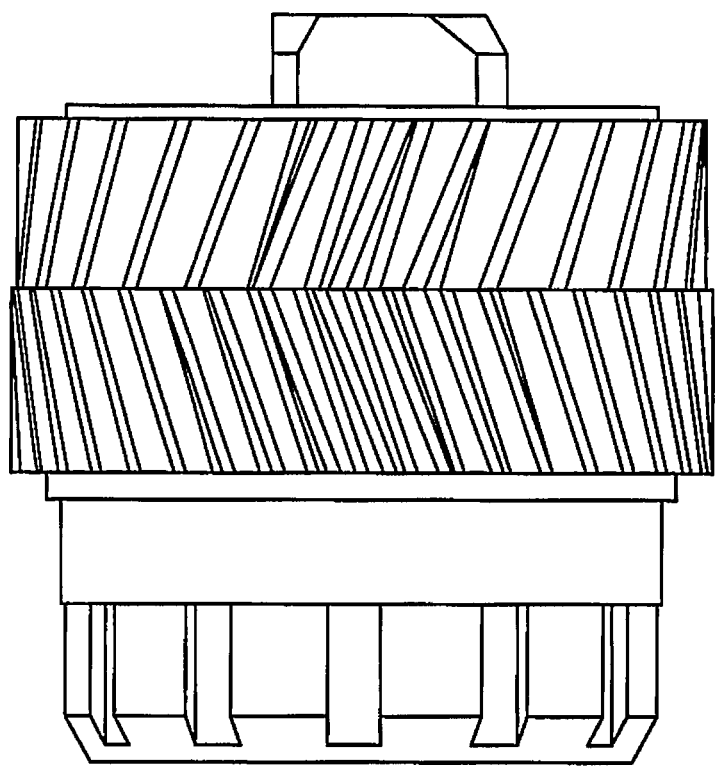
FIG. 32 is a side view of the gear mechanism shown in FIG. 25.
Figure 33:
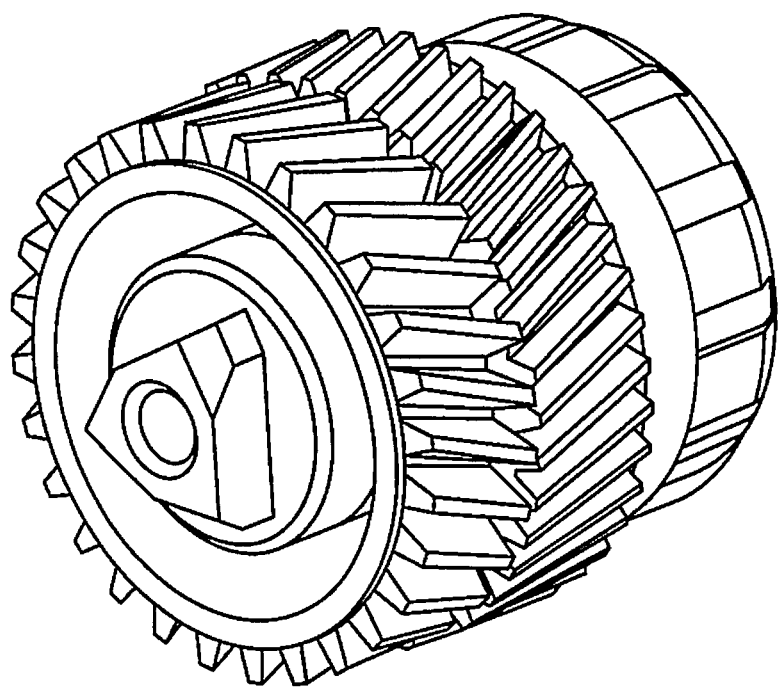
FIG. 33 is a perspective view of the gear mechanism shown in FIG. 25.
Figure 34:
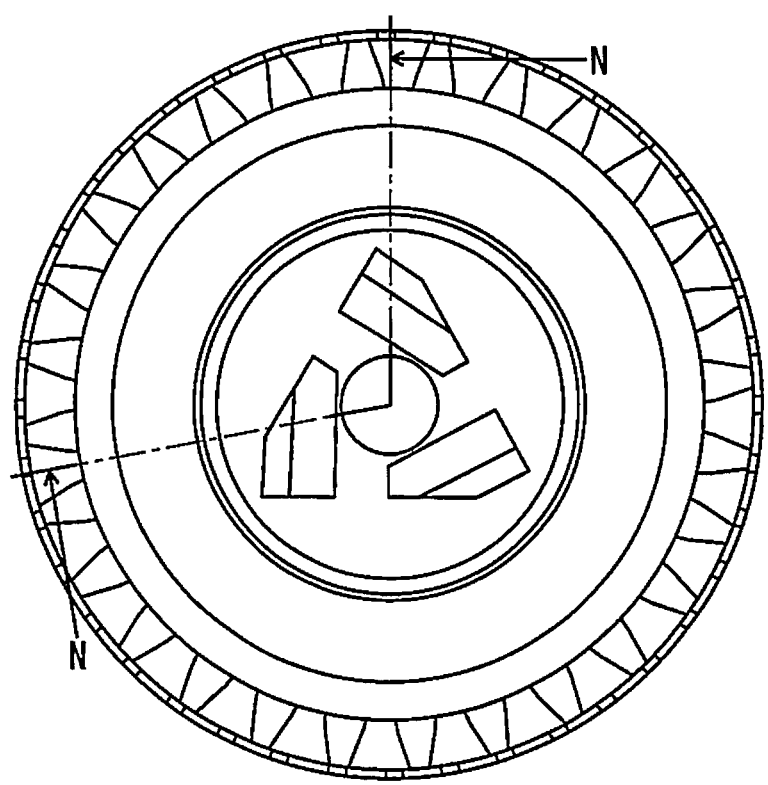
FIG. 34 is a plan view of a gear mechanism acquired when the hexagonal male part shown in FIG. 25 is deformed into three protrusions.
Figure 35:
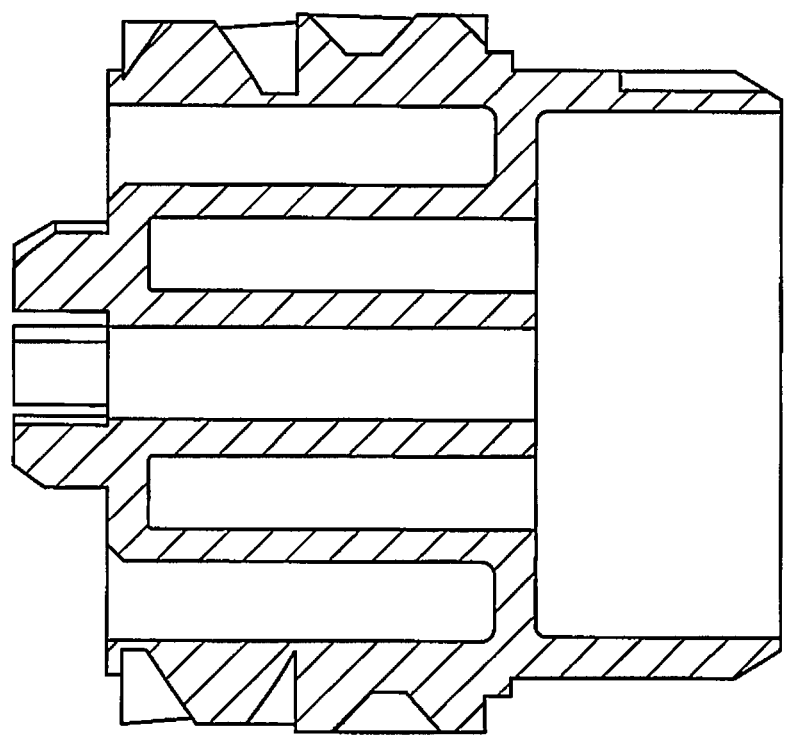
FIG. 35 is a cross sectional view taken along line N-N shown in FIG. 34.
Figure 36:
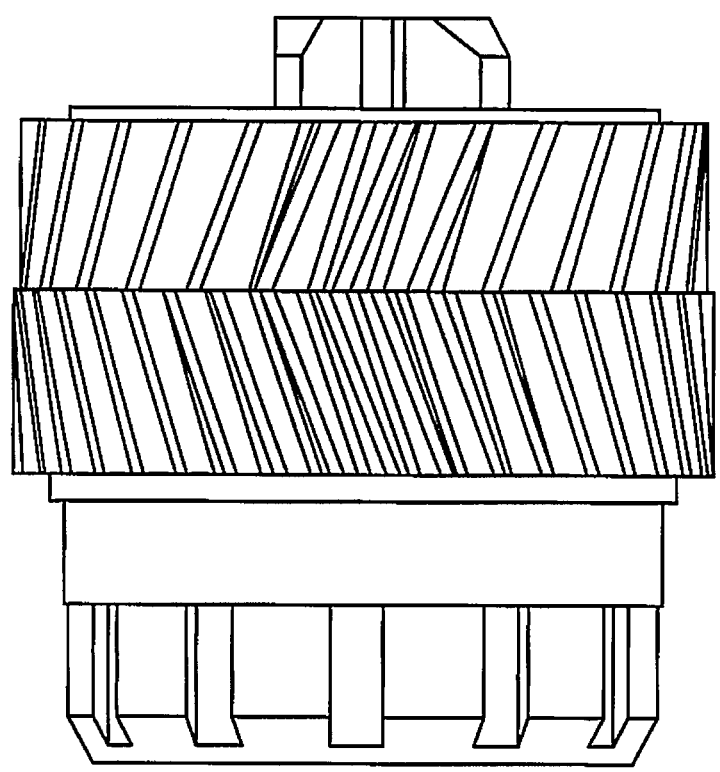
FIG. 36 is a side view of the gear mechanism shown in FIG. 34.
Figure 37:
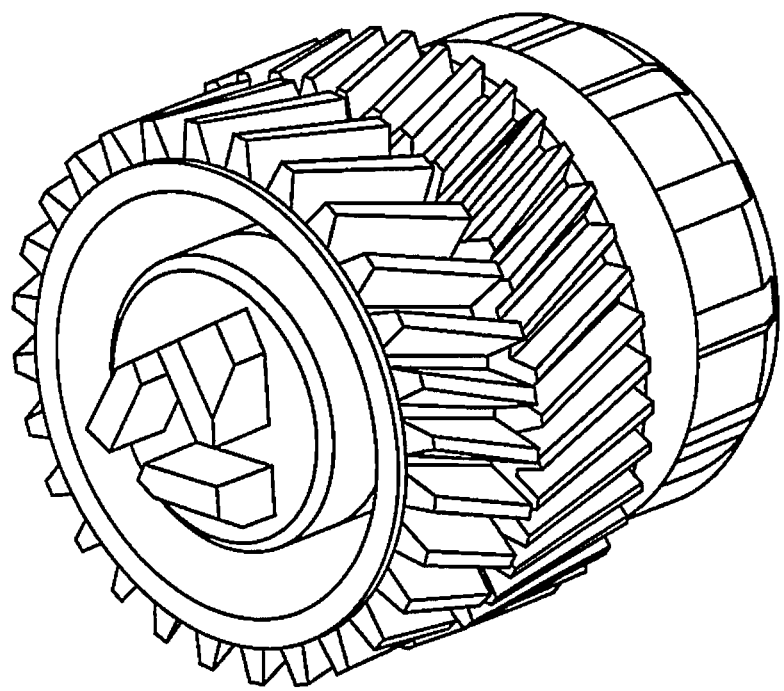
FIG. 37 is a perspective view of the gear mechanism shown in FIG. 34.
Figure 38:
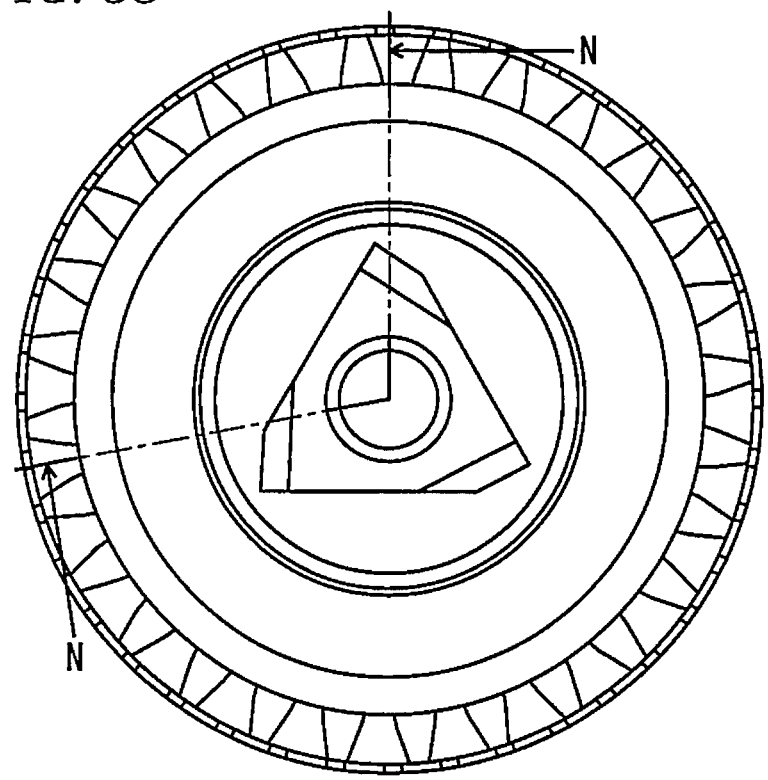
FIG. 38 is a plan view of a gear mechanism acquired when the hexagonal male part is made longer than the hexagonal male part shown in FIG. 30 in terms of a taper length.
Figure 39:
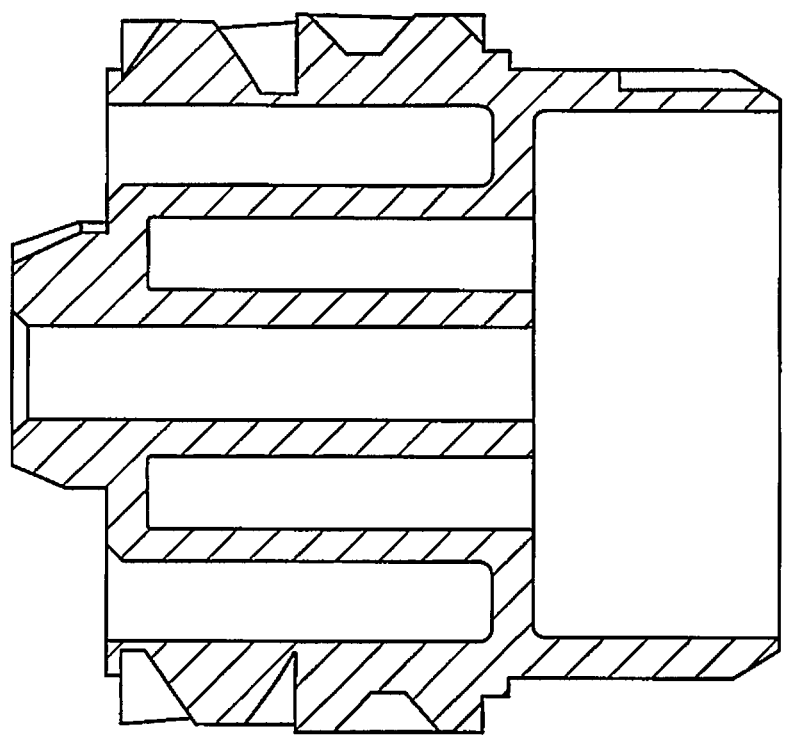
FIG. 39 is a cross sectional view taken along line N-N shown in FIG. 38.
Figure 40:
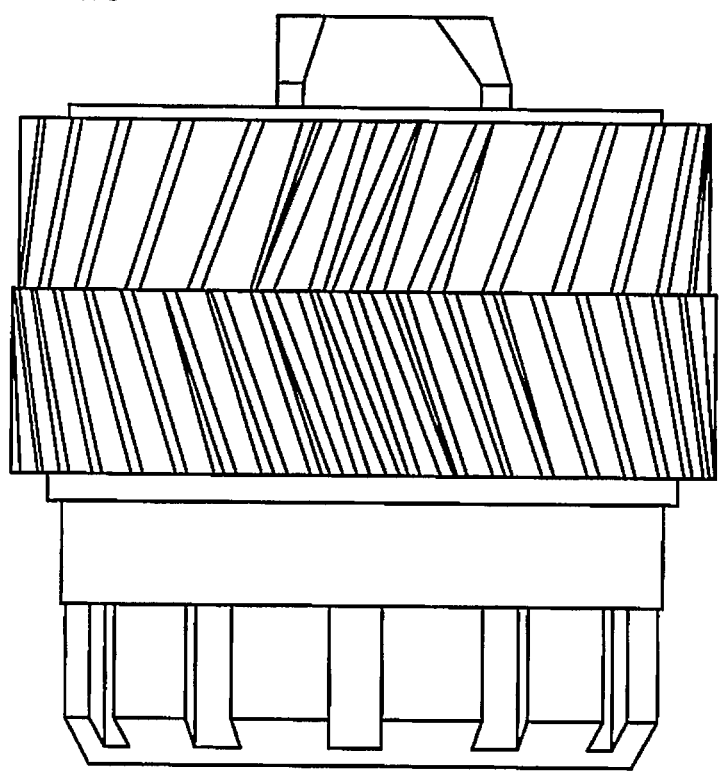
FIG. 40 is a side view of the gear mechanism shown in FIG. 38.
Figure 41:
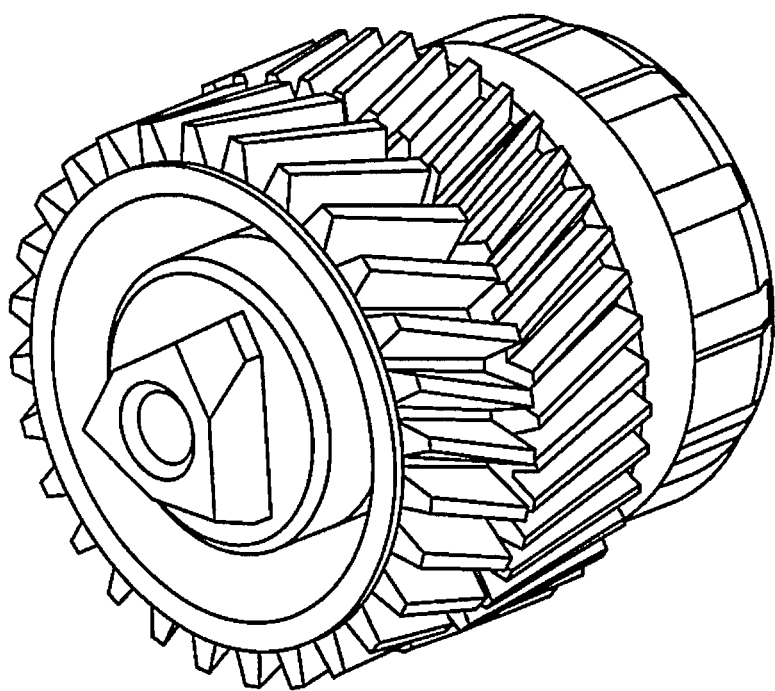
FIG. 41 is a perspective view of the gear mechanism shown in FIG. 38.
Figure 42:
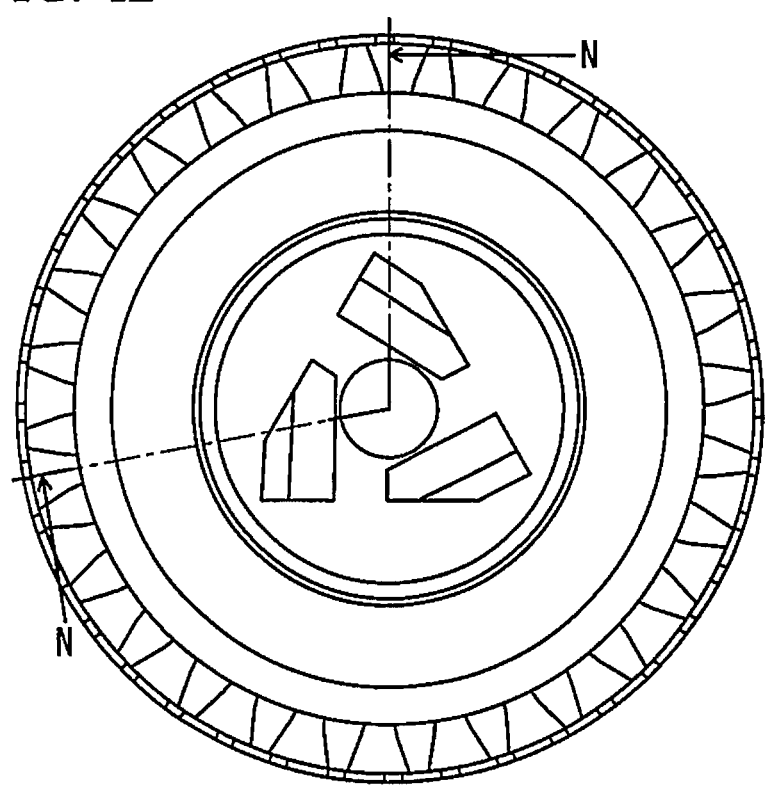
FIG. 42 is a plan view of the gear mechanism acquired when the protrusion is made longer than the protrusion shown in FIG. 34 in terms of a taper length.
Figure 43:
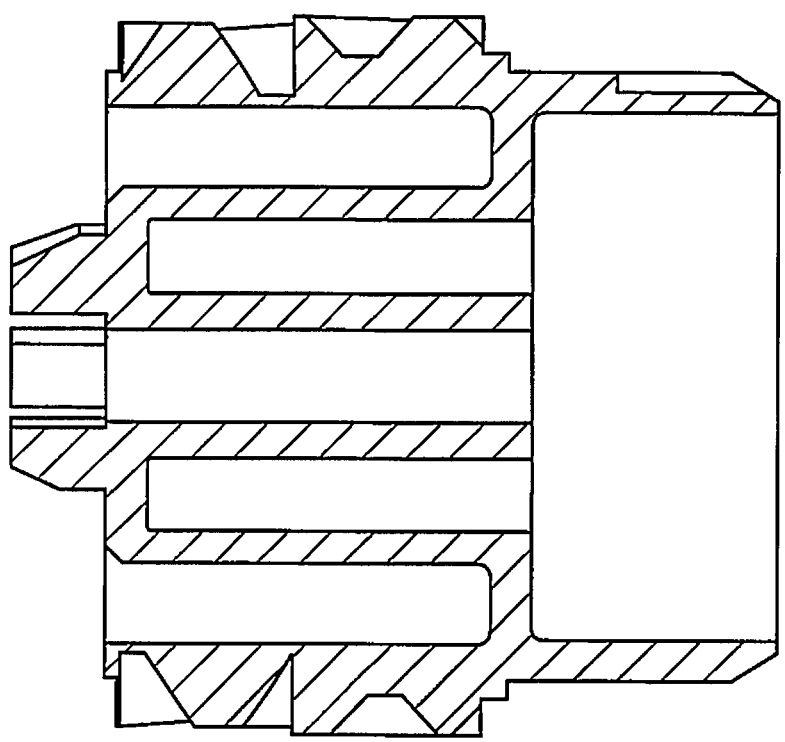
FIG. 43 is a cross sectional view taken along line N-N shown in FIG. 42.
Figure 44:
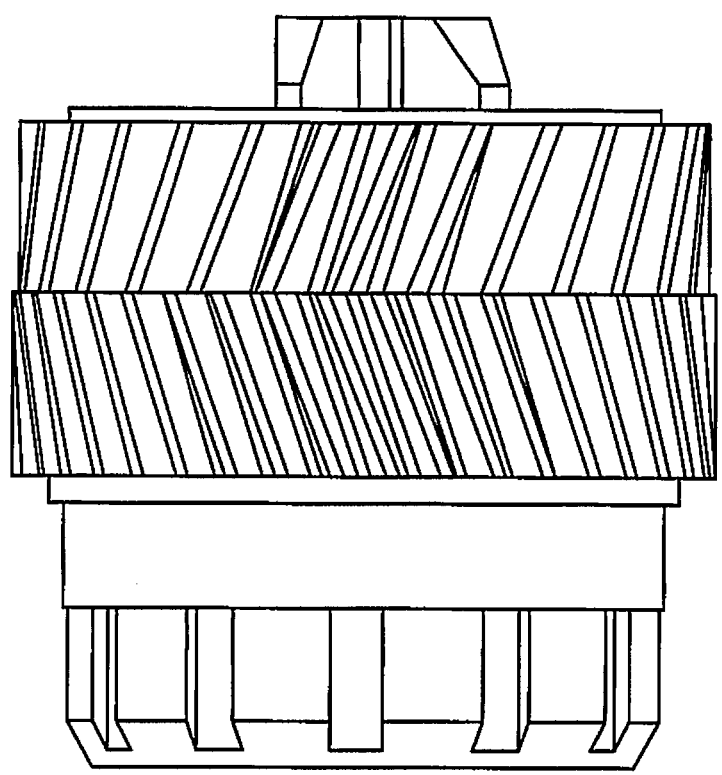
FIG. 44 is a side view of the gear mechanism shown in FIG. 42.
Figure 45:
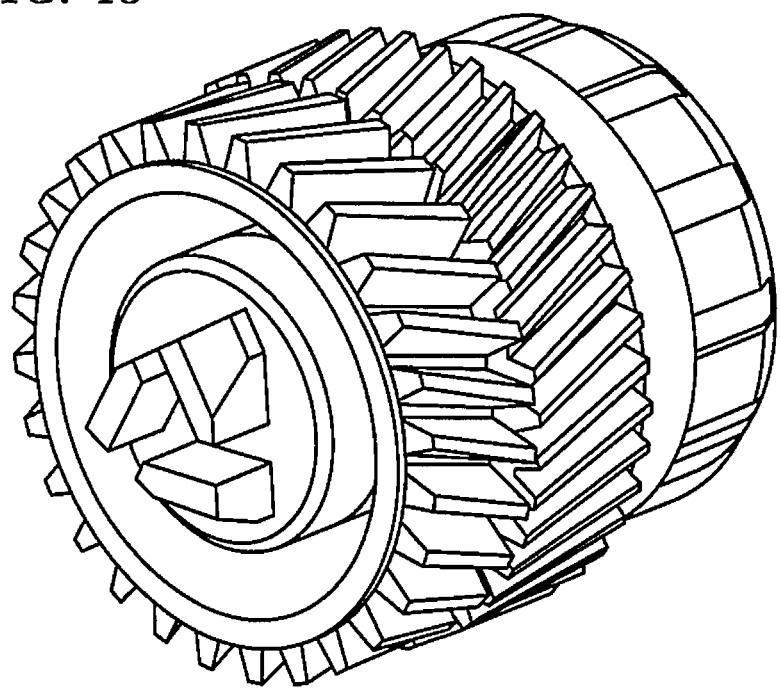
FIG. 45 is a perspective view of the gear mechanism shown in FIG. 42.

FIG. 29 exemplifies a general cross reference corresponding to another first example shown in FIGS. 30 to 33. The example shown in FIGS. 30 to 33 complies with the example shown in FIG. 25. A modification of the example is illustrated as another second example in FIGS. 34 to 37, wherein the male part is provided by means of three protrusions in contrast with a continual structure. In FIGS. 34 to 37, when compared with their counterparts shown in FIGS. 30 to 33, the long sides are discontinuous and make up a three-forked passage involving a shaft hole. In this case, a circumferential profile of a hexagonal base surface is maintained, but the long sides are discontinuous at this time.

Modifications of the first and second examples shown in FIGS. 30 to 37 are shown as another third example and another fourth example in FIGS. 38 to 45. In the examples shown in FIGS. 38 to 45, an increase exists in the amount of tapering. More specifically, the tapered surfaces 64 described in connection with the examples shown in FIGS. 38 to 41 are longer than their counterparts described in connection with the example shown in FIGS. 30 to 33. Further, the tapered surfaces 64 described in connection with the example shown in FIGS. 42 to 45 are longer than their counterparts described in connection with the example shown in FIGS. 34 to 37.

Figure 46:
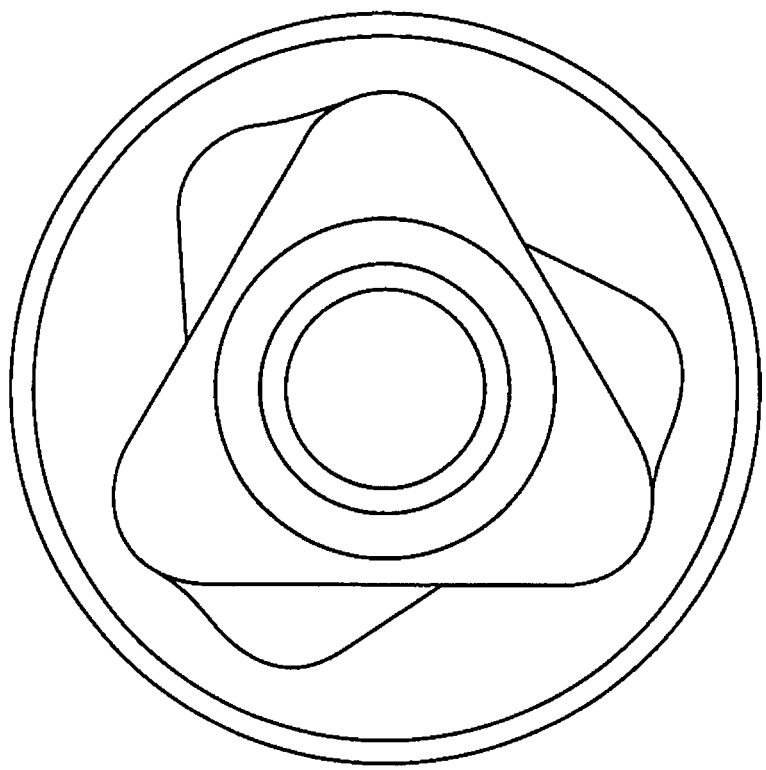
FIG. 46 is a schematic drawing showing a hexagonal male part shown in FIGS. 47 to 50 engaged with the twisted triangular female part.
Figure 47:
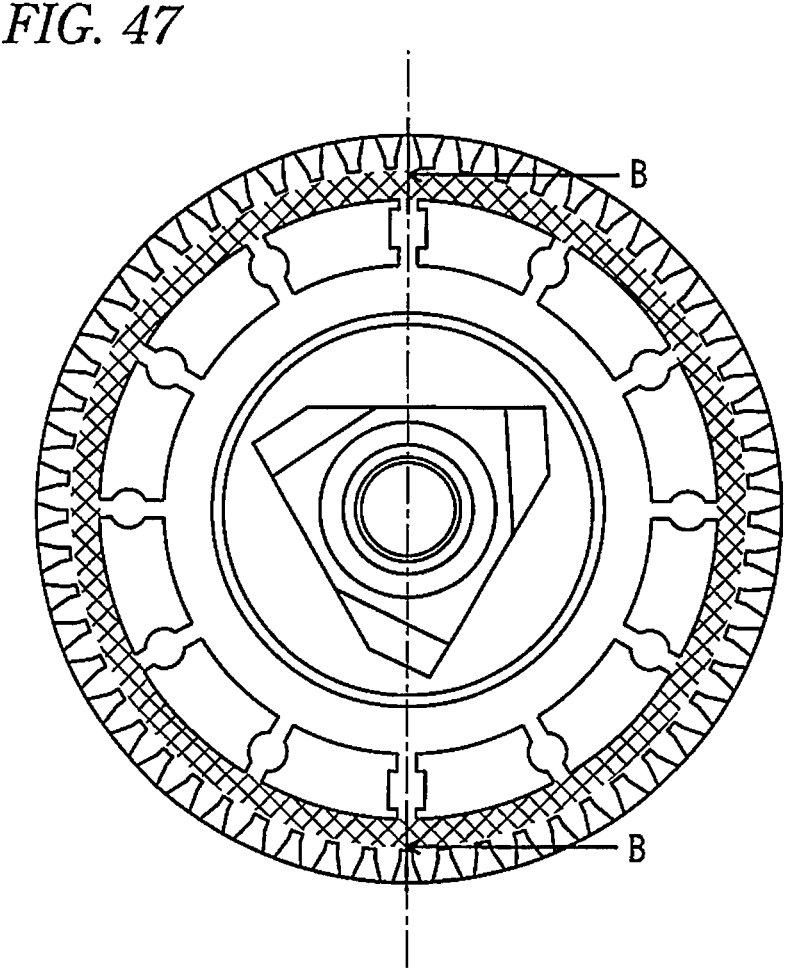
FIG. 47 is a top view of the gear mechanism shown in FIG. 26.
Figure 48:
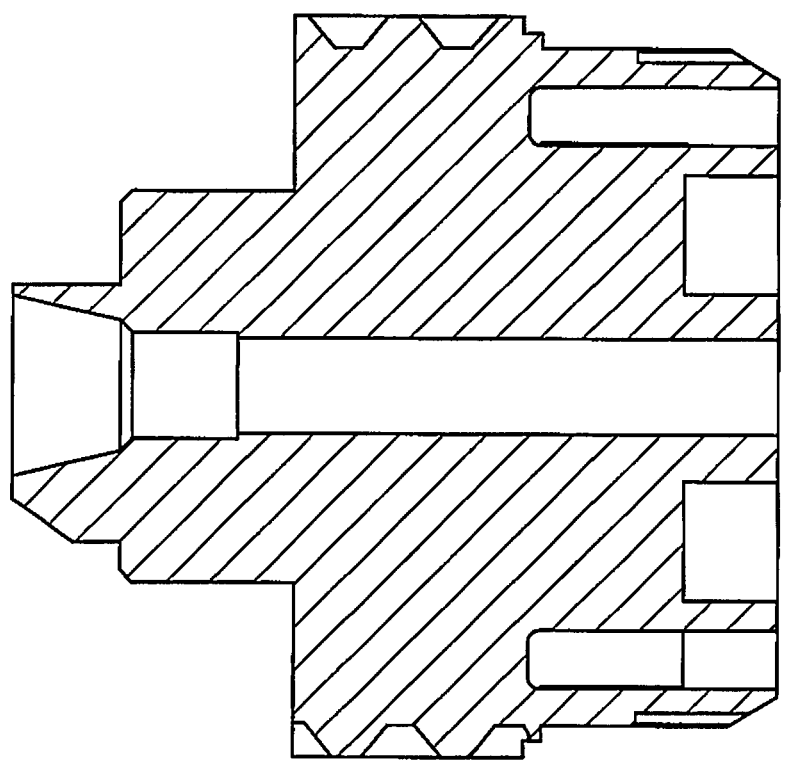
FIG. 48 is a cross sectional view taken along line B-B shown in FIG. 47.
Figure 49:
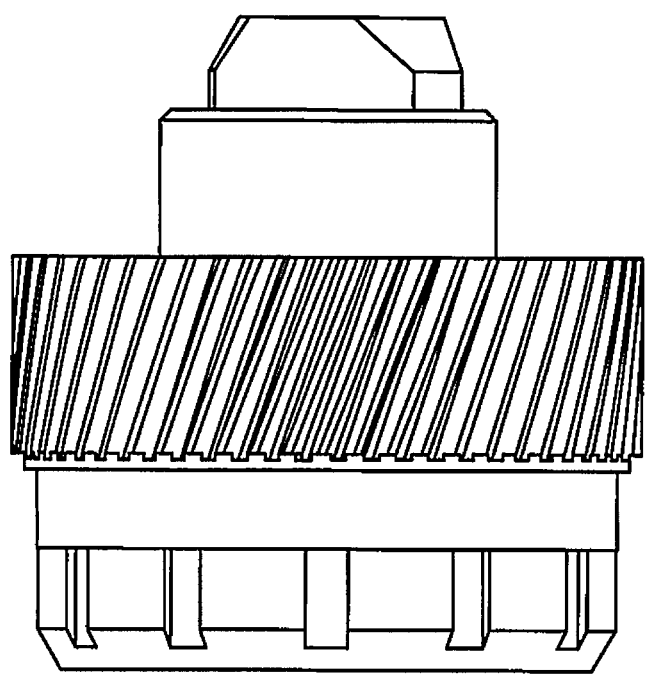
FIG. 49 is a side view of the gear mechanism shown in FIG. 47.
Figure 50:
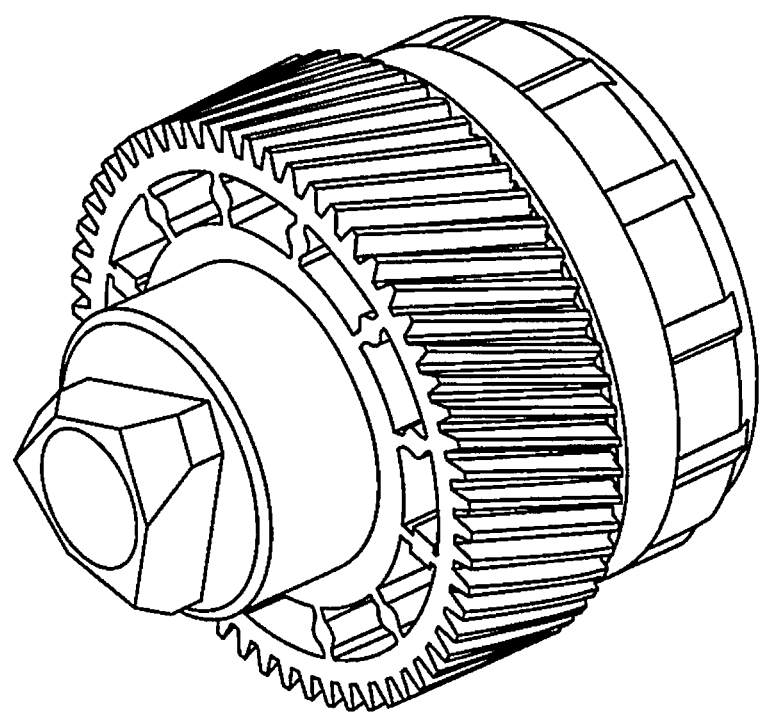
FIG. 50 is a perspective view of the gear mechanism shown in FIG. 47.
Figure 51:
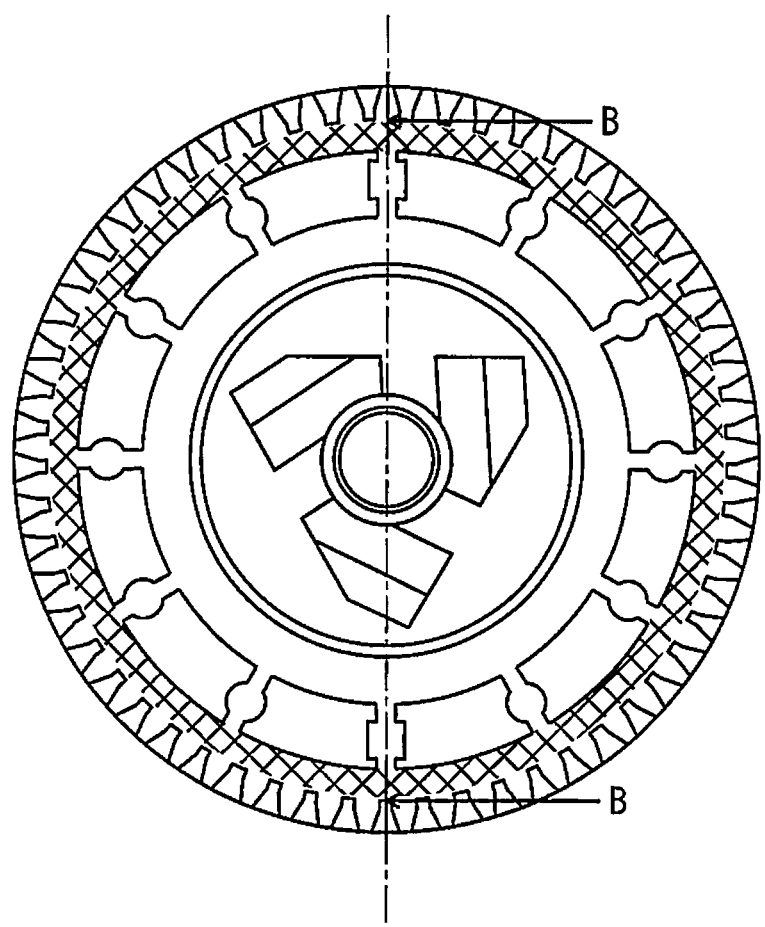
FIG. 51 is a plan view of a gear mechanism acquired when the hexagonal male part shown in FIG. 26 is deformed into three protrusions.
Figure 52:
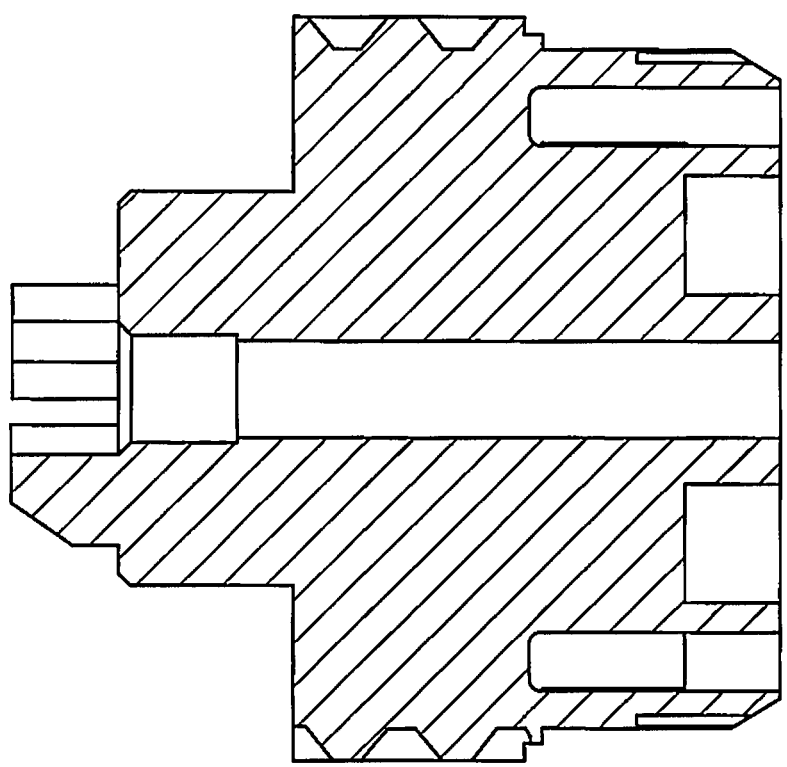
FIG. 52 is a cross sectional view taken along line B-B shown in FIG. 51.
Figure 53:
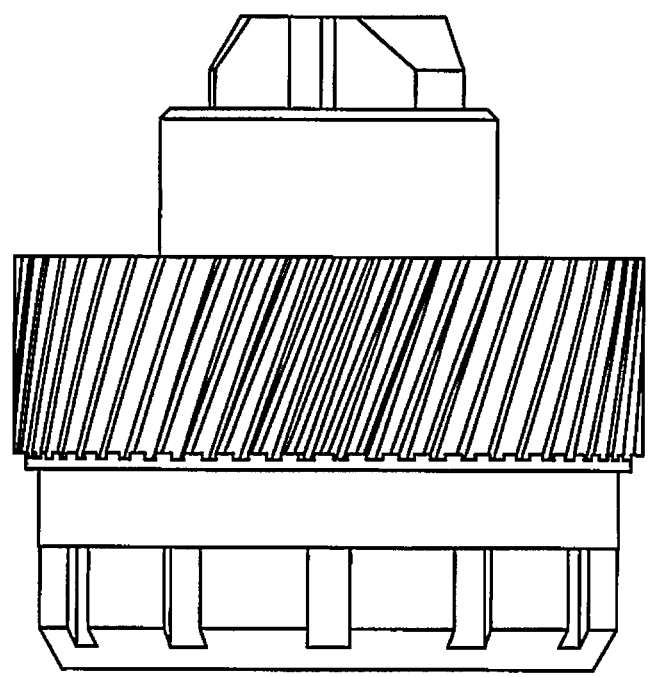
FIG. 53 is a side view of the gear mechanism shown in FIG. 51.
Figure 54:
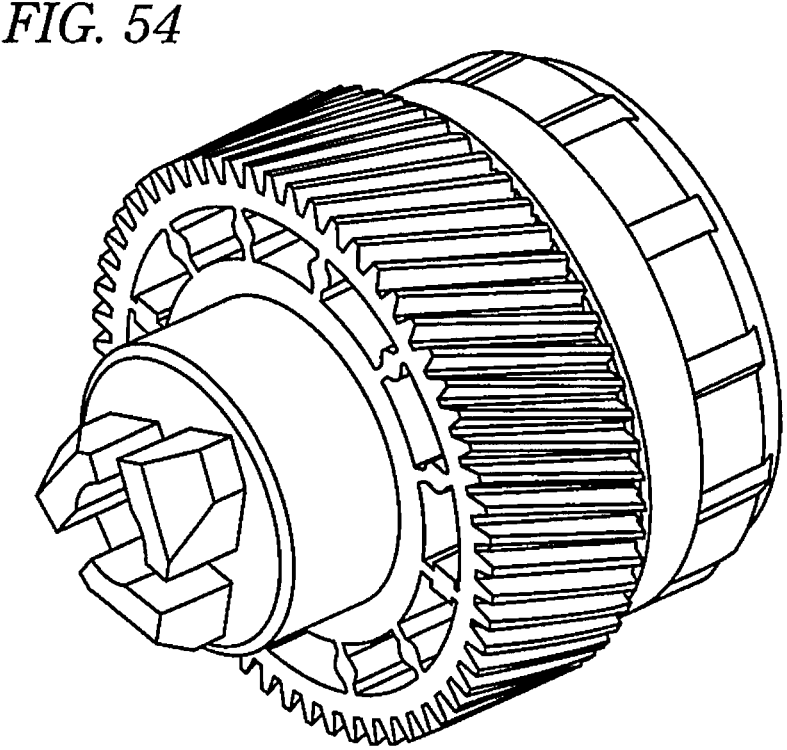
FIG. 54 is a perspective view of the gear mechanism shown in FIG. 51.

FIG. 46 exemplifies a general cross reference for another fifth example shown in FIGS. 47 to 50. The example shown in FIGS. 47 to 50 conforms to the example shown in FIG. 26. A modification of the fifth example is shown as another sixth example in FIGS. 51 to 54. In the example, the hexagonal male part is embodied by three protrusions in contrast to the continual structure. In these examples, the amount of tapering, a taper angle, and a taper length can be altered as illustrated in the other drawings in connection with the previous examples.

The foregoing examples are pertinent to engagement with the twisted triangular female part or the recess. However, the discussed male parts can be applied so as to engage with a tapered recess and another recess, like another prism-like recess or another polygonal recess.

It is preferable that a material used for manufacturing a male part and/or a gear mechanism should be formed from a crystalline resin. When subjected to injection molding by use of the die assembly, a crystalline resin exhibits superior flow and, therefore, superior moldability. Further, the crystalline resin becomes crystallized and solidified without being cooled to a glass transition temperature and, consequently, can be released from the die assembly. Accordingly, significant enhancement of productivity can be accomplished. Moreover, the crystalline resin also exhibits excellent heat resistance, solvent resistance, oil resistance, and grease resistance, as well as exhibiting superior frictional abrasion resistance and slidability. In addition, in view of rigidity and hardness, crystalline resin is preferable as a material for manufacturing the male part and/or the gear mechanism.

The crystalline resin includes; for instance, polyethylene, polypropylene, polyamide, polyacetal, polyethylene terephthalate, polybutylene terephthalate, methylpentene, polyphenylene sulfide, polyether ether ketone, polytetrafluoroethylene, nylon, and the like. Furthermore, there can be used a combination of a resin or a composite resin with a fibrous material. Of these resins, use of a polyacetal-based resin is desirable from the viewpoint of moldability. In addition, from the perspective of enhancement of strength, the illustrated structure can also be filled with a reinforcing member (glass fibers, carbon fibers, or a metallic pin) as an interior supporting member.

So long as a portion or the entirety of the foregoing male part (called also the protrusion) is formed from a slidable member (e.g., Teflon-contained polyacetal, or the like), the male part and the female part can also be brought into smooth engagement with each other.

Some of the foregoing examples can also be changed in accordance with the shape and mode of the female part in relation to the number of the plural projections, a specific layout, a direction of a radius/a width, and a size. Moreover, a surface shape and the length of the edges between the protrusions can be changed. In some modes, an intersection between the edges and/or the edges themselves can also be rounded in (unillustrated) some of the embodiments. Likewise, the hexagonal non-protruding male part can also be modified.

Third Embodiment

A rotating part of a third embodiment is hereunder described by reference to the drawings. Throughout the drawings, like numerals or characters employed in the first, second, and third embodiments, if applicable, designate like or corresponding parts. Moreover, in the specific embodiment, illustrated portions are described precisely in accordance with a scale size so that optimum ratios and measured values of the portions can be derived directly from the drawings. In another mode of the disclosures, however, the illustrated portions are not required to be rendered precisely in accordance with the scale size. Furthermore, unless advised otherwise, measured values provided in the drawings correspond to angles pertinent to a 360-degree coordinate system. Tolerance of radial directions and angle dimensions can be set so as to fall within a range of ±4 to 6 degrees while still remaining in a preferred shape and layout of characteristics provided in the drawings. However, greater tolerance can be implemented if it does not stray outside the range of the disclosures. Likewise, tolerance of one millimeter is optimum; however, the tolerance can be changed.

In some modes, the male part to be discussed herein is a modification of the mode described in connection with provisional U.S. patent application U.S. 61/614,346 (i.e., the first embodiment) filed on Mar. 22, 2012. The male part discussed in the application is hexagonal.

Figure 55:
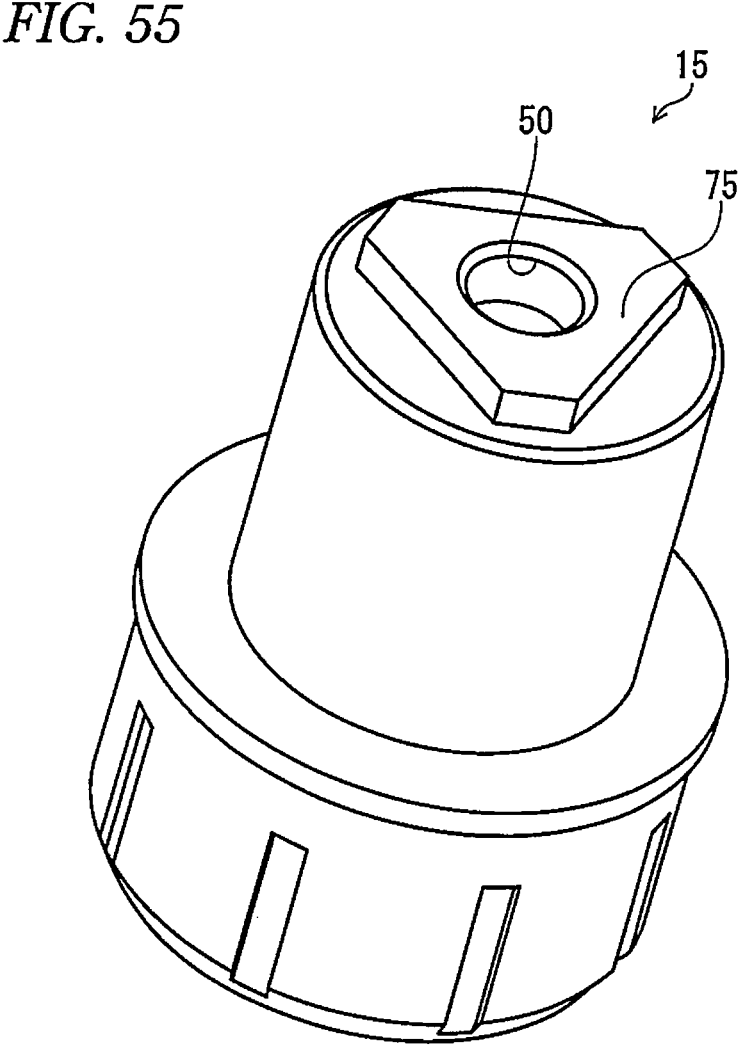
FIG. 55 is a perspective view of a gear mechanism to which a hexagonal male part of a third embodiment is applied.

FIG. 55 exemplifies a male part 75 including a base surface with a hexagonal perimeter which is made up of three long sides and three short sides arranged in an alternating sequence. Specifically, the perimeter of the base surface of the male part 75 is made up of a long side, a short side, a long side, a short side, a long side, and a short side. The male part 75 preferably has a flat top surface including the shaft hole 50 and includes three primary side surfaces that project from a base surface along the axial (rotational) direction. In some examples, the earth plate can be provided in the shaft hole 50.

The male part 75 includes additional three secondary side surfaces that are smaller than the three primary side surfaces in terms of a surface area. As to base-surface-side edges of the primary side surfaces and the secondary side surfaces, the secondary side surfaces are provided such that one secondary side surface is sandwiched between the primary side surfaces, to thus separate the primary side surfaces apart from each other. The aforementioned structure made up of the long sides and the short sides is thereby realized. Preferably, all of the primary side surfaces have the same dimension, and all of the secondary side surfaces also have the same dimension. More preferably, an angle which the primary side surface forms with the secondary side surface and an angle which the base-surface-side edges form with each other are a single angle of 120 degrees. In some respects, the three base-surface-side edges of the primary side surfaces extend along portions of the first equilateral triangle, whilst the three base-surface-side edges of the secondary side surfaces extend along portions of a second equilateral triangle. In this case, the first and second equilateral triangles are turned 60 degrees with respect to the rotation axis of the rotating part, and the second equilateral triangle is larger than the first equilateral triangle.

Each of the long sides and the short sides of the primary surfaces and the secondary surfaces that make up the hexagonal base surface and the flat hexagonal surfaces can have a midpoint that defines a vertical intersection between the long side or the short side and a radial straight line extending from the rotation axis.

Figure 56:
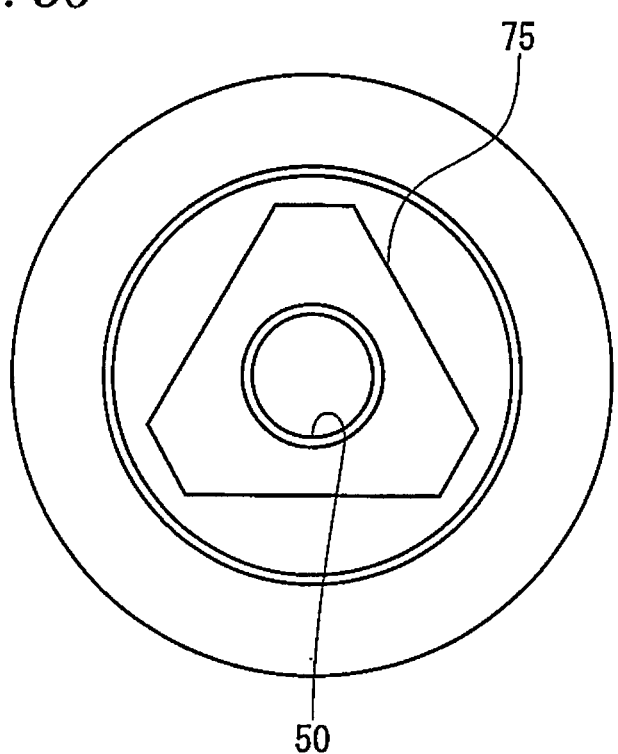
FIG. 56 is a plan view of the gear mechanism shown in FIG. 55.
Figure 57:
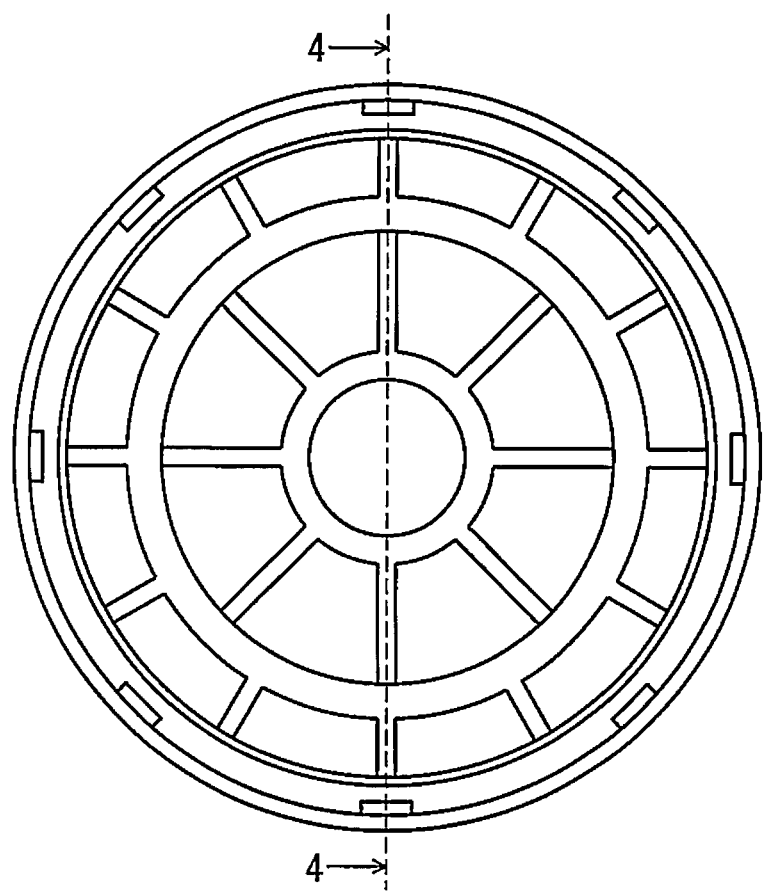
FIG. 57 is a bottom view of the gear mechanism shown in FIG. 55.
Figure 58:
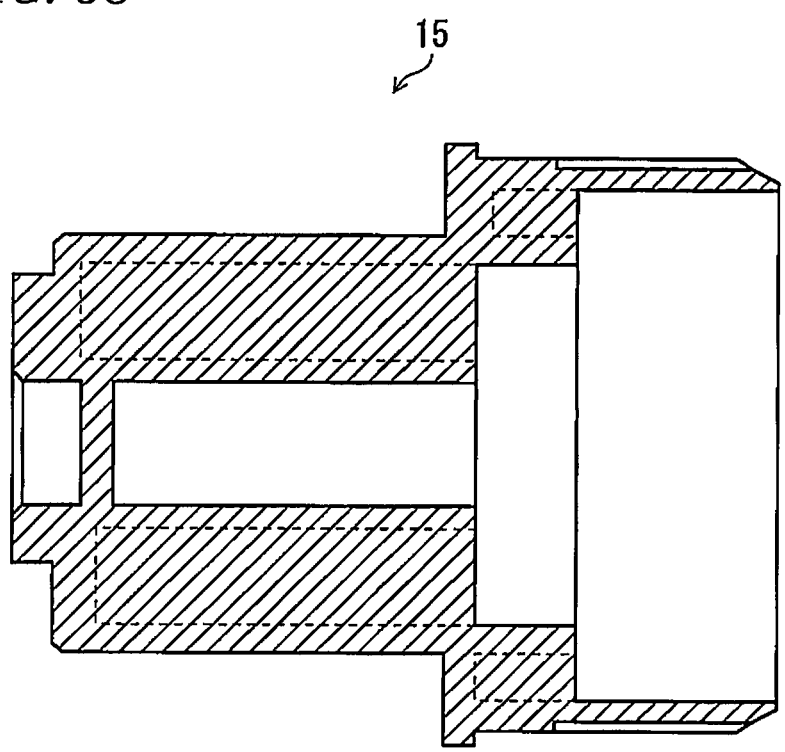
FIG. 58 is a cross sectional view taken along line 4-4 shown in FIG. 57.
Figure 59:
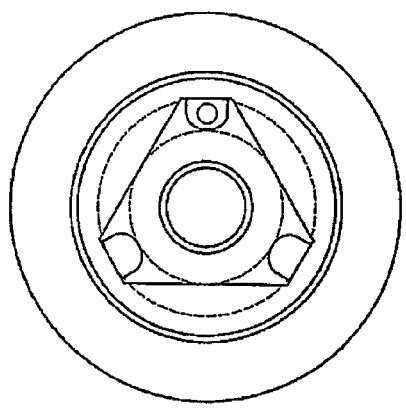
FIG. 59 is a plan view showing another shape of the hexagonal male part.
Figure 60:
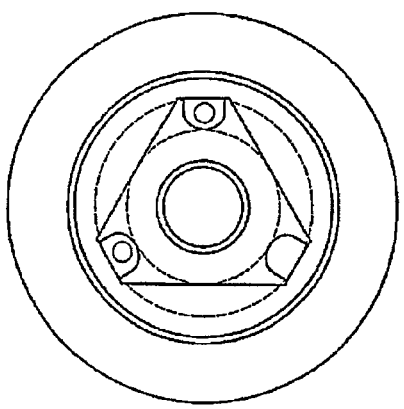
FIG. 60 is a plan view showing another shape of the hexagonal male part.
Figure 61:
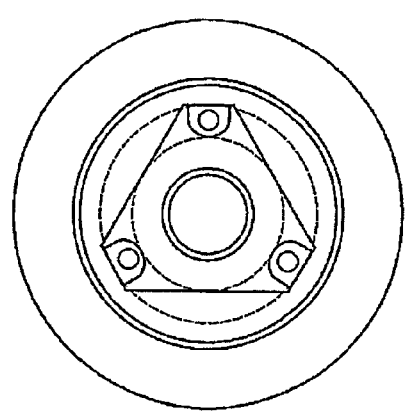
FIG. 61 is a plan view showing another shape of the hexagonal male part.
Figure 62:
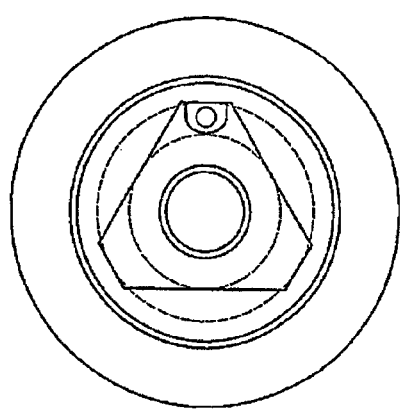
FIG. 62 is a plan view showing another shape of the hexagonal male part.
Figure 63:
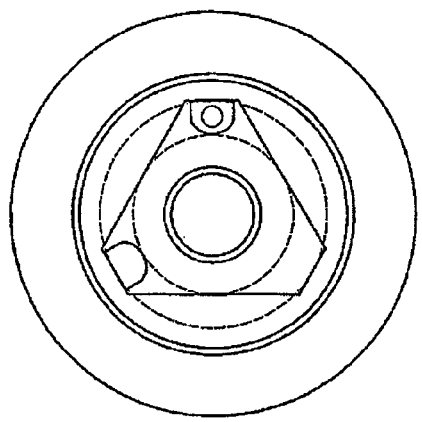
FIG. 63 is a plan view showing another shape of the hexagonal male part.
Figure 64:
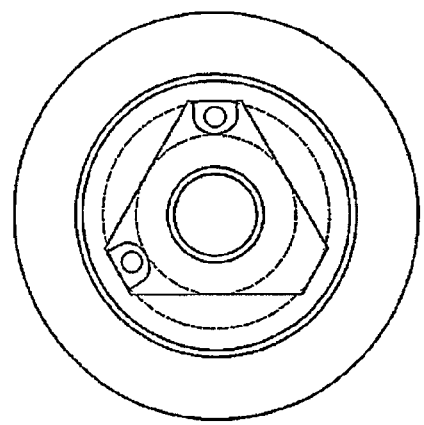
FIG. 64 is a plan view showing another shape of the hexagonal male part.
Figure 65:
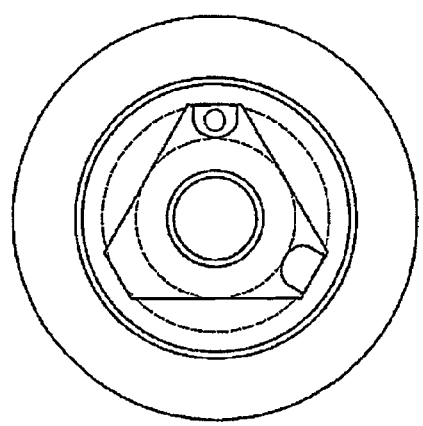
FIG. 65 is a plan view showing another shape of the hexagonal male part.
Figure 66:
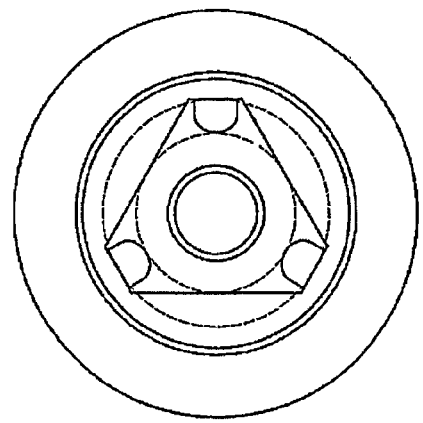
FIG. 66 is a plan view showing another shape of the hexagonal male part.

These relationships are illustrated in FIG. 56 that is a top view of the female part 75. FIG. 57 is a base surface of the male part 75. FIG. 58 exemplifies a cross section of the male part taken along line 4-4 shown in FIG. 57.

In FIG. 58, a depth or height of a hexagonal portion of the male part 75 can be set to about 2 mm. Specifically, the length of the primary side surface and the secondary side surface that extend in the direction of the rotation axis can be set to about 2 mm. In another example, the length can also be set to 1 through 5 mm.

The example is pertinent to the engagement with the twisted triangular female part or the recess. However, the discussed male part 75 can be applied so as to engage with a tapered recess and another recess, like another prism-like recess or another polygonal recess. In addition, protrusions can also be formed on portions of the male part that contact the recesses as illustrated in FIG. 12 of the first embodiment.

It is preferable that a material used for manufacturing the male part 75 and/or the gear mechanism 15 should be formed from a crystalline resin. When subjected to injection molding by use of the die assembly, a crystalline resin exhibits superior flow and, therefore, superior moldability. Further, the crystalline resin becomes crystallized and solidified without being cooled to a glass transition temperature and, consequently, can be released from the die assembly. Accordingly, significant enhancement of productivity can be accomplished. Moreover, the crystalline resin also exhibits excellent heat resistance, solvent resistance, oil resistance, and grease resistance, as well as exhibiting superior frictional abrasion resistance and slidability. In addition, in view of rigidity and hardness, crystalline resistance is preferable as a resin for manufacturing the male part 75 and/or the gear mechanism 15.

The crystalline resin includes; for instance, polyethylene, polypropylene, polyamide, polyacetal, polyethylene terephthalate, polybutylene terephthalate, methylpentene, polyphenylene sulfide, polyether ether ketone, polytetrafluoroethylene, nylon, and the like. Furthermore, a combination of a resin or a composite resin with a fibrous material can be used. Of these resins, use of a polyacetal-based resin is desirable from the viewpoint of moldability. In addition, from the perspective of enhancement of strength, the illustrated structure can also be filled with a reinforcing member (glass fibers, carbon fibers, or a metallic pin) as an interior supporting member.

So long as a portion or the entirety of the foregoing male part (called also the protrusion) 75 are formed from a slidable member (e.g., Teflon-contained polyacetal, or the like), the male part 75 and the female part can also be brought into smooth engagement with each other.

In another example, the male part can also be machined into shapes, such as those shown in FIGS. 59 to 66.

Some of the foregoing examples can also be changed in accordance with the shape and mode of the female part in relation to various widths and sizes. Moreover, when the male part has a plurality of protrusions, a surface shape and the length of the edges between the protrusions can be changed. In some modes, an intersection between the edges and/or the edges themselves can also be rounded in (unillustrated) some of the embodiments.

The invention enables optimization of a shape of engagement between a drive member and a driven-side member in a rotating part used in an image forming apparatus and is preferably applied to the image forming apparatus.

REFERENCE SIGNS LIST

1: APPARATUS MAIN BODY
2: PROCESS CARTRIDGE
3: ELECTRIFYING ROLLER
4: DEVELOPING ROLLER
5: REGULATORY PART
6: TRANSFER MEANS
7: CLEANING BLADE
8: HOUSING
10: PHOTOSENSITIVE DRUM UNIT
11: OPC DRUM
12: CAP MEMBER
13: END MEMBER
15: GEAR MECHANISM
20: DRIVE SHAFT
22, 36, 38, 42, 46, 61, 71, 75: HEXAGONAL MALE PART
24: TWISTED TRIANGULAR MALE PART
26: TOP
28: BASE
32: BASE
34, 44: END
48: TAPER
50: SHAFT HOLE
51: EDGE
53, 54, 55: TRIANGLE
56: MAXIMUM CROSS SECTION
62: PRIMARY SIDE SURFACE
63: SECONDARY SIDE SURFACE
64: TAPERED SURFACE
65: TOP SURFACE
66: BASE SURFACE

The invention claimed is:

1. A rotating part for an image forming apparatus comprising:
a drive member for transmitting power; and
a driven member that is rotated by the drive member,
wherein one of the drive member and the driven member has a male part formed in a direction of a rotation axis,
wherein a remaining one of the drive member and the driven member has a female part that is formed in the direction of the rotation axis and into which the male part is inserted,
wherein the female part is a twisted triangular female part that assumes a triangular cross sectional profile in a direction perpendicular to the rotation axis, and a triangle which forms a cross section of a base and a cross section of a top is twisted at a predetermined angle with respect to the rotation axis,
wherein the male part is a hexagonal male part with a cross section perpendicular to the rotation axis that assumes a hexagonal shape,
wherein respective sides of the hexagonal cross section are a combination of relatively short sides with relatively long sides arranged in an alternating sequence,
wherein the twisted triangular female part twists by an angle θ from a first triangular shape at the top to a second triangular shape at the base from a perspective of an insertion direction of the twisted triangular female part,
wherein edges of the first and second triangular shapes intersect at a series of inner and outer radial intersection points, with respect to an axial direction of the rotating part,
wherein a contact edge of the hexagonal male part that resides between the inner and outer radial intersection points when inserted into the twisted triangular female part extends in a direction of an edge of a third triangular shape that twists by an angle of η in addition to the angle θ,
wherein the first and third triangular shapes intersect at a medial intersection point with the contact edge of the hexagonal male part, and
an angle between a radial line, which extends from a rotation axis of the hexagonal male part to the medial intersection point, and the contact edge of the hexagonal male part is:

$$-\frac{\pi}{6} + \frac{\theta + \eta}{2}.$$

2. The rotating part according to claim 1, wherein the end portion of the hexagonal male part in a direction of the rotation axis has a taper.

3. The rotating part according to claim 1, wherein the hexagonal male part includes protrusions arranged to contact a contacting surface of the female part, the protrusions extending outward from an edge of a cross-section of the hexagonal male part.

4. The rotating part according to claim 1, wherein the driven member is a photosensitive drum.

5. A cartridge for forming an image including the rotating part defined in claim 1.

6. An image forming apparatus comprising the cartridge for forming an image defined in claim 5, wherein the twisted triangular female part is formed in the drive member that rotates the driven member.

7. A rotating part comprising:
a removable driven member; and
a drive member that transmits rotating force to the driven member,
wherein the rotating part is a twisted triangular female part that assumes a triangular cross sectional profile in a direction perpendicular to a rotation axis, and a triangle is twisted with respect to the rotation axis at a base and a top,
wherein the drive member has a hexagonal male part with a cross sectional profile perpendicular to the rotation axis that is hexagonal, and the hexagonal male part rotates while inserted in the twisted triangular female part, thereby rotating the driven member,
wherein the hexagonal male part has a hexagonal cross-sectional shape having edges that alternate between relatively short and long lengths,
wherein the twisted triangular female part twists by an angle θ from a first triangular shape at the top to a second triangular shape at the base from a perspective of an insertion direction of the twisted triangular female part, wherein edges of the first and second triangular shapes intersect at a series of inner and outer radial intersection points, with respect to an axial direction of the rotating part, wherein a contact edge of the hexagonal male part that resides between the inner and outer radial intersection points when inserted into the twisted triangular female part extends in a direction of an edge of a third triangular shape that twists by an angle of η in addition to the angle θ, wherein the first and third triangular shapes intersect at a medial intersection point with the contact edge of the hexagonal male part, and an angle between a radial line, which extends from a rotation axis of the hexagonal male part to the medial intersection point, and the contact edge of the hexagonal male part is:

$$-\frac{\pi}{6}+\frac{\theta+\eta}{2}.$$

8. The rotating part according to claim 7, wherein the first, second, and third triangular shapes are equilateral triangular shapes.

9. The rotating part according to claim 8, wherein a maximum length of the contact edge is $$\frac{R}{2}\cdot\left(\tan\left(\frac{\eta}{2}\right)+\tan\left(\frac{\pi}{3}-\frac{\theta+\eta}{2}\right)\right)$$

where R is an outside radius of the equilateral triangular shapes measured from the rotation axis of the hexagonal male part.

10. The rotating part according to claim 7, wherein an end portion of the hexagonal male part has a taper.

11. The rotating part according to claim 7, wherein the driven member is a photosensitive drum.

12. A cartridge for forming an image including the rotating part defined in claim 7.

13. The rotating part according to claim 7, wherein the male part includes primary and secondary side surfaces which extend in an axial direction away from the base of the male part towards an insertion end thereof, the primary and secondary side surfaces extending, respectively, from long and short sides of a perimeter of the base.

14. The rotating part according to claim 13, wherein the primary side surfaces have a larger dimensional surface area than the secondary side surfaces.

15. The rotating part according to claim 14, wherein:
the primary side surfaces extend from the base of the male part to the insertion end of the male part,
the secondary side surface each extend from the base of the male part to respective tapered surfaces, and
the tapered surfaces extend from the secondary side surfaces, at an angle with respect to a parallel with the axial direction, to the insertion end of the male part.

16. The rotating part according to claim 15, wherein
the insertion end of the male part is a flat hexagonal surface including a hole that extends axially through the male part.

17. The rotating part according to claim 16, wherein the flat hexagonal surface has a perimeter which includes alternating short and long sides.

18. The rotating part according to claim 17, wherein the short sides of the perimeter of the flat hexagonal surface are parallel with the long sides of the base.

19. The rotating part according to claim 7, wherein the hexagonal male part has a base with a perimeter including alternating long and short sides.

20. The rotating part according to claim 19, wherein the male part includes primary and secondary side surfaces which extend in an axial direction away from the base of the male part towards an insertion end thereof, the primary and secondary side surfaces extending, respectively, from the long and short sides of the perimeter of the base.

21. The rotating part according to claim 20, wherein the primary side surfaces have a larger dimensional surface area than the secondary side surfaces.

22. The rotating part according to claim 21, wherein
the primary side surfaces extend from the base of the male part to the insertion end of the male part,
the secondary side surfaces each extend from the base of the male part to respective tapered surfaces, and
the tapered surfaces extend from the secondary side surfaces, at an angle with respect to a parallel with the axial direction, to the insertion end of the male part.

23. The rotating part according to claim 22, wherein the insertion end of the male part is a flat hexagonal surface including a hole that extends axially through the male part.

24. The rotating part according to claim 23, wherein the flat hexagonal surface has a perimeter which includes alternating short and long sides.

25. The rotating part according to claim 24, wherein the long sides of the perimeter of the flat hexagonal surface are parallel with the short sides of the base.

26. The rotating part according to claim 19, wherein a short side of the short sides extends from a first point to a second point in a clockwise direction with respect to a rotational axis of the rotating part such that the first point is further away from the rotational axis than the second point.

27. The rotating part according to claim 19, further comprising a cylindrical body including a photoconductor.

28. An imaging cartridge for an image forming apparatus comprising the rotating part according to claim 19.

29. An image forming apparatus comprising the imaging cartridge according to claim 28 and the twisted triangular female part as a drive member for driving and rotating the rotating part.

30. The image forming apparatus according to claim 29, further comprising:
a rotating part removable from the image forming apparatus, the rotating part including a twisted triangular female part; and
a drive transmission member including a hexagonal male part configured to be inserted into the female part to drive and rotate the rotating part, the male part including a taper.

31. The rotating part according to claim 7, further comprising a cylindrical body including a photoconductor.

32. An imaging cartridge for an image forming apparatus comprising the rotating part according to claim 7.

33. An image forming apparatus comprising the imaging cartridge according to claim 32 and the twisted triangular female part as a drive member for driving and rotating the rotating part.

34. The rotating part according to claim 1, wherein an angle, which is between adjacent ones of the short and long sides arranged in the alternating sequence, alternates between different first and second angles.

35. The rotating part according to claim 34, wherein the first angle is an obtuse angle and a value of the second angle is less a value of the first angle.

36. The rotating part according to claim 35, wherein the second angle is a right angle.

37. The rotating part according to claim 7, wherein an angle, which is between adjacent ones of the edges that alternate between relatively short and long lengths, alternates between different first and second angles.

38. The rotating part according to claim 37, wherein the first angle is an obtuse angle and a value of the second angle is less a value of the first angle.

39. The rotating part according to claim 38, wherein the second angle is a right angle.

* * * * *